United States Patent [19]

Nishigaki et al.

[11] Patent Number: 5,930,110
[45] Date of Patent: Jul. 27, 1999

[54] COMPUTER SYSTEM HAVING DETACHABLE EXPANSION UNIT

[75] Inventors: Nobutaka Nishigaki; Ryoji Ninomiya; Makoto Sakai, all of Tokyo, Japan

[73] Assignee: Kabushiki Kaisha Toshiba, Kawasaki, Japan

[21] Appl. No.: 08/870,032

[22] Filed: Jun. 5, 1997

Related U.S. Application Data

[62] Division of application No. 08/410,516, Mar. 24, 1995, Pat. No. 5,664,118.

[30] Foreign Application Priority Data

| Mar. 28, 1994 | [JP] | Japan | 6-056491 |
| Apr. 25, 1994 | [JP] | Japan | 6-086270 |
| May 9, 1994 | [JP] | Japan | 6-095147 |

[51] Int. Cl.$^6$ ........................................... G06F 1/16
[52] U.S. Cl. ........................................... 361/686; 395/281
[58] Field of Search ........................................... 361/683–686, 361/724–727; 312/223.1, 223.2; 364/708.1; 395/281, 283, 500; G06F 1/16

[56] References Cited

U.S. PATENT DOCUMENTS

| 4,854,731 | 8/1989 | Jenkins | 374/178 |
| 4,903,106 | 2/1990 | Fukunaga et al. | 357/43 |
| 4,970,497 | 11/1990 | Broadwater et al. | 340/598 |
| 5,281,026 | 1/1994 | Bartilson et al. | 374/143 |
| 5,291,607 | 3/1994 | Ristic et al. | 395/750 |
| 5,313,596 | 5/1994 | Swindler et al. | 395/325 |
| 5,323,291 | 6/1994 | Boyle et al. | 361/683 |
| 5,324,916 | 6/1994 | Goto et al. | 219/497 |
| 5,377,357 | 12/1994 | Nishigaki et al. | 395/800 |
| 5,381,043 | 1/1995 | Kohiyama et al. | 307/116 |
| 5,386,567 | 1/1995 | Lien et al. | 395/700 |
| 5,394,552 | 2/1995 | Shirota | 395/750 |
| 5,396,636 | 3/1995 | Gallagher et al. | 395/750 |
| 5,507,661 | 4/1996 | Honda et al. | 439/347 |
| 5,526,493 | 6/1996 | Shu | 395/281 |
| 5,535,093 | 7/1996 | Noguchi et al. | 361/686 |
| 5,579,528 | 11/1996 | Register | 395/671 |
| 5,592,362 | 1/1997 | Ohgami et al. | 361/686 |
| 5,598,539 | 1/1997 | Gephardt et al. | 395/281 |
| 5,648,762 | 7/1997 | Ichimura et al. | 340/825.31 |

OTHER PUBLICATIONS

"PCMCIA PC Card Standard", release 2.01, section 4.11, pp. 4–28, 1992.

*Primary Examiner*—Lynn D. Feild
*Attorney, Agent, or Firm*—Limbach & Limbach L.L.P.

[57] ABSTRACT

In a computer system constituted by a portable computer and a deskstation used to expand the function of the portable computer, the portable computer has a communication connector used for communication with the deskstation, in addition to a connector for connecting a system bus in the portable computer to the deskstation. Similarly, the deskstation also has a communication connector. When the portable computer is set at a predetermined position of the deskstation, these connectors are connected to each other before the system bus is connected to an expansion device of the deskstation. By using the communication connectors to perform communication between the portable computer and the deskstation, disconnection between the system bus and an expansion connector or forced suspend processing of the portable computer is executed before the portable computer in a power ON state is mounted in the deskstation. In addition, a lock mechanism is provided to lock the portable computer with the deskstation. The lock mechanism is operated/released by registering/deleting a password. Even when a power supply unit having a plurality of power supply outlets is externally provided to the deskstation, processing for sequentially enabling the power supply outlets is executed. Temperature control in the portable computer is also executed.

31 Claims, 31 Drawing Sheets

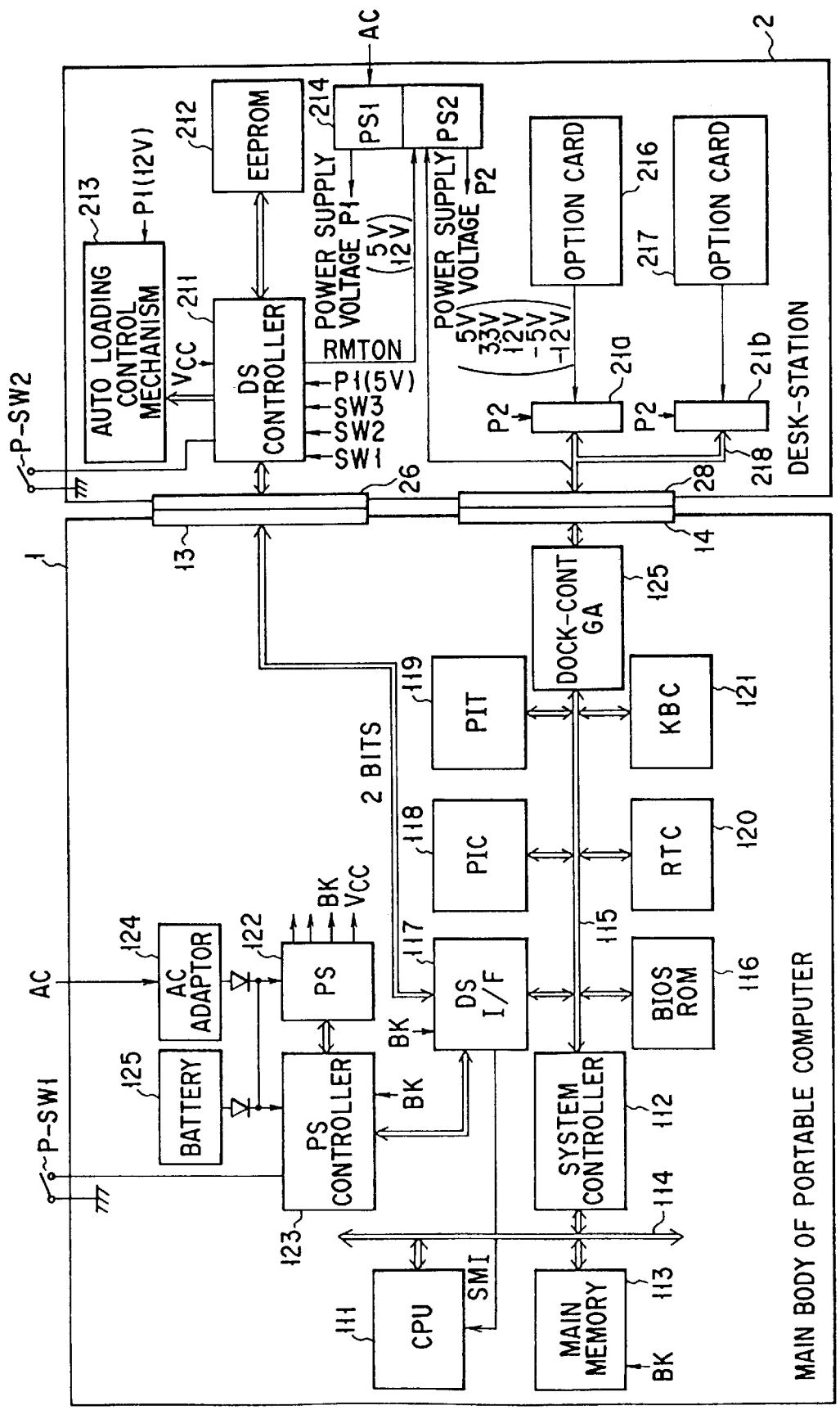
F I G. 3

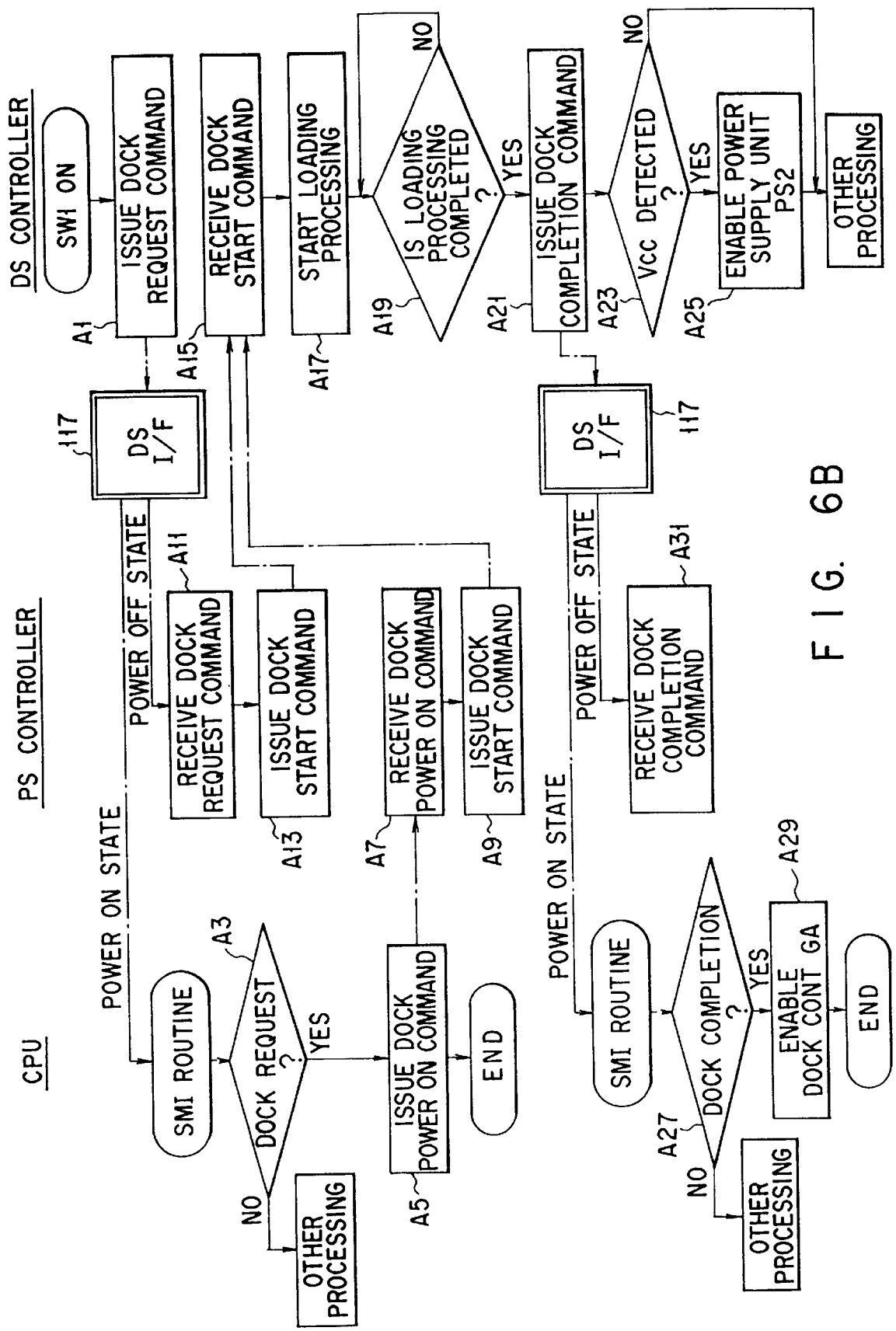
F I G. 6B

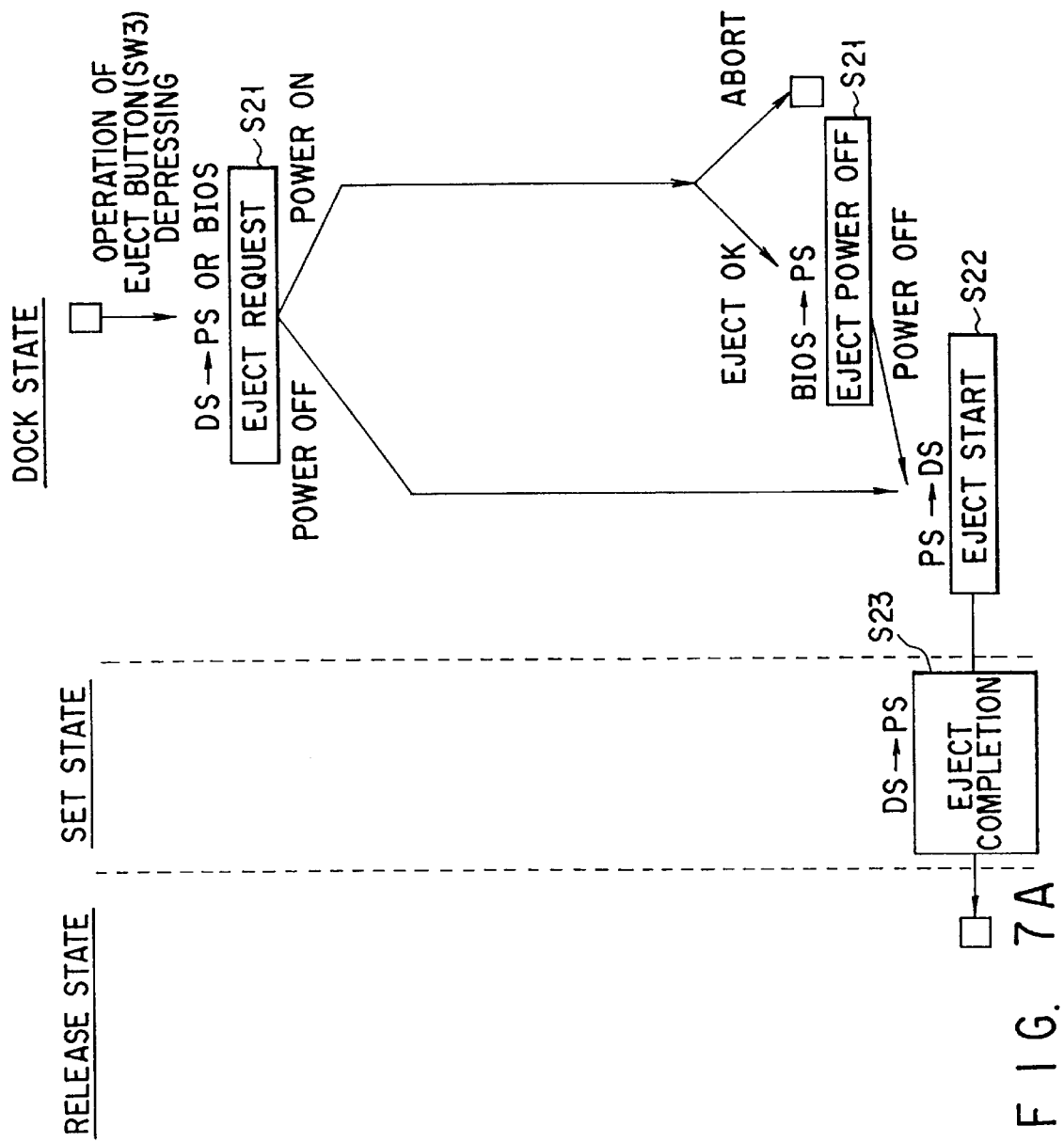
F I G. 7A

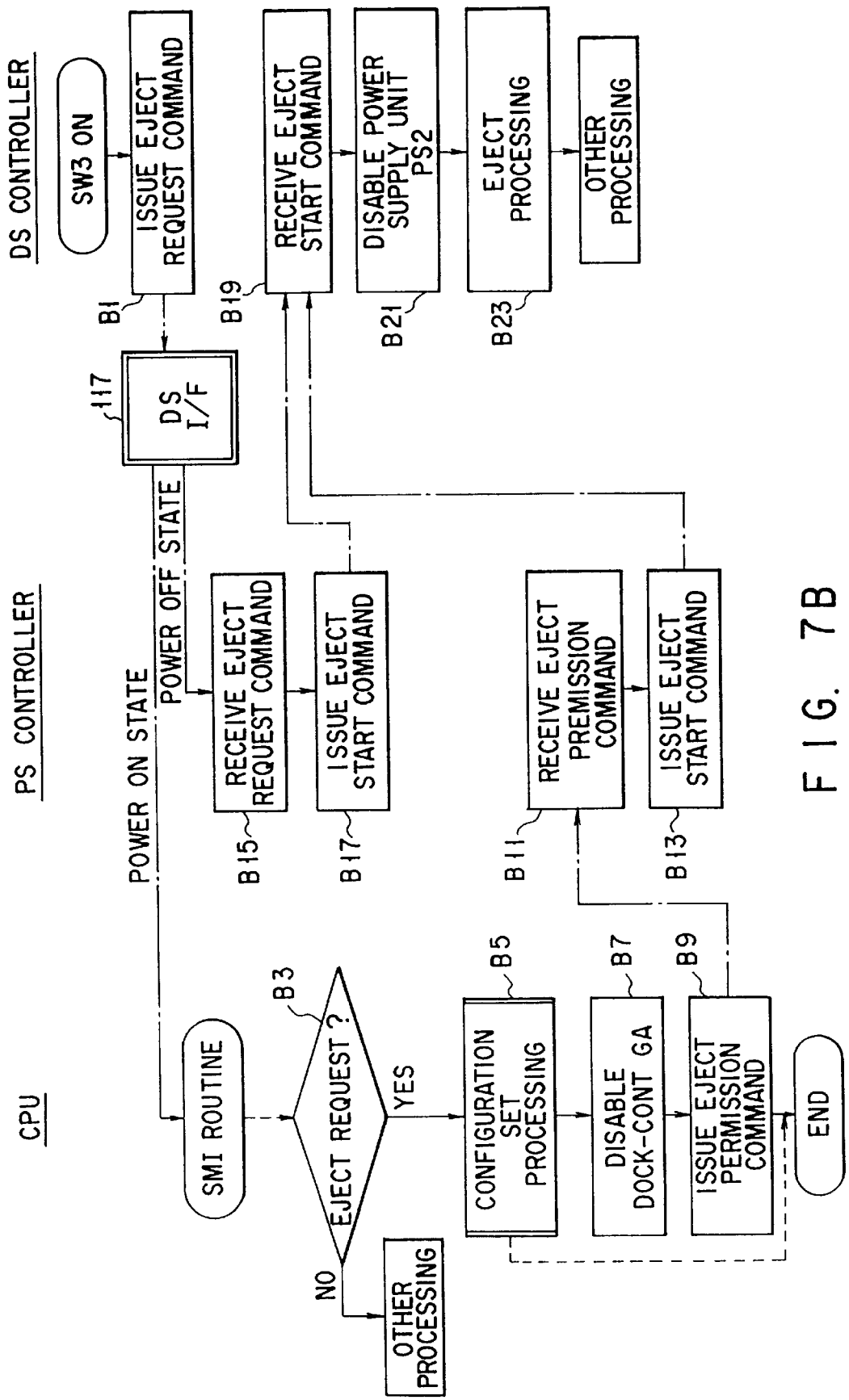
F I G. 7B

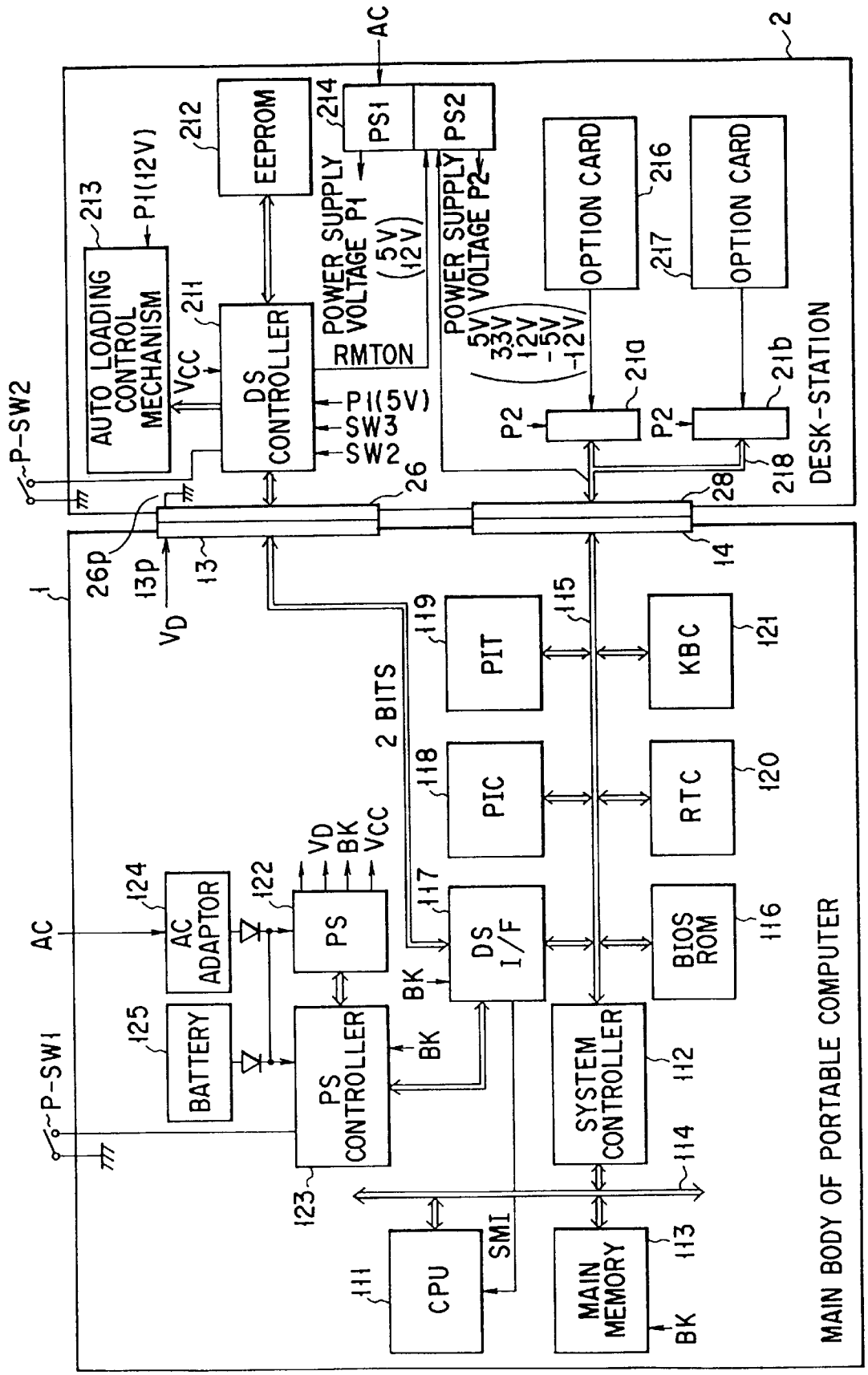
F I G. 8

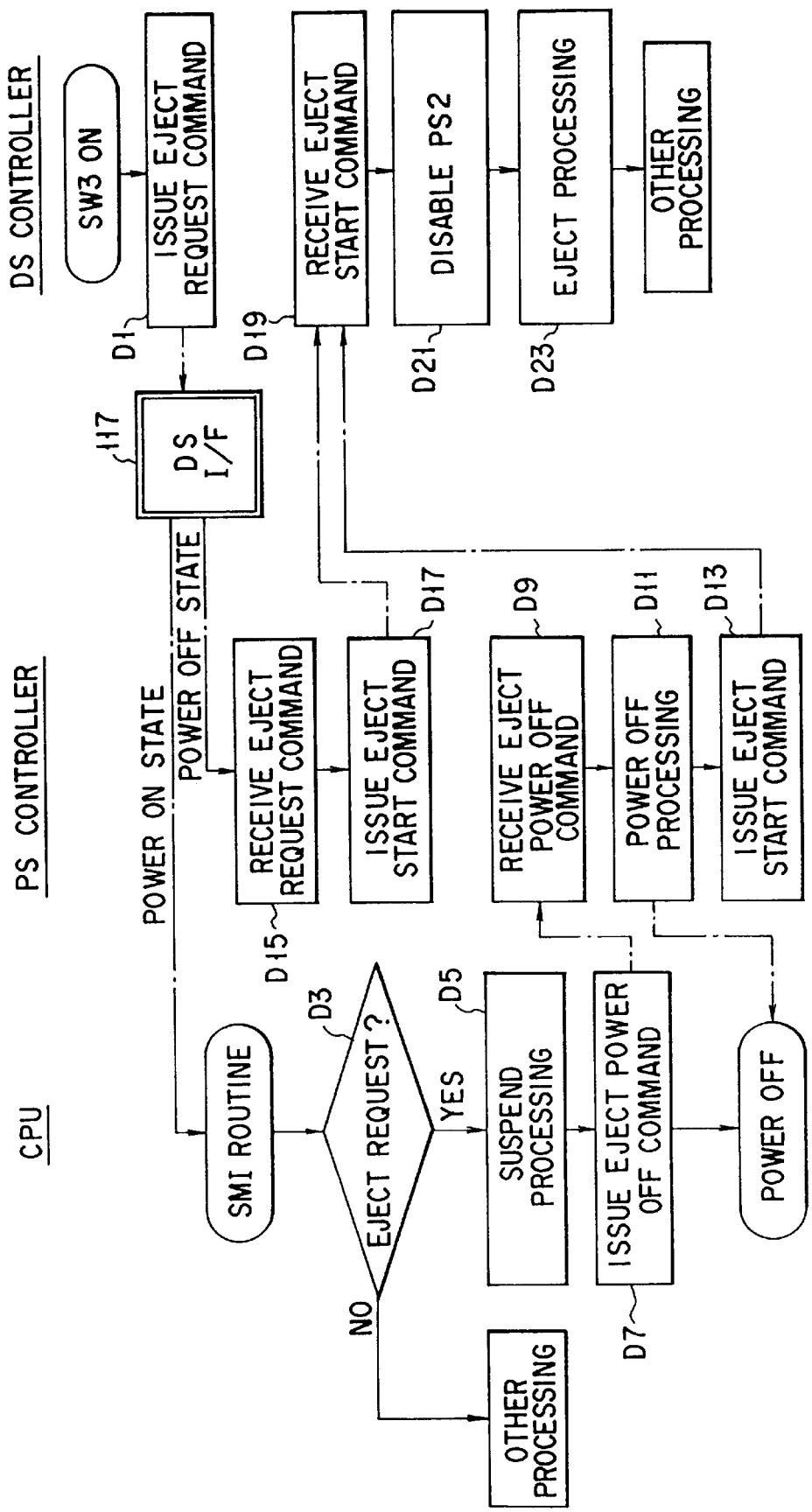
F I G. 10

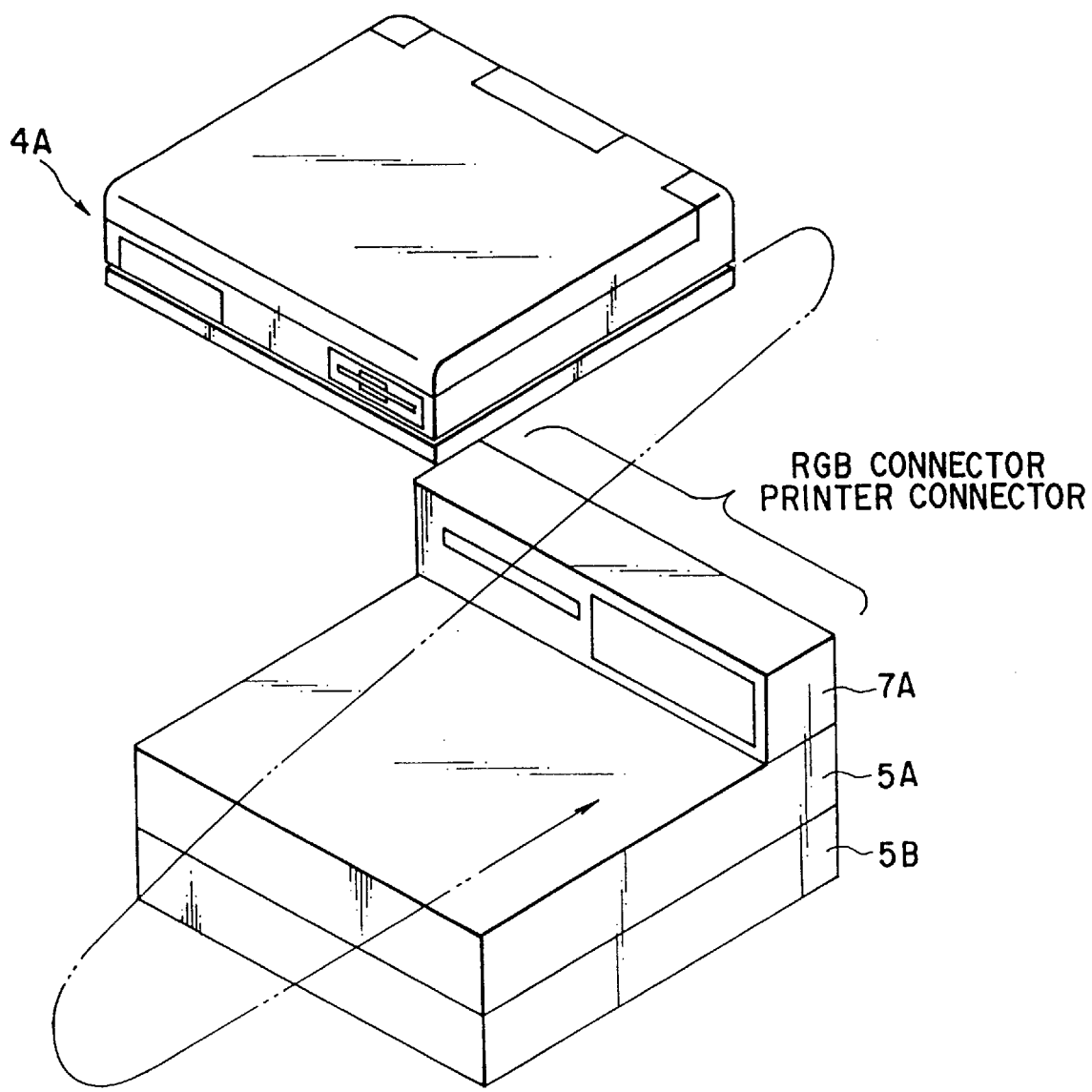
F I G. 21

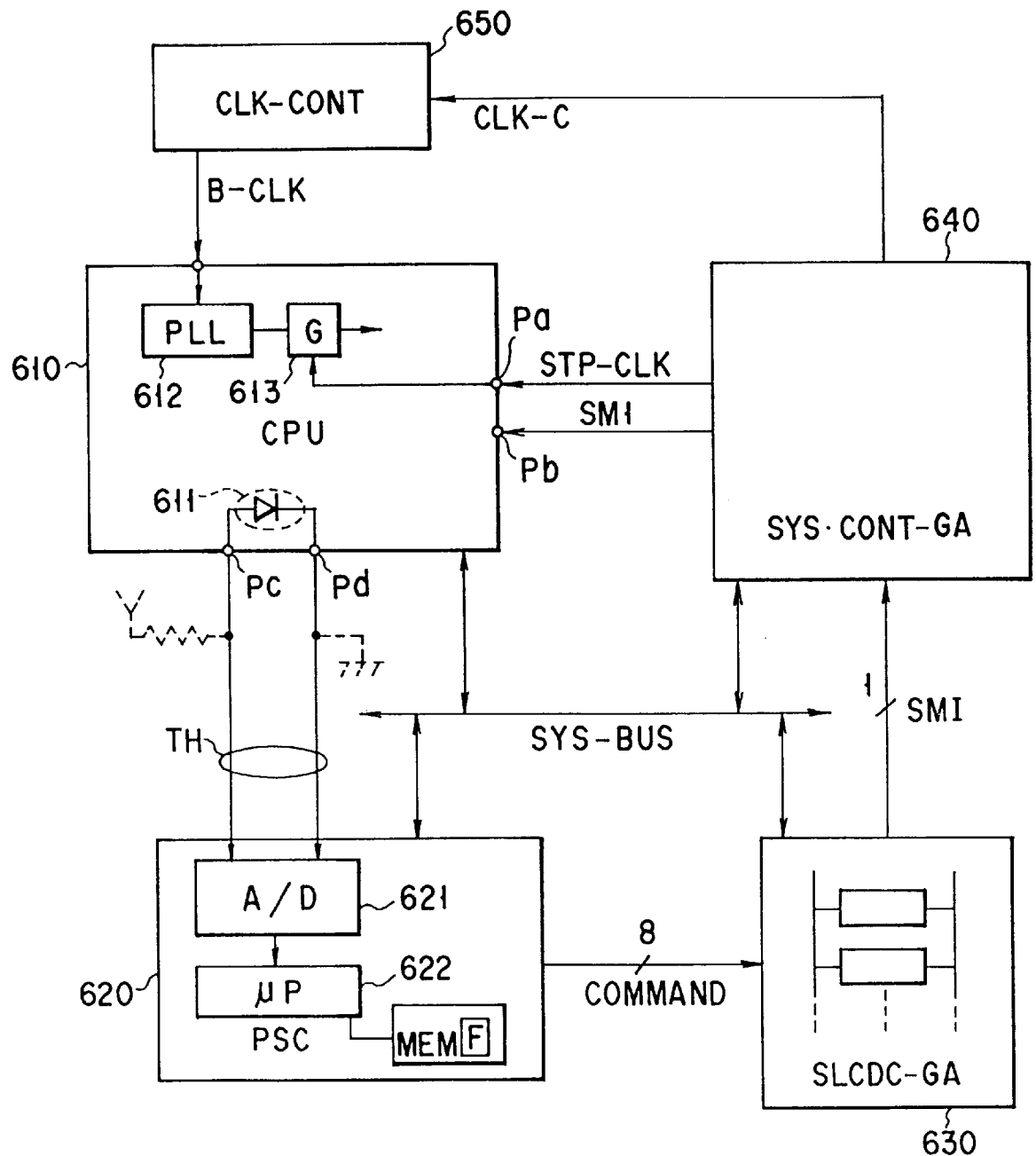
F I G. 22

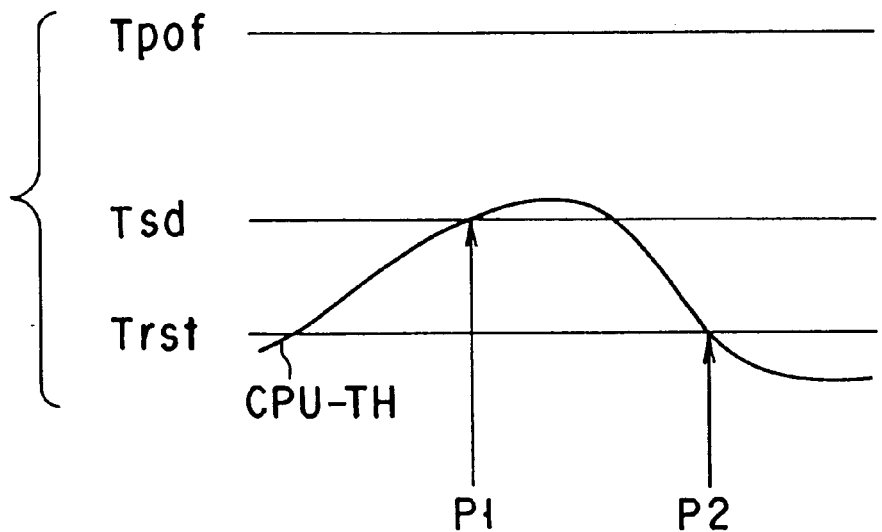
F I G. 24
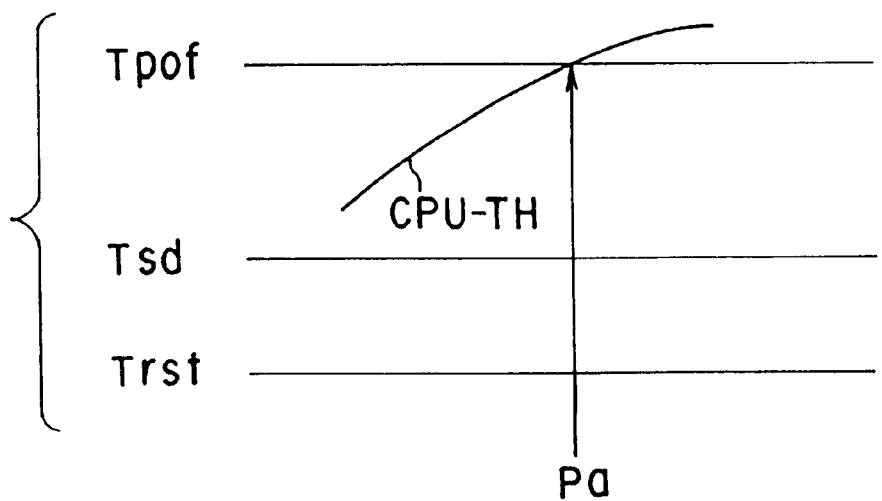
F I G. 25

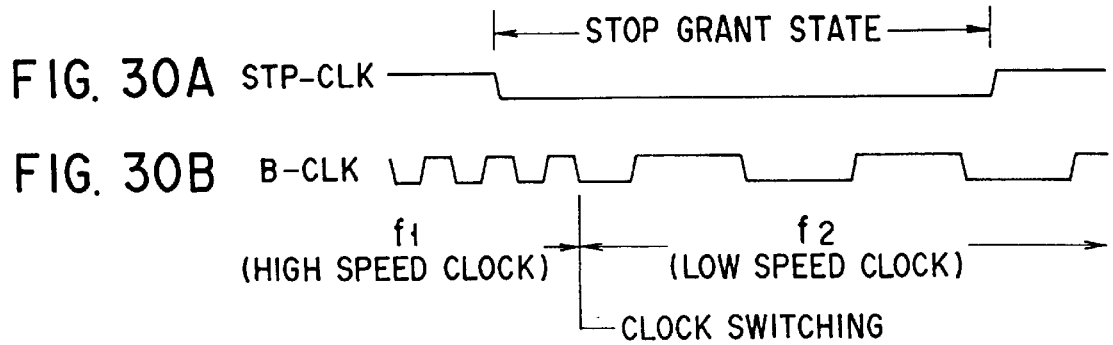
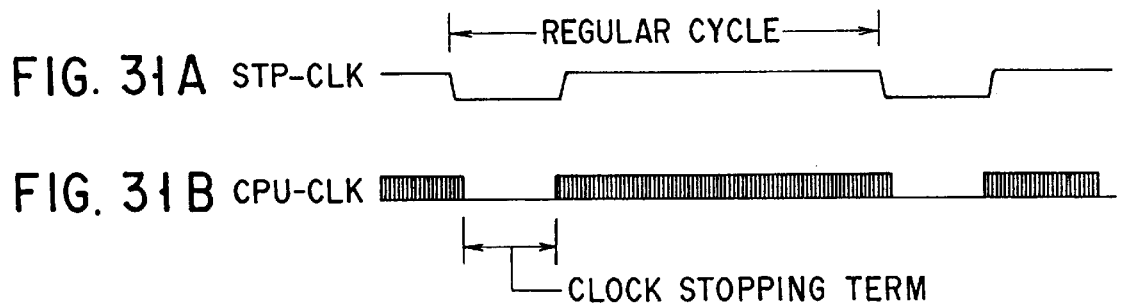
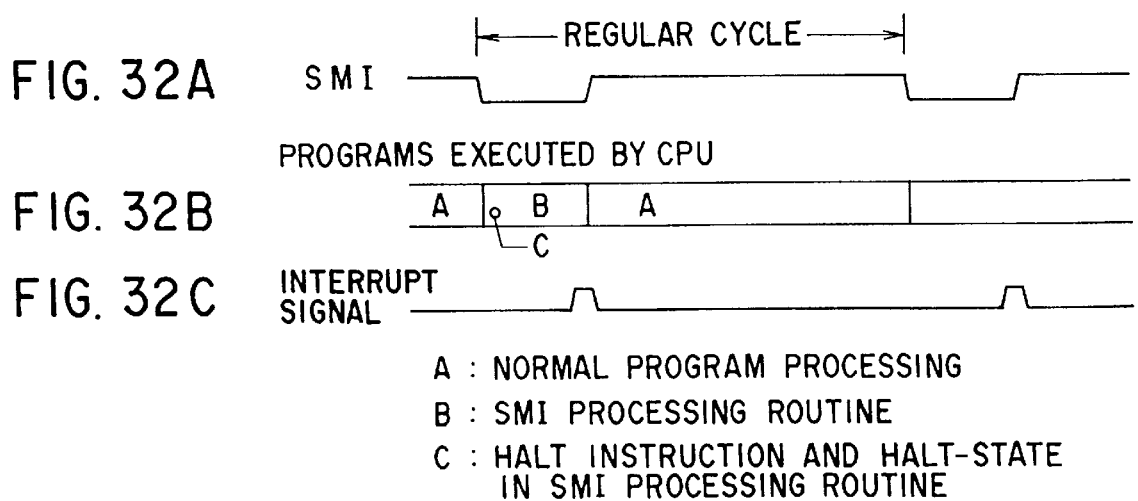

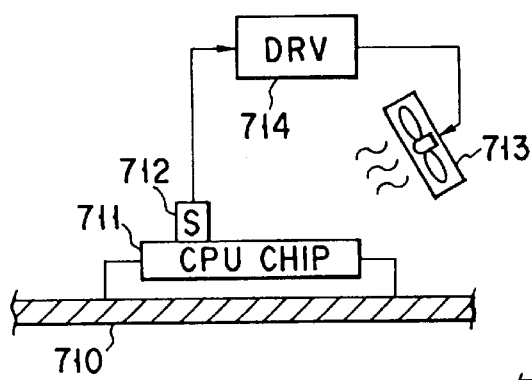
F I G. 35
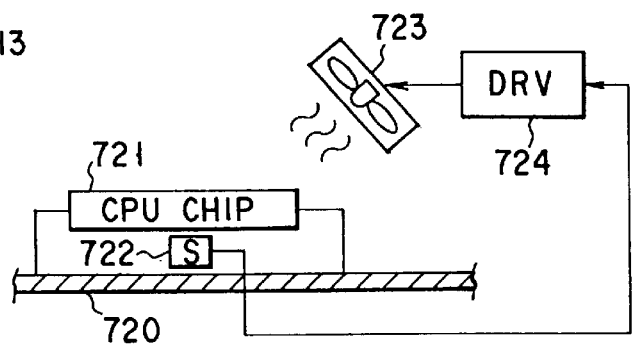
F I G. 36
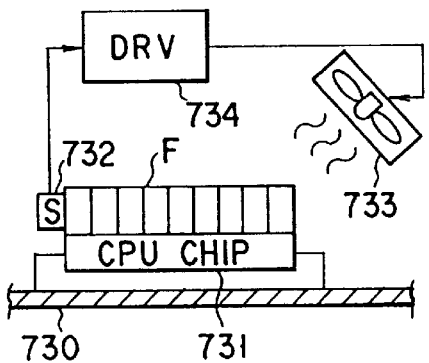
F I G. 37
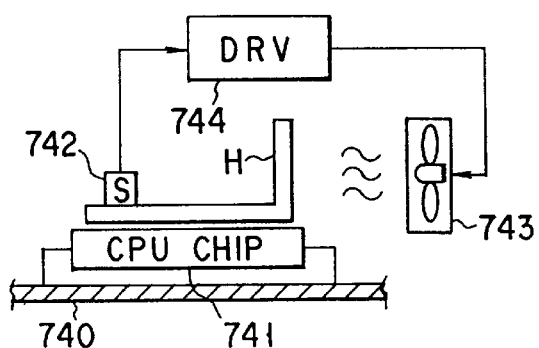
F I G. 38
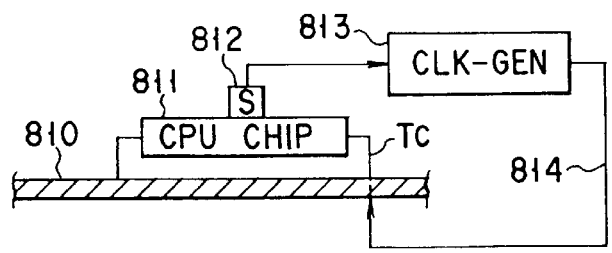
F I G. 39
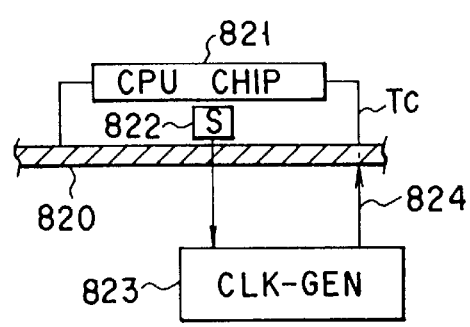
F I G. 40

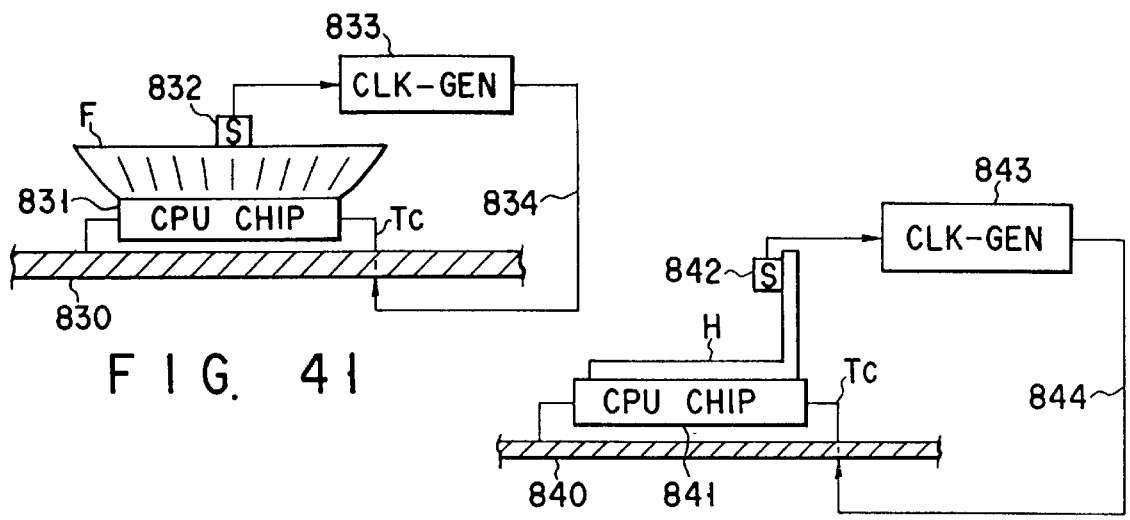
FIG. 41
FIG. 42
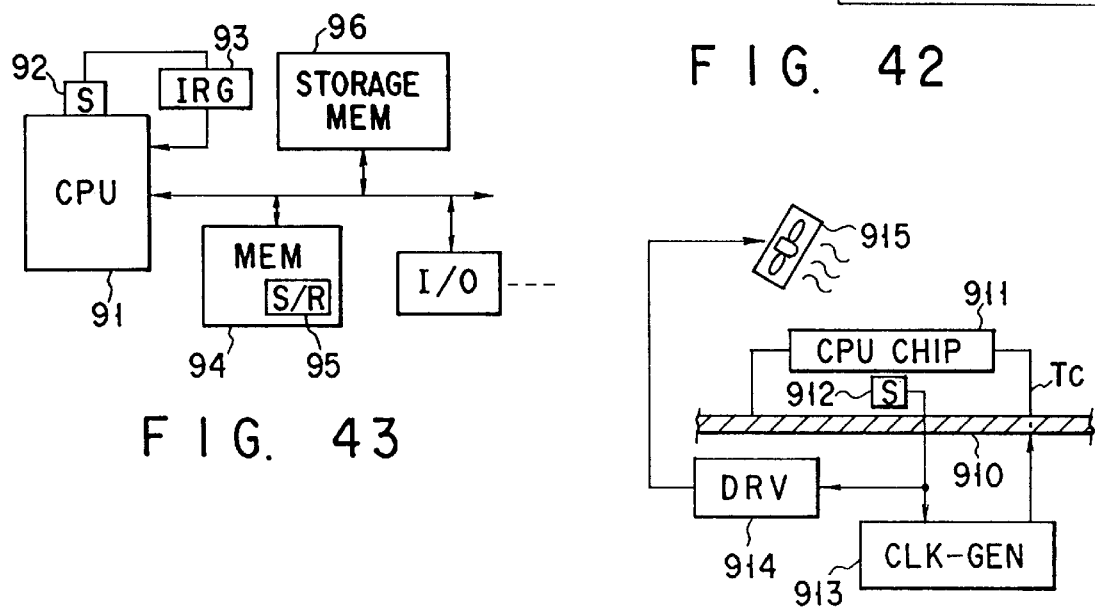
FIG. 43
FIG. 44
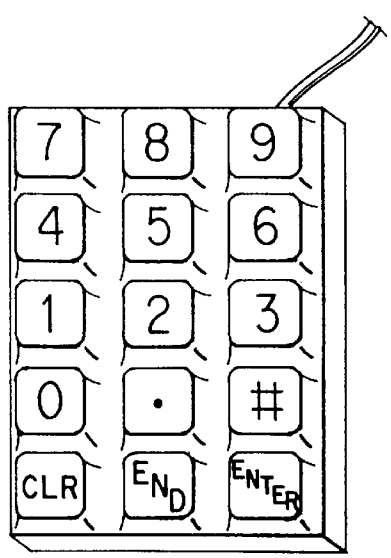
FIG. 45

COMPUTER SYSTEM HAVING DETACHABLE EXPANSION UNIT

This is a divisional of application Ser. No. 08/410,516, filed Mar. 24, 1995, now U.S. Pat. No. 5,664,118.

BACKGROUND OF THE INVENTION

1. Field of the Invention

The present invention relates to a computer system and, more particularly, to a computer system having a computer main body and an expansion unit capable of being freely attached/detached to/from the computer main body.

The present invention also relates to a computer system and, more particularly, to a computer system having a computer main body, a port replicator for relaying connection to an externally connected equipment, and an expansion unit loading an expansion equipment for expanding the function therein.

The present invention also relates to electronic equipment such as a computer system and, more particularly, to a controller, constituted as a one-chip controller by a semiconductor integrated circuit, for handling clock and digital signals, and electronic equipment using the one-chip controller.

The present invention also relates to a computer system such as a personal computer incorporating a CPU board and, more particularly, to a computer system having a cooling control mechanism for a CPU chip mounted in the CPU board or other heat generating components.

2. Description of the Related Art

In recent years, various personal computers of a laptop or notebook type, which can be easily carried and operated by a battery, have been developed. A portable computer of this type is constituted such that an expansion unit can be attached thereto as needed to expand the function.

The expansion unit has a plurality of expansion connectors. Various option cards can be attached to the connectors. Additionally, in order to suppress power consumption in a state without connection of the computer main body, in some expansion units, the voltage of a specific pin is monitored to detect connection of the expansion unit, and some expansion units can be powered on only when the computer main body is connected.

However, to use a mounted option card, the system configuration information of the portable computer must be rewritten for reconfiguration of the system. The system configuration information is normally rewritten at the time of starting the system on the basis of setup information or the like, which is set by the user. Conventionally, therefore, when the expansion unit is mounted in the computer main body in a power ON state, the computer main body cannot recognize the presence of the expansion unit, and the option card of the expansion unit cannot be used.

Recently, an operating system (OS) or BIOS (Basic Input/Output System) having a function of reconfiguring the system during starting the portable computer has been developed. By using an operating system or BIOS of this type, the system environment can be changed during starting the system into an environment allowing the use of the option card.

However, when the expansion unit is mounted in the computer main body in a power ON state, an unexpected current flows from the computer main body to the option card due to hot swap or the like. This may cause destruction of the option card of the expansion unit. Even if destruction of the option card is prevented, disadvantages such as hangup of the computer main body may be generated.

For this reason, actually, the expansion unit cannot be mounted during starting the system of the computer main body (in an ON state).

In addition, recent portable computers which are connected (docked) to expansion units are largely improved in performance. Furthermore, in recent years, a variety of optional equipments have been developed.

In these situations, various function expansion mechanisms are required for expansion units, and accordingly, the packaging density of components in a unit becomes higher making a unit housing bulky. In addition, a power supply unit in the expansion unit has a higher power and becomes heavy.

Therefore, when an expansion unit having a desired function is manufactured using the conventional manufacturing technique, the unit main body becomes bulky and heavy. A large space is needed to set the unit, resulting in difficulty in handling.

In the conventional expansion unit of this type, a power supply unit is incorporated in the unit to apply a power supply voltage to each section in the unit. For this reason, when the packaging density of components in the unit becomes higher, heat or noise generated from the power supply unit largely influences each component in the unit and poses a problem of reliability.

In the conventional expansion unit of this type, power supplies of the expansion unit and the personal computer mounted in the expansion unit are independently ON/OFF-controlled. Therefore, an erroneous operation may be caused by a shift of the power supply states.

In the conventional expansion unit of this type, the personal computer mounted in the expansion unit can be arbitrarily detached. For this reason, disadvantages such as data destruction by a detaching operation during the operation are likely to occur to degrade the security.

In the conventional expansion unit of this type, when an optional unit such is a hard disk unit is to be mounted, a tool such as a driver is used to partially disassemble the housing of the expansion unit, and the optical unit such as a hard disk unit is fixed at a predetermined position in the housing. Thereafter, the housing is assembled to store the optical unit in the expansion unit. Conventionally, storage or exchange of an optional unit is not facilitated, and much time and labor are needed.

In the conventional expansion unit of this type, when a personal computer is to be attached/detached, the power ON/OFF operation of the power supplies of the personal computer and the expansion unit must be independently performed in accordance with a predetermined feed/stop sequence, resulting in poor operability.

In the conventional expansion unit of this type, when the personal computer is mounted in the expansion unit, I/O ports of the personal computer, which include a printer connection port, a serial (RS-232C) port, and a CRT (R, G, and B) connection port, are closed. For this reason, the expansion unit also has the similar I/O ports, and a large number of connection interfaces must be conventionally provided to the unit housing. Therefore, as the unit becomes bulky, a large number of connector wiring lines are needed, resulting in complex structure of the expansion unit. In addition, in the above conventional structure, an expansion unit having I/O ports must be used even in a system configuration using no I/O port, which poses an economical problem.

As a controller constituted as a one-chip controller by a semiconductor integrated circuit for handling clock and digital signals, various controllers constituting a CPU chip or a family thereof are available. Such a one-chip controller for handling clock and digital signals greatly increases its processing speed in recent years. Along with this, an increase in power consumption, and accordingly, an increase in chip temperature pose serious problems.

As for a CPU chip, to solve the above problems, countermeasures including a reduction in power consumption by application of a CMOS, a reduction in voltages, and improvement of fins have been made. On the other hand, a clock speed for determining the processing speed of the CPU has increased from several MHz to several tens of MHz in recent years. Even with the above countermeasures, the power consumption and temperature of the chip greatly increase.

As for the mounting environment of the CPU chip, further size and weight reduction and a smaller setting space are required to the equipment main body of, e.g., a portable computer. Accordingly, the packaging density of electronic components per unit volume further increases.

When the CPU chip is mounted in such an environment, it is difficult to ensure a space for mounting fins. In addition, since many heat generating elements are mounted in the periphery, a mechanical heat dissipation effect cannot be expected. In this case, if an increase in temperature of the CPU chip is left as it is, the CPU itself erroneously operates to cause troubles such as hardware abnormality and circuit destruction, resulting in difficulty in restoration, as a matter of course.

Conventionally, a method is applied in which a temperature fuse or an element for measuring the temperature of the CPU chip is mounted at a position relatively close to the CPU chip, thereby switching the CPU clock in accordance with a temperature detected by the element.

In the conventional temperature control of this type, however, the internal temperature of the CPU chip cannot be directly measured. It must be indirectly measured through a package or a print board, so a change in temperature cannot be rapidly and accurately recognized. For this reason, conventionally, clock switching control must be performed in accordance with a set temperature having a large margin for safety. Therefore, the high-speed performance of the CPU cannot be sufficiently exhibited.

As described above, in the conventional one-chip controller for handling clock and digital signals of the CPU chip or the like, a change in temperature in the chip cannot be rapidly and accurately recognized, and clock switching control must be performed in accordance with a set temperature having a large margin for safety. Therefore, the performance of the CPU cannot be sufficiently exhibited.

In an electronic equipment such as a portable computer mounted with a CPU board, the processing performance (processing speed) is determined by the CPU clock frequency. More specifically, as the clock frequency is raised within a range of a defined threshold clock frequency of the CPU chip, the processing performance increases. However, with a higher processing speed, the power consumption increases in accordance with the clock frequency, and accordingly, the heat generation amount of the CPU chip also increases.

In a portable computer mounted with a CPU board of this type, to sufficiently exhibit the performance of the CPU chip, various types of chip cooling methods/mechanisms for dissipating heat generated in the CPU chip and suppressing an increase in temperature of the CPU chip are proposed and realized.

As a countermeasure for suppressing an increase in temperature of the CPU chip, a method is conventionally applied in which an ambient temperature in the periphery of the CPU chip is detected, and the clock frequency is controlled in accordance with the detection output. More specifically, when the ambient temperature in the periphery of the CPU chip amounts to a set temperature, the CPU clock frequency is lowered. Alternatively, the CPU clock frequency is controlled to be inversely proportional to the ambient temperature in the periphery of the CPU chip.

In the conventional temperature control, however, heat generated by the heat generating portion of the CPU chip is transferred in peripheral air, and the diffused ambient temperature is detected by a temperature sensor to control the clock frequency. With this structure, a relatively large time delay occurs until the heat of the CPU chip is reflected on the CPU clock frequency control. In addition, the accurate temperature of the heat generating portion cannot be detected. Since temperature control cannot be precisely and accurately performed, and a large margin must be ensured for an operating limitation temperature, the CPU chip cannot be operated at an almost threshold frequency. Therefore, conventionally, the performance of the CPU chip cannot be sufficiently used to realize high-speed processing by CPU clock at an almost threshold frequency.

When the temperature of the CPU chip amounts to a high temperature which does not allow continuation of a normal operation, the system operation must be stopped at that point of time. Otherwise, it may cause not only destruction of data which is being processed but also abnormality of hardware or software, resulting in difficultly in restoration.

When a portable computer is mounted in a function expansion unit for expanding the function of the portable computer, the heat dissipation port of the portable computer is closed by the function expansion unit, and the portable computer indirectly receives heat generated in the function expansion unit. For this reason, in a long-time use, the temperature in the housing of the portable computer may abnormally increase depending on the peripheral environment to accordingly cause destruction of data which is being processed or abnormality of hardware.

As described above, in the conventional CPU temperature control means, a relatively large time delay occurs until the temperature of the CPU chip is reflected on the CPU clock control, and highly precise temperature detection cannot be performed. For this reason, CPU chip temperature control cannot be precisely performed, and the performance of the CPU chip cannot be sufficiently used to realize a stable high-speed operation of the CPU chip at an almost threshold frequency.

When the temperature of the CPU chip amounts to a high temperature which does not allow continuation of a normal operation, the system operation must be stopped at that point of time. Otherwise, it may cause not only destruction of data which is being processed but also abnormality of hardware or software, resulting in difficultly in restoration. In addition, when a portable computer is mounted in a function expansion unit for expanding the function of the portable computer, the heat dissipation port of the portable computer is closed by the function expansion unit, and the portable computer indirectly receives heat generated in the function expansion unit. For this reason, in a long-time use, the temperature in the housing of the portable computer may abnormally increase depending on the peripheral environment to accordingly cause destruction of data which is being processed or abnormality of hardware.

SUMMARY OF THE INVENTION

It is an object of the present invention to provide a computer system which allows attachment/detachment of an expansion unit while keeping a computer main body in a power ON state.

It is the second object of the present invention to provide a computer system having a compact and lightweight function expansion unit which can be easily handled and operated and also stably maintain a reliable operation with an economically advantageous structure.

It is the third object of the present invention to provide a one-chip controller capable of rapidly and accurately recognizing a change in temperature in a chip.

It is the fourth object of the present invention to provide an electronic equipment using a one-chip controller, which can rapidly and accurately reflect a change in temperature in the one-chip controller to circuit control in the one-chip controller, thereby efficiently driving and controlling the one-chip controller in a state close to an operating limitation.

It is the fifth object of the present invention to provide a computer system/electronic equipment mounted with a CPU board and having a detachable expansion unit, which can rapidly and accurately reflect the temperature of the CPU chip on chip temperature control and sufficiently use the performance of the CPU chip, thereby realizing a high-speed operation of the CPU chip at an almost threshold frequency.

According to the first aspect of the present invention, there is provided a computer system comprising: a computer having first and second connectors, a bus, and connection control means for enabling/disabling connection between the second connector and the bus; and an expansion unit capable of being attached/detached to/from the computer, wherein the expansion unit has a third connector connectable to the first connector and connected to the first connector when the computer is set at a mounting position of the expansion unit, a fourth connector connectable to the second connector and arranged to be free to move between a first position where the fourth connector is disconnected from the second connector and a second position where the fourth connector is connected to the second connector when the computer is set at the mounting position, at least one expansion connector connected to the fourth connector and capable of being mounted with an expansion device, a loading mechanism for moving the fourth connector between the first position and the second position, and expansion unit control means for outputting a connection request signal for connection between the second connector and the fourth connector to the computer through the third connector when the computer is set at the mounting position, moving the fourth connector from the first position to the second position by driving the loading mechanism in accordance with a permission signal sent from the first connector, and outputting a connection completion signal upon completion of movement of the fourth connector to the second position, the connection control means is set to disable connection between the second connector and the bus in advance, and the computer includes computer control means for outputting the permission signal to the expansion unit through the first connector in accordance with the connection request signal, and controlling the connection control means to enable connection between the second connector and the bus when the computer is in a power ON state upon reception of the connection request signal.

In the computer system the expansion unit includes an eject switch for designating to detach the fourth connector of the expansion unit from the second connector, and means for sending a detachment request signal for detachment of the fourth connector to the computer through the third connector when the eject switch designates to detach the fourth connector from the second connector, moving the fourth connector from the second position to the first position by driving the loading mechanism in accordance with the detachment request signal sent from the computer, and outputting a separation completion signal upon completion of movement of the fourth connector to the first position, and the computer includes means for, when the computer is in a power ON state, controlling the connection control means to enable connection between the second connector and the bus in accordance with the detachment request signal and outputting a detachment permission signal through the first connector.

With this structure, connection of the expansion connector of the expansion unit is informed to the computer main body before actual electrical connection with the system bus of the computer main body. For this reason, even when the user attaches the expansion unit to the computer main body in a power ON state, disadvantages such as destruction of the expansion device such as an option card of the expansion unit are prevented. Therefore, so-called hot docking can be performed. In addition, when the eject switch is turned on by the user, detachment of the expansion unit is informed to the computer main body before the expansion connector of the expansion unit is electrically disconnected from the system bus of the computer main body, and processing such as electrical disconnection between the expansion connector and the system bus is automatically executed. For this reason, hot undocking can be realized in which the user detaches the computer main body in a power ON state from the expansion unit.

According to the second aspect of the present invention, there is provided a computer system comprising: a computer having a first connector, a bus, a second connector connected to the bus, and a nonvolatile memory; and an expansion unit capable of being attached/detached to/from the computer, wherein the expansion unit has a third connector connectable to the first connector and connected to the first connector when the computer is set at a mounting position of the expansion unit, a fourth connector connectable to the second connector and arranged to be free to move between a first position where the fourth connector is disconnected from the second connector and a second position where the fourth connector is connected to the second connector when the computer is set at the mounting position, at least one expansion connector connected to the fourth connector and capable of being mounted with an expansion device, a loading mechanism for moving the fourth connector between the first position and the second position, and expansion unit control means for, when the computer is set at the mounting position, outputting a connection request signal for connection between the second connector and the fourth connector to the computer through the third connector and moving the fourth connector from the first position to the second position by driving the loading mechanism in accordance with a permission signal sent from the first connector, and the computer includes computer control means for, when the computer is in a power ON state, executing suspend processing in which information necessary for resuming processing which is being executed is stored in the nonvolatile memory to interrupt the processing and set a power OFF state in accordance with the connection request signal and thereafter outputting the permission signal to the expansion unit through the first connector.

In the computer system, the expansion unit includes an eject switch for designating to detach the fourth connector of the expansion unit from the second connector, and means for sending a detachment request signal for detachment of the fourth connector to the computer through the third connector when the eject switch designates to detach the fourth connector from the second connector, and moving the fourth connector from the second position to the first position by driving the loading mechanism in accordance with the detachment request signal sent from the computer, and the computer includes means for, when the computer is in a power ON state, executing the suspend processing in accordance with the detachment request signal and outputting a detachment permission signal through the first connector.

With this structure, according to the present invention, connection of the expansion connector of the expansion unit is informed to the computer main body before actual electrical connection with the system bus of the computer main body, and processing such as the power OFF operation of the computer main body is automatically executed. For this reason, even when the user attaches the expansion unit to the computer main body in a power ON state, disadvantages such as destruction of the expansion device such as an option card of the expansion unit are prevented. Therefore, so-called hot docking can be performed. In addition, when the eject switch is operated by the user, detachment of the expansion unit is informed to the computer main body before the expansion connector of the expansion unit is electrically disconnected from the system bus of the computer main body, and processing such as the power OFF operation of the computer main body is automatically executed. For this reason, hot undocking can be realized in which the user detaches the computer main body in a power ON state from the expansion unit.

According to the third aspect of the present invention, there is provided a computer system comprising: a computer; and an expansion unit capable of being attached/detached to/from the computer and constituted by an expansion unit main body and a power supply unit, wherein the power supply unit is connected to the expansion unit main body through a cable and supplies a first power to the expansion unit through the cable, and the expansion unit main body includes at least one expansion connector connectable to an expansion device for expanding a function of the computer, a mounting portion for mounting the computer, and a power supply circuit for supplying an operating power to the expansion device on the basis of the first power supplied from the power supply unit when the computer is mounted at the mounting portion.

In the computer system, the power supply unit has a plurality of power supply outlets, and the expansion unit main body includes means for enabling the plurality of power supply outlets in a predetermined order with predetermined time lags.

In the computer system, the computer includes means for designating to start/stop supplying the first power through the expansion unit main body and the cable when the computer is mounted at the mounting portion. In addition, the expansion unit has a plurality of power supply outlets, and the computer includes means for enabling the plurality of power supply outlets in a predetermined order with predetermined time lags.

With the power ON/OFF sequence control function of the expansion unit main body and the feed/stop sequence control function of the plurality of power supply (AC) outlets, the power ON/OFF operation according to the start/end of operation of the entire system can be facilitated, thereby largely decreasing the work load. At the same time, an erroneous operation caused by a shift of power supply states can be prevented.

According to the fourth aspect of the present invention, there is provided a computer system comprising: a computer; and an expansion unit capable of being attached/detached to/from the computer, wherein the expansion unit includes at least one expansion connector connectable to an expansion device for expanding a function of the computer, a mounting portion for mounting the computer, and a lock mechanism for fixing the computer at a predetermined position of the mounting portion when the computer is mounted at the mounting portion.

Since the expansion unit main body (DS) has the lock mechanism for the mounted portable computer (PC), disadvantages such as data destruction caused by a detaching operation during the operation can be prevented. At the same time, the portable computer (PC) is integrated with the expansion unit main body (DS), thereby obtaining an effect for security.

According to the fifth aspect of the present invention, there is provided a computer system comprising: a computer having a first connector connected to a bus and at least one second connector connectable to an external device; a relay unit connected to the computer and having a third connector connected to the bus which relays the first connector, and at least one fourth connector connectable to the external device which relays the second connector; and at least one expansion unit connectable to the relay unit, wherein the expansion unit has a mounting portion capable of being mounted with an expansion device for expanding a function of the computer, an internal bus connected to the expansion device mounted at the mounting portion, a fifth connector connected to the internal bus, and a sixth connector connectable to either the third connector or the fifth connector of another expansion unit. In the computer system, the first and second connectors are arranged on a rear surface of the computer, the relay unit is mounted on the rear surface of the computer so as to have the third connector on a lower surface and relays the first and second connectors of the computer, and the at least one expansion unit is mounted under the computer and the relay unit to overlap another expansion unit such that the bus of the computer is connected to the expansion device of the expansion unit.

In the computer system with the above structure, a portable computer, a port replicator (relay unit), and a plurality of expansion units can be connected. An additional expansion unit can be easily connected to this computer system, as needed. Therefore, a computer system coping with the requirement of an operator can be flexibly provided.

According to the sixth aspect of the present invention, there is provided an electronic equipment comprising: a processor incorporating a delay circuit element whose delay time changes depending on a temperature; a detection circuit, connected to the delay circuit element, for detecting an internal temperature of the processor from a change in response delay of the delay circuit element; and clock control means for controlling a clock signal supplied to the processor such that an operating speed of the processor is decreased when the internal temperature detected by the detection circuit exceeds a first temperature. The electronic equipment further comprises a nonvolatile memory, and means for causing the nonvolatile memory to store information necessary for resuming processing which is being executed, thereby powering off the electronic equipment when the internal temperature detected by the detection circuit exceeds a second temperature.

According to the seventh aspect of the present invention, there is provided an electronic equipment comprising: a processor for controlling the electronic equipment; a detection circuit for detecting an internal temperature of the processor; and clock control means for controlling a clock signal supplied to the processor such that an operating speed of the processor is decreased when the internal temperature detected by the detection circuit exceeds a first temperature. The electronic equipment further comprises a nonvolatile memory, and suspend means for causing the nonvolatile memory to store information necessary for resuming processing which is being executed, thereby powering off the electronic equipment when the internal temperature detected by the detection circuit exceeds a second temperature. In addition, the electronic equipment further comprises a fan for exchanging air in the periphery of the processor, a driving circuit for driving the fan, and means for controlling the driving circuit to cool the air in the periphery of the processor in accordance with the internal temperature detected by the detection circuit.

According to this structure, a one-chip controller capable of rapidly and accurately recognizing a change in temperature in the chip can be provided. In addition, a change in temperature in the one-chip controller can be rapidly and accurately reflected on circuit control in the one-chip controller, thereby efficiently driving and controlling the one-chip controller in a state close to an operating limitation. Therefore, in the computer system using the one-chip controller, optimal temperature control can be executed.

According to the eighth aspect of the present invention, there is provided a computer system comprising: a computer having a processor for controlling the entire computer; an expansion unit used to expand a function of the computer and capable of being attached/detached to/from the computer; and a sensor for detecting a temperature of the processor, wherein the expansion unit includes a fan for exchanging air in the periphery of the processor, a driving circuit for driving the fan, and control means for appropriately setting the temperature of the processor by controlling the driving circuit in accordance with the temperature detected by the sensor.

According to this structure, air heated by a heat generating portion in the portable computer is drawn on the deskstation side, or cooled air is blown from the deskstation side, thereby enabling appropriate temperature control. Therefore, the performance of the CPU chip can be sufficiently used to realize a high-speed operation of the CPU chip at an almost threshold frequency. In addition, since the fan is arranged on the deskstation side, the size of the portable computer can be further reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram showing the configuration of the computer system of the first embodiment;

FIGS. 6A and 6B are views for explaining an operation of connecting the portable computer to the deskstation in the computer system of the first embodiment, in which FIG. 6A shows a state shift in connection, and FIG. 6B is a flow chart for explaining communication between the CPU of the portable computer, a power supply controller, and the deskstation controller of the deskstation in connection;

FIGS. 7A and 7B are views for explaining an operation of detaching the portable computer from the deskstation in the computer system of the first embodiment, in which FIG. 7A shows a state shift in detachment, and FIG. 7B is a flow chart for explaining communication between the CPU of the portable computer, the power supply controller, and the deskstation controller of the deskstation in detachment;

FIG. 8 is a block diagram showing the configuration of a computer system according to the second embodiment of the present invention;

FIG. 10 is a flow chart for explaining communication between the CPU of the portable computer, the power supply controller, and the deskstation controller of the deskstation when the portable computer is detached from the deskstation in the computer system of the second embodiment;

FIG. 21 is a perspective view showing the outer appearance of the computer system shown in FIG. 20;

FIG. 22 is a block diagram showing the configuration of a system according to the fourth embodiment of the present invention;

FIG. 24 is a chart showing a relationship between various set temperatures in the fourth embodiment and a detected temperature, and timings of control;

FIG. 25 is a chart showing a relationship between various set temperatures in the fourth embodiment and a detected temperature, and timings of control;

FIGS. 30A and 30B are timing charts for explaining clock retardation control in the fourth embodiment;

FIGS. 31A and 31B are timing charts for explaining clock stop control in the fourth embodiment;

FIGS. 32A to 32C are timing charts for explaining HALT control in the fourth embodiment;

FIGS. 33A and 33B are views showing the first example of a computer system according to the fifth embodiment of the present invention, in which FIG. 33A is a perspective view showing the outer appearance of the computer system, and FIG. 33B is a block diagram showing the configuration of the computer system;

FIGS. 34A and 34B are views showing the second example of the computer system according to the fifth embodiment of the present invention, in which FIG. 34A is a perspective view showing the outer appearance of the computer system, and FIG. 34B is a block diagram showing the configuration of the computer system;

FIG. 35 is a view showing a mounting example (first variation) of a sensor in the fifth embodiment;

FIG. 36 is a view showing a mounting example (second variation) of the sensor in the fifth embodiment;

FIG. 37 is a view showing a mounting example (third variation) of the sensor in the fifth embodiment;

FIG. 38 is a view showing a mounting example (fourth variation) of the sensor in the fifth embodiment;

FIG. 39 is a view for explaining a structure when the mounting example shown in FIG. 35 is applied to the fourth embodiment;

FIG. 40 is a view for explaining a structure when the mounting example shown in FIG. 36 is applied to the fourth embodiment;

FIG. 41 is a view for explaining a structure when the mounting example shown in FIG. 37 is applied to the fourth embodiment;

FIG. 42 is a view for explaining a structure when the mounting example shown in FIG. 38 is applied to the fourth embodiment;

FIG. 43 is a block diagram for explaining a modification of the fifth embodiment;

FIG. 44 is a block diagram for explaining a modification of the fifth embodiment;

FIG. 45 is a view showing the outer appearance of a control key used in password registration/deletion processing of lock mechanism control in the third embodiment.

DETAILED DESCRIPTION OF THE PREFERRED EMBODIMENTS

Each embodiment according to the present invention will be described below with reference to the accompanying drawings.

Figure 1:
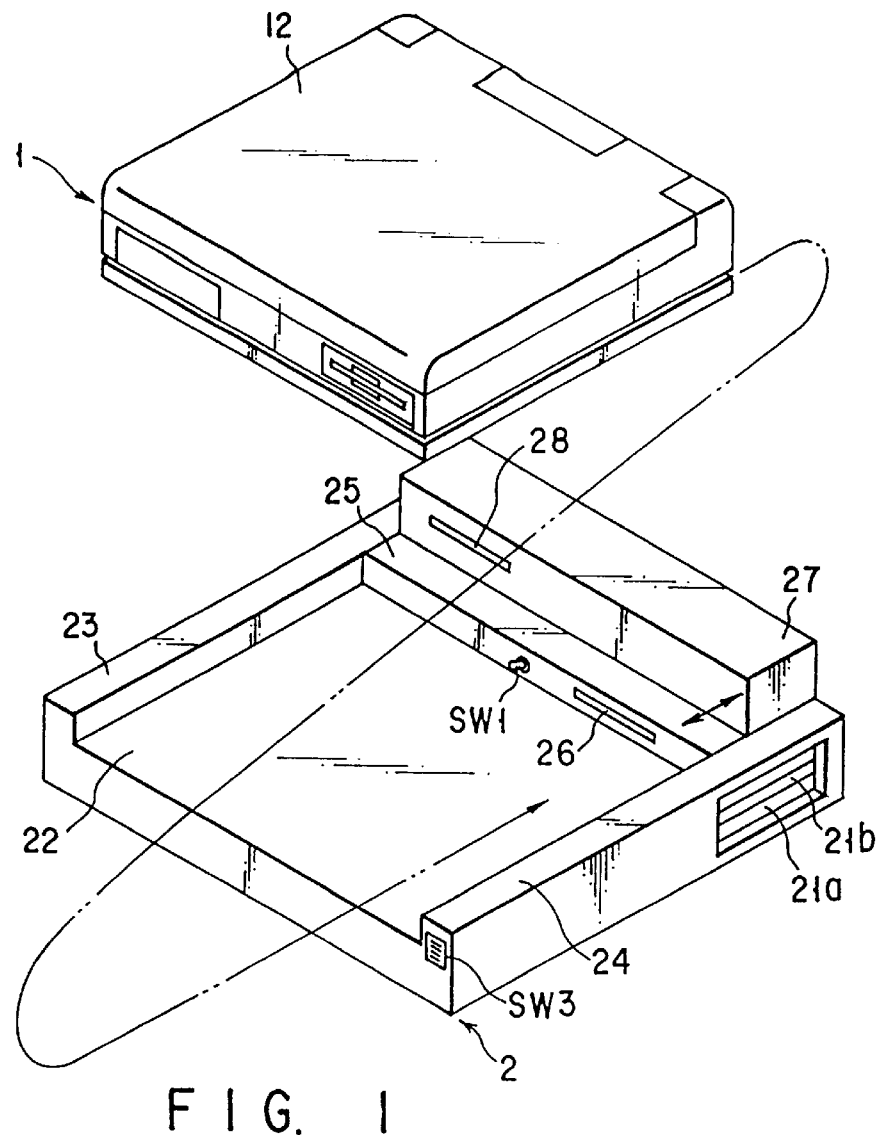
FIG. 1 is a perspective view showing the outer appearances of a portable computer and a deskstation, which constitute a computer system according to the first embodiment of the present invention.

FIG. 1 is a perspective view showing the outer appearance of a computer system according to the first embodiment of the present invention. This computer system is constituted by a portable computer 1 and a deskstation 2. The portable computer 1 is a portable computer of a laptop or notebook type. The deskstation 2 is an expansion unit detachably connected to the main body of the portable computer 1.

The portable computer 1 has a flat panel display unit 12 which is attached to the main body of the portable computer 1 to be free to pivot between an opening position and a closing position. The flat panel display unit 12 at the closing position covers the main body of the portable computer 1, as shown in FIG. 1. At the opening position, the flat panel display unit 12 stands at the rear portion of the main body of the portable computer 1.

The deskstation 2 is used to expand the function of the main body of the portable computer 1. The housing of the deskstation 2 accommodates a device for expanding the function of the portable computer 1, e.g., a CD-ROM drive or a hard disk drive. The deskstation 2 also has slots with expansion connectors 21a and 21b for connecting various option cards.

An eject switch SW3 which is operated to eject the mounted portable computer 1 is arranged on the front surface of the housing of the deskstation 2. The housing of the deskstation 2 also has a flat mounting surface 22 for accommodating the main body of the portable computer 1. This mounting surface 22 has almost the same size as that of the bottom surface of the main body of the portable computer 1. Guide portions 23 and 24 for guiding the main body of the portable computer 1 to the mounting position are formed at the left and right end portions of the mounting surface 22. A first connector unit 25 is arranged at the rear end portion of the mounting surface 22. The front surface of the first connector unit 25 is brought into contact with the rear surface of the portable computer 1 when the main body of the portable computer 1 is set at the mounting position.

A communication connector 26 and a detection switch SW1 are arranged on the front surface of the first connector unit 25. The communication connector 26 is used for communication between the portable computer 1 and the deskstation 2 and connected to a corresponding connector arranged on the rear surface of the main body of the portable computer 1 when the main body of the portable computer 1 is set at the mounting position. The detection switch SW1 mechanically detects whether the main body of the portable computer 1 is set at the mounting position. More specifically, when the main body of the portable computer 1 is set at the mounting position, the switch SW1 is depressed by the rear surface of the main body of the portable computer 1 and turned on to generate a pulse. As the detection switch SW1, an armature is preferably used.

A second connector unit 27 is movably arranged on the upper surface of the first connector unit 25. The second connector unit 27 is moved between the rear and front end portions of the first connector unit 25 by a driving mechanism including a motor and the like, as indicated by an arrow. Normally, the second connector unit 27 is fixed at the rear end portion of the first connector unit 25, as shown in FIG. 1, and moved to the front end portion of the first connector unit 25 upon setting the main body of the portable computer 1 to the mounting position.

A connector 28 is arranged on the front surface of the second connector unit 27. The connector 28 is used to connect various expansion devices in the expansion unit to the system bus of the portable computer 1. The connector 28 is connected to a corresponding connector arranged on the rear surface of the main body of the portable computer 1 when the second connector unit 27 is moved to the front end portion of the first connector unit 25.

When the main body of the portable computer 1 is to be set on the deskstation 2, the user fits the rear portion of the main body of the portable computer 1 between the guide portions 23 and 24 on the front surface of the deskstation 2, as indicated by an arrow in FIG. 1, thereby mounting the portable computer 1 on the mounting surface 22. When the main body of the portable computer 1 is pushed by the user, the main body of the portable computer 1 is slid on the mounting surface 22 along the guide portions 23 and 24 toward the first connector unit 25, thereby setting the main body of the portable computer 1 to the mounting position where the rear surface of the portable computer 1 contacts the front surface of the first connector unit 25.

Figure 2:
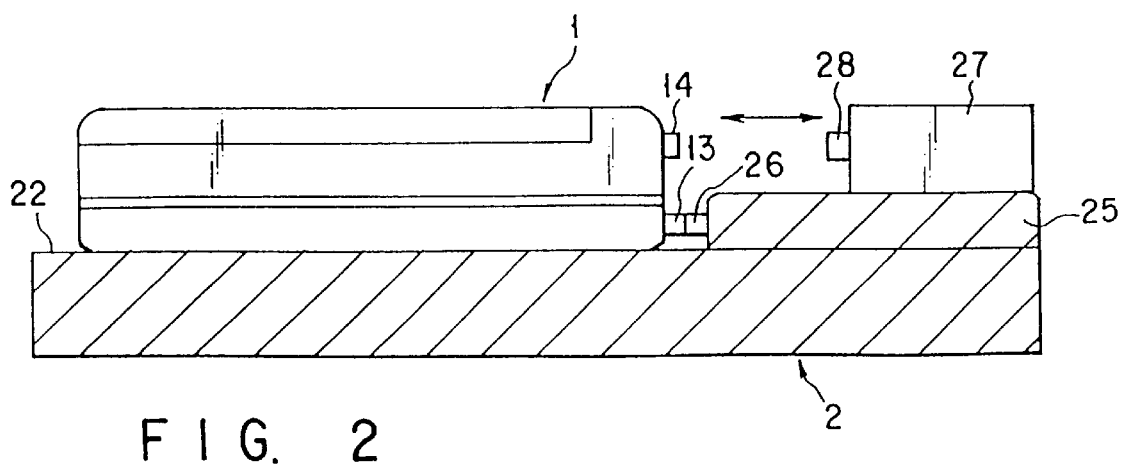
FIG. 2 is a view for explaining a set state of the computer system shown in FIG. 1.

At this time, the detection switch SW1 is turned on. In accordance with a pulse generated upon turning on the switch SW1, the deskstation 2 recognizes setting of the main body of the portable computer 1. While the main body of the portable computer 1 is set on the deskstation 2, only the communication connector 26 of the deskstation 2 and a communication connector 13 of the portable computer 1 are connected to each other, as shown in FIG. 2. At this time, the connector 28 of the deskstation 2 is separated from an expansion connector 14 of the portable computer 1.

The deskstation 2 communicates with the portable computer 1 in response to the ON operation of the detection switch SW1. This communication is performed to inform the portable computer 1 of docking of the deskstation 2. A connection request is sent from the deskstation 2 to the portable computer 1 through the communication connectors 26 and 13. The portable computer 1 performs processing necessary for docking the deskstation 2 in response to the connection request. Thereafter, upon reception of a connection permission signal from the portable computer 1, the deskstation 2 executes an auto loading operation to move the second connector unit 27 to the front end portion of the first connector unit 25, thereby docking, i.e., connecting the connector 28 of the deskstation 2 to the expansion connector 14 of the portable computer 1.

As described above, in this computer system, before the connector 28 of the deskstation 2 is connected to the expansion connector 14 of the portable computer 1, the communication connector 26 of the deskstation 2 is connected to the communication connector 13 of the portable computer 1 to perform communication between the deskstation 2 and the portable computer 1. With this operation, the portable computer 1 can execute processing necessary for docking the deskstation 2 before the bus of the portable computer main body is connected to the deskstation 2.

FIG. 3 is a block diagram showing the system configuration of the computer system.

A CPU (Central Processing Unit) 111, a system controller 112, and a main memory 113 are arranged on the system board of the portable computer 1. The CPU 111 and the main memory 113 are connected to a CPU local bus 114 including a data bus with a 32-bit width. The CPU local bus 114 is connected to an ISA (Industrial Standard Architecture) system bus 115 including a data bus with a 16-bit width through the system controller 112. The system bus 115 is connected to the expansion connector 14 through a dock-control gate array (DOCK-CONT GA) 125.

In addition, various I/Os such as a BIOS ROM (Basic Input/Output System Read-Only Memory) 116, a deskstation interface (DS I/F) 117, an interrupt controller (PIC) 118, a system timer (PIT) 119, a real-time clock (RTC) 120, and a keyboard controller (KBC) 121, a power supply (PS) 122, a power supply (PS) controller 123, and the dock-control gate array (DOCK-CONT GA) 125 are arranged on the system board.

The deskstation interface (DS I/F) 117 is a communication unit provided for communication with the deskstation 2 and connected to the communication connector 13. The deskstation interface 117 is also connected to the system bus 115 for communication with the CPU 111 and at the same time connected to the power supply controller 123 for communication with the power supply controller (PS controller) 123. A hardware interrupt signal is used for communication from the deskstation interface 117 to the CPU 111. As the hardware interrupt signal, system management interrupt called an SMI is preferably used due to the following reason. The SMI is a non-maskable interrupt with a priority higher than that of INTR or NMI (Non-Maskable Interrupt), which can cause the CPU 111 to execute a predetermined SMI service routine without influencing an application program which is being executed.

The deskstation interface 117 is backed up by a backup power supply BK from the power supply 122 so that it can communicate with the deskstation 2 even in the power OFF state of the portable computer 1. The deskstation interface 117 has a hardware structure to perform processing according to the power ON/OFF state of the main body of the portable computer 1 in accordance with a dock request command (to be described later).

The power supply controller 123 controls the power supply 122 and performs the ON/OFF operation of the portable computer 1 in accordance with the ON/OFF state of a power supply switch (P-SW1). The power supply controller 123 is backed up by the backup power supply BK and always set in an operative state even in the power OFF state of the portable computer 1 to perform predetermined processing. More specifically, the power supply controller 123 performs a certain operation as far as a battery 125 is loaded in the computer main body, or an AC power supply is connected to an AC adaptor 124. In addition, the power supply 122 outputs a voltage VCC of +5 V when the portable computer 1 is in a power ON state. The voltage VCC is applied to the various constituent elements and at the same time to the connector 13. When the connector 13 is connected to the connector 26 of the deskstation 2, the voltage VCC is applied to a deskstation controller (DS controller) 211.

The dock-control gate array 125 controls connection between the system bus 115 and the expansion connector 14 on the basis of a designation from the CPU 111. When the portable computer 1 is not connected to the deskstation 2, the dock-control gate array 125 is disabled. For this reason, the system bus 115 and the expansion connector 14 are not connected.

The deskstation 2 also has the deskstation controller 211, an EEPROM (Electrically Erasable Programmable Read-Only Memory) 212, an auto loading mechanism 213, and a power supply unit 214 in addition to the above-described expansion connectors 21a and 21b.

The deskstation controller 211 controls communication with the portable computer 1, and the auto loading control mechanism 213. Detection signals from the three detection switches SW1 to SW3 are supplied to the deskstation controller 211. The detection switch SW1 detects that the portable computer 1 is set at the mounting position of the deskstation 2, i.e., that the communication connectors 13 and 26 are connected to each other. The detection switch SW2 detects that the second connector unit 27 is moved to dock the portable computer 1 with the deskstation 2, i.e., that the expansion connectors 14 and 28 are connected to each other. The detection switch SW2 is a mechanical switch arranged in a driving mechanism for moving the second connector unit 27 and turned on when the second connector unit 27 reaches the mounting position of the portable computer 1. As the detection switch SW2, a photosensor or the like can be used. The detection switch SW3 is an eject switch which is operated by the user to detach the portable computer 1 from the deskstation 2. The eject switch SW3 is arranged on the front surface of the main body of the deskstation 2. Instead of using the switch SW1, a predetermined pin of the connector 13 is pulled up on the portable computer 1 side, or a predetermined pin of the connector 26 is pulled up on the deskstation 2 side. In this case, connection between the connectors 13 and 26 can be detected by monitoring the voltage of the pin.

The voltage VCC is applied to the deskstation controller 211 when the portable computer 1 is in a power ON state, and the connectors 13 and 26 are connected to each other. More specifically, when the connectors 13 and 26 are connected to each other, the deskstation controller 211 can determine whether the portable computer 1 is in a power ON state by monitoring the voltage VCC.

The auto loading control mechanism 213 controls movement of the second connector unit 27 in accordance with a designation from the deskstation controller 211. The attribute information of the deskstation 2 and the like are stored in the EEPROM 212. The power supply unit 214 is constituted by two power supply units PS1 and PS2 and controls power supply to each unit of the deskstation 2 in accordance with the docking/undocking operation of the portable computer 1 or the ON/OFF operation of a power supply switch (P-SW2). The power supply switch (P-SW2) is a switch for receiving a designation of the ON/FF operation of the main body of the portable computer 1 and the deskstation 2 when the portable computer 1 is docked with the deskstation 2. The power supply switch (P-SW2) is arranged because the power supply switch (P-SW1) of the main body of the portable computer 1 cannot be physically operated while the portable computer 1 is docked with the deskstation 2. Power supply voltages P1 (+5 V and +12 V) output from the power supply unit PS1 are output in accordance with connection of an AC power supply. Power supply voltages P2 (3.3 V, +5 V, and +12 V) output from the power supply unit PS2 are set in a wait state until the expansion connector 28 of the deskstation 2 is connected to the expansion connector 14 of the portable computer 1, even when the power supply switch (P-SW2) is turned on.

The power supply voltages P1 are applied to the deskstation controller 211, the EEPROM 212, and the auto loading control mechanism 213. On the other hand, the power supply voltages P2 are applied to the expansion connectors 21a and 21b.

Various option cards 216 and 217 are connected to the expansion connectors 21a and 21b. When the deskstation 2 is docked with the portable computer 1, i.e., when the expansion connectors 14 and 28 are connected to each other, the expansion connectors 21a and 21b are connected to the system bus 115 of the portable computer 1 through an internal bus 218, the connectors 28 and 14, and the dock-control gate array 125.

Figure 4:
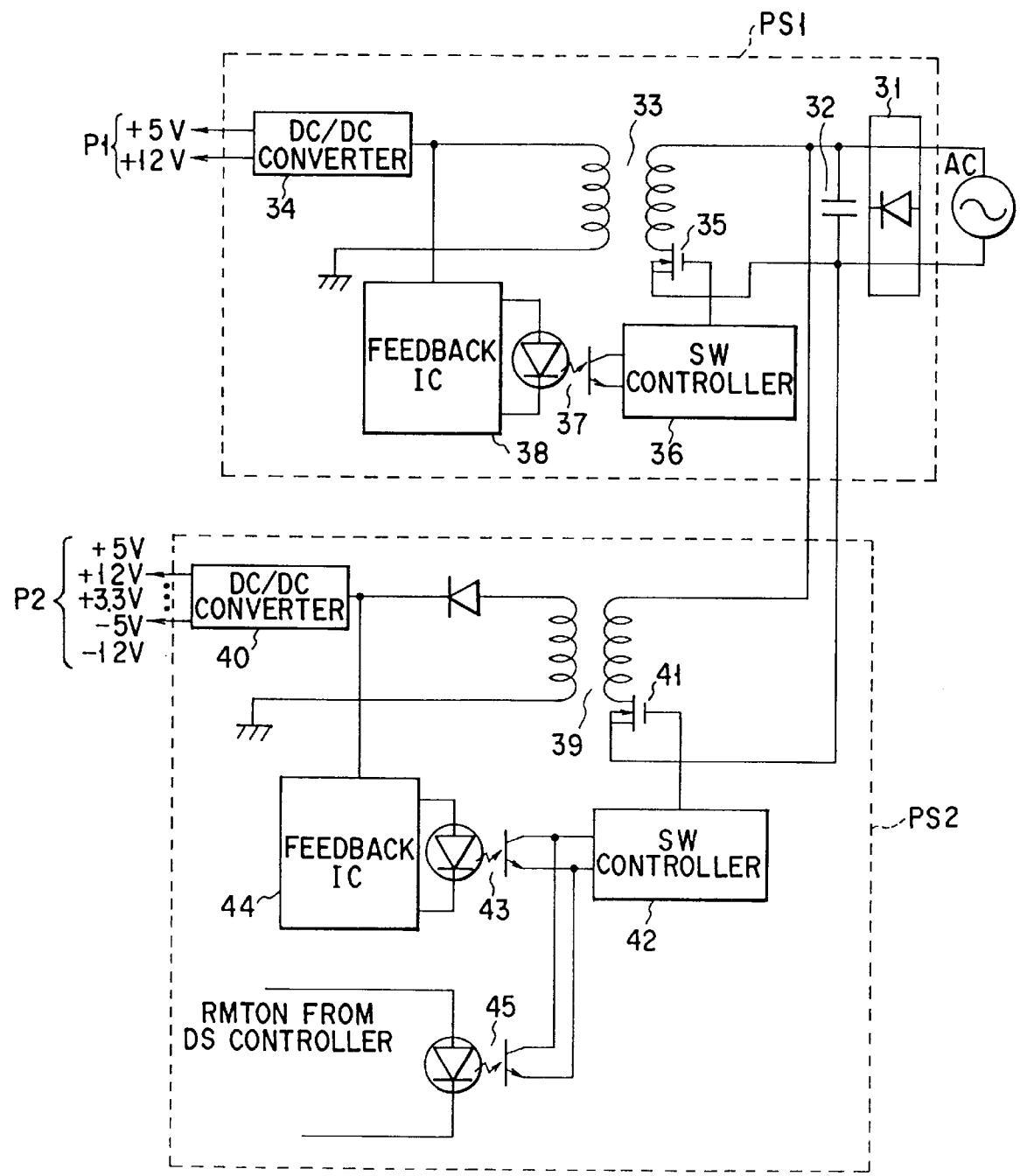
FIG. 4 is a block diagram showing the circuit arrangement of a power supply unit shown in FIG. 3.

FIG. 4 is a block diagram showing the arrangement of the power supply units PS1 and PD2. The power supply unit PS1 rectifies an AC power supplied from the AC power supply into a DC power by a rectifier 33 through a diode 31 for reverse-current prevention and a capacitor 32. The rectified DC power is converted into DC voltages of +5 V and +12 V by a DC/DC converter 34 and output. At this time, in the power supply unit PS1, voltage feedback control is performed by a switching circuit 35 constituted by an FET (Field Effect Transistor), an SW controller 36, a photo-switching circuit 37, and a feedback IC 38. With this operation, output voltages are maintained at predetermined levels. With the above arrangement, the power supply unit PS1 outputs the voltages P1 in accordance with connection of the deskstation 2 to the AC power supply and the start of supply of the AC power.

The power supply unit PS2 receives an AC power through the diode 31 and the capacitor 32 of the power supply unit PS1. The received AC power is converted into a DC power by a rectifier 39 and supplied to a DC/DC converter 40 through a diode. The DC/DC converter 40 converts the received AC power into DC voltages of ±5 V, ±12 V, and 3.3 V and outputs them. At this time, as in the power supply unit PS1, voltage feedback control is performed by a switching circuit 41, an SW controller 42, a photoswitching circuit 43, and a feedback IC 44, thereby maintaining stable output of the DC voltages. A photoswitching circuit 45 turned on/off in accordance with an RMTON signal sent from the deskstation controller 211 is arranged in the power supply unit PS2. The SW controller 42 controls the FET switching circuit 41 in accordance with the ON/OFF operation of the photoswitching circuit 45.

With this operation, the power supply unit PS2 outputs/stops the output voltages P2 in accordance with the RMTON signal from the deskstation controller 211. More specifically, even when the deskstation 2 is connected to the AC power supply, and supply of the AC power is started, the voltages P2 are not output until the RMTON signal is supplied from the deskstation controller 211.

Figure 5:
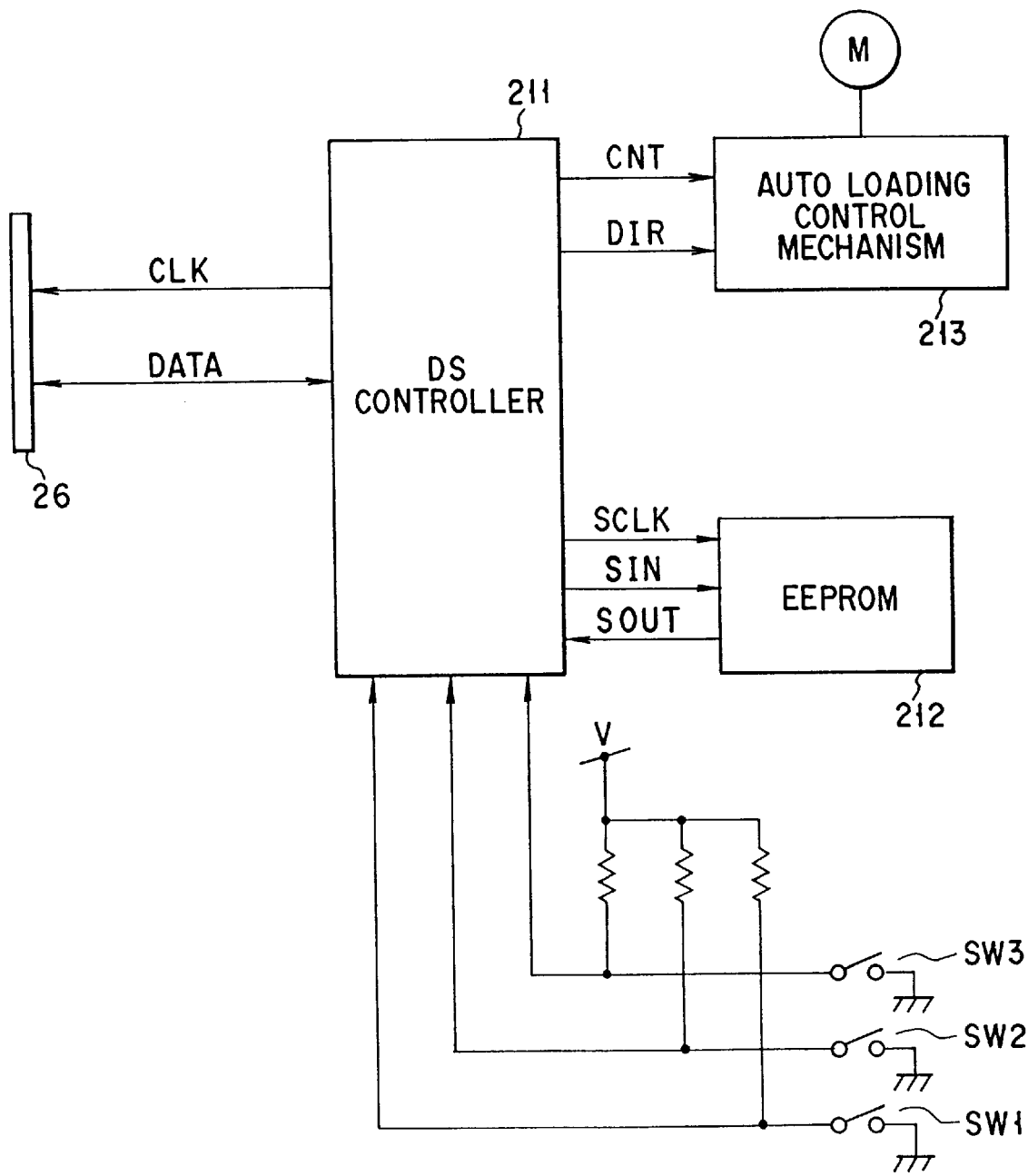
FIG. 5 is a circuit diagram for explaining signals related to a deskstation controller shown in FIG. 3.

FIG. 5 is a circuit diagram showing the circuit arrangement in the periphery of the deskstation controller 211.

The deskstation controller 211 generates control signals CNT and DIR for designating drive/stop of a motor (M) and the rotational direction of the motor (M), respectively, thereby controlling the auto loading control mechanism 213. As an interface between the deskstation controller 211 and the EEPROM 212, a serial interface constituted by a serial clock SCLK, a serial data input SIN, and a serial data output SOUT are used, as shown in FIG. 5. In this case, in a data write mode, serial data of the serial data input SIN is written in the EEPROM 212 in synchronism with the serial clock SCLK in the order of addresses. In a data read mode, data is read out from the EEPROM 212 as the serial data output SOUT in synchronism with the serial clock SCLK in the order of addresses.

Figure 6A:
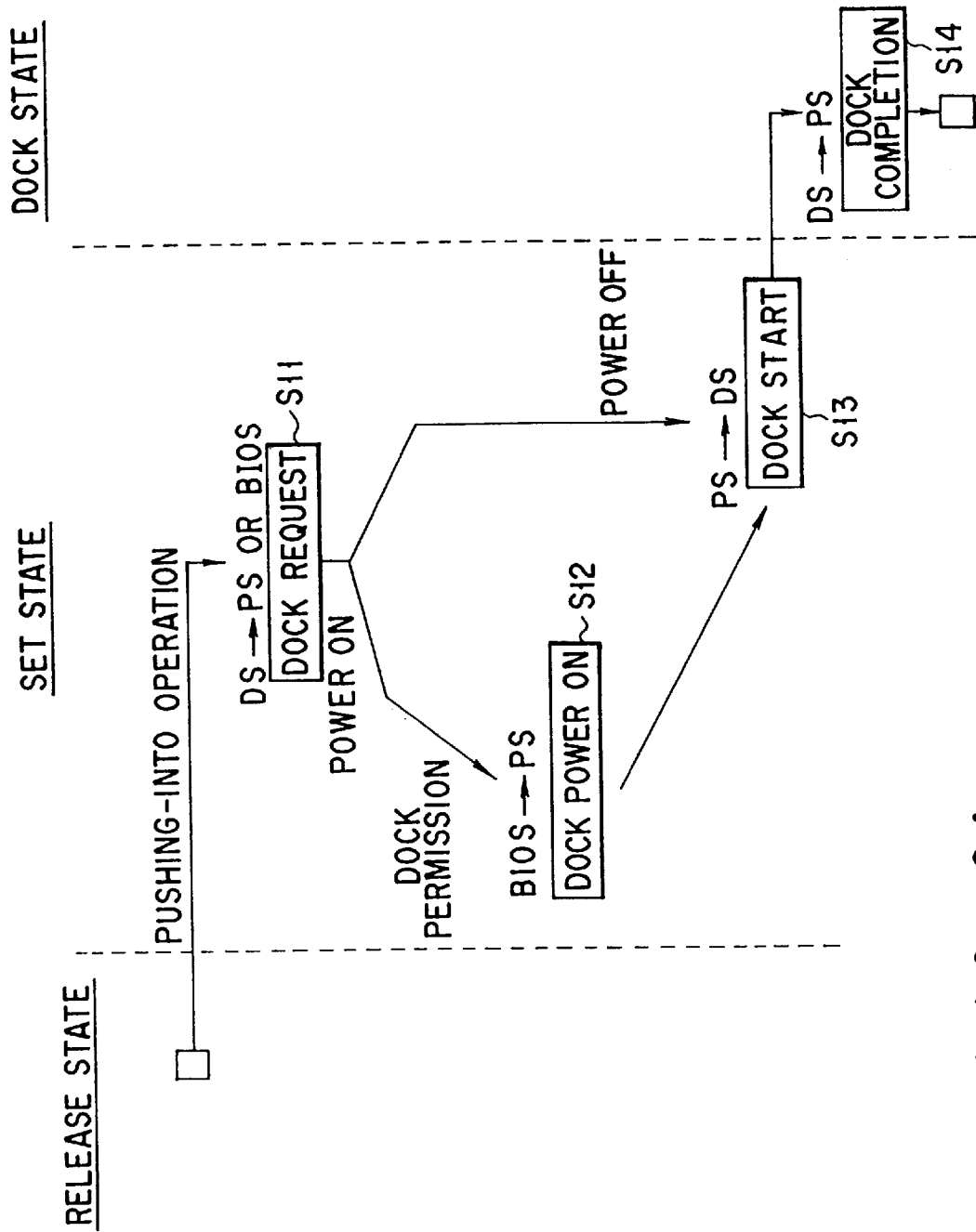

The entire operation of docking the deskstation 2 with the portable computer 1 will be described below with reference to FIGS. 6A and 6B.

In this computer system, three states are set, i.e., a release state in which the portable computer 1 is detached from the deskstation 2; a set state in which the portable computer 1 is set at the mounting position of the deskstation 2 while only the communication connectors 13 and 26 are connected to each other; and a dock state in which the connectors 13 and 26 are connected to each other while the expansion connectors 14 and 28 are connected to each other by an auto loading operation.

When the portable computer 1 is to be docked with the deskstation 2, the state is sequentially shifted in the order of the release state, the set state, and the dock state. This state shift is shown in FIG. 6A. The dock-control gate array 125 of the portable computer 1 is disabled when the portable computer 1 is not connected to the deskstation 2.

The main body of the portable computer 1 is fitted between the guide portions 23 and 24 of the deskstation 2 by the user, and the main body 1 is further pushed and set at the mounting position. At this time, the system is shifted from the release state to the set state.

In the set state, communication between the power supply controller 123 and the deskstation controller 211 is performed through the connectors 13 and 26. This communication is performed as 2-bit serial communication. The deskstation controller 211 outputs a dock request command in response to the ON operation of the switch SW1 (step S11).

If the portable computer 1 is in a power ON state at the time of shift from the release state to the set state, an SMI is issued in accordance with setting of the dock request command. The CPU 111 issues a dock power ON command to the power supply controller 123 in response to the SMI (step S12). At this time, the dock-control gate array 125 is disabled, so the system bus 115 is not connected to the expansion connector 14. The power supply controller 123 outputs a dock start command to the deskstation controller 211 in response to the dock power ON command (step S13).

If the main body of the portable computer 1 is in a power OFF state, the power supply controller 123 outputs a dock start command to the deskstation controller 211 in accordance with the dock request command (step S13).

Upon reception of the dock start command, the deskstation controller 211 performs docking (loading) processing, i.e., connection processing of the expansion connector 14 and the connector 28 (step S14). Thereafter, the deskstation controller 211 issues a dock completion command representing completion of the loading processing. If the portable computer 1 is in a power ON state, the CPU 111 enables the dock-control gate array 125 in accordance with setting of the dock completion command. With this operation, the system bus 115 and the expansion connector 14 are connected to each other. If the docking processing is performed while the portable computer 1 is in a power ON state, the deskstation controller 211 enables the power supply unit PS2, thereby applying the voltages P2 to the expansion connectors 21*a* and 21*b*. With this operation, disadvantages caused by insertion/removal of a live line can be eliminated.

The docking operation will be described below in detail with reference to FIG. 6B as a flow chart showing the processing of the CPU 111 of the portable computer main body 1, the power supply controller 123, and the deskstation controller 211.

When the portable computer 1 is to be connected to the deskstation 2, the main body of the portable computer 1 is fitted between the guide portions 23 and 24 of the deskstation 2 by the user, and the main body of the portable computer 1 is further pushed and set at the mounting position. With this operation, the system is shifted from the release state to the set state. When the set state is set, the detection switch SW1 is turned on. The deskstation controller 211 detects the ON state of the switch SW1 (receives a pulse), thereby recognizing that the portable computer 1 is set on the deskstation 2.

The deskstation controller 211 issues a dock request command in response to the ON operation of the detection switch SW1 (step A1). The dock request command is issued to inquire the portable computer 1 whether the set state can be changed to the dock state and set to the communication register of the deskstation interface 117 through connection between the connectors 26 and 13.

If the portable computer 1 is in a power ON state, the deskstation interface 117 issues an SMI to the CPU 111 in accordance with setting of the dock request command. With this operation, control is shifted to a system BIOS. The system BIOS determines whether the command set in the deskstation interface 117 is a dock request command (step A3). Upon recognizing that the command set in the deskstation interface 117 is a dock request command (YES in step A3), the system BIOS informs the operating system that the docking operation of the deskstation 2 is to be performed. If no dock request command is set (NO in step A3), the system BIOS performs other processing in the SMI processing.

If a change in system environment by connection of the deskstation 2 does not pose any problem, the operating system informs the system BIOS that the docking operation can be performed. The system BIOS issues a dock power ON command in response to the information (step A5). The dock power ON command is a command for permitting docking sent to the power supply controller 123 through the communication register of the deskstation interface 117.

Upon reception of the dock power ON command, the power supply controller 123 issues a dock start command to the deskstation controller 211 (steps A7 and A9). The dock start command is a permission response to the dock request command and sent to the deskstation controller 211 through the register of the deskstation interface 117.

If the portable computer 1 is in a power OFF state, the dock request command is sent to the power supply controller 123 through the deskstation interface 117 (step A11). The power supply controller 123 issues a dock start command to the deskstation controller 211 in response to the dock request command (step A13). If the dock request command is received during a power OFF sequence, the power supply controller 123 issues the dock start command upon completion of the power OFF sequence. The dock start command is sent to the deskstation controller 211 through the register of the deskstation interface 117.

Upon reception of the dock start command (step A15), the deskstation controller 211 controls the auto loading control mechanism 213 to execute a loading operation, thereby connecting the connector 28 and the expansion connector 14 (step A17).

When the connectors 28 and 14 are connected to each other, i.e., when docking is completed (YES in step A19), the detection switch SW2 is turned on. In response to the ON operation of the detection switch SW2, the deskstation controller 211 controls the auto loading control mechanism 213 to stop the auto loading operation and at the same time issues a dock completion command (step A21). The dock completion command represents completion of docking between the portable computer 1 and the deskstation 2 and set in the communication register of the deskstation interface 117 through the connectors 26 and 13.

Thereafter, the deskstation controller 211 determines whether the voltage VCC is applied from the portable computer 1 (step A23). More specifically, the deskstation controller 211 determines the presence/absence of application of the voltage VCC, thereby determining whether the portable computer 1 is in a power ON or OFF state. If the voltage VCC is detected (YES in step A23), the deskstation controller 211 outputs the RMTON signal to the power supply unit PS2 to enable the power supply unit PS2 (step A25). If the voltage VCC is not detected (NO in step A23), other processing is performed.

The dock completion command issued in step A21 is set in the communication register of the deskstation interface 117 through the connectors 13 and 26. If the portable computer 1 is in a power ON state, the deskstation interface 117 issues an SMI to the CPU 111 in response to setting of the dock completion command. With this operation, control is shifted to the system BIOS. The system BIOS determines whether the command set in the deskstation interface 117 is a dock completion command (step A27). Upon recognizing that the command set in the deskstation interface 117 is a dock completion command (YES in step A27), the dock-control gate array 125 is enabled (step A29). With this operation, the system bus 115 of the portable computer 1 and the internal bus 218 of the deskstation 2 are connected to each other. If the command set in the deskstation interface 117 is not a dock completion command (NO in step A27), other processing in the SMI routine is executed. The dock-control gate array 125 is controlled to be enabled after the power supply unit PS2 is enabled, and the power supply voltages P2 are applied to the expansion connectors 21a and 21b.

If the portable computer 1 is in a power OFF state when the dock completion command issued in step A21 is set to the deskstation interface 117, the command is sent to the power supply controller 123. The power supply controller 123 performs predetermined processing in the power OFF state of the portable computer 1 without performing special processing according to reception of the dock completion command (step A31).

With the above processing, communication between the portable computer 1 and the deskstation 2 is performed before the portable computer 1 and the deskstation 2 are connected through the bus. When the user sets the portable computer 1 in a power ON state on the deskstation 2, the power supply unit PS2 and the dock-control gate array 125 are enabled such that docking between the expansion connectors 21a and 21b of the portable computer 1 and the deskstation 2 can be performed in a power ON state. With this operation, disadvantages such as an erroneous operation of the portable computer 1 and destruction of the option card of the deskstation 2 can be prevented. In addition, if the portable computer 1 in a power OFF state is set on the deskstation 2, the expansion connector 14 and the connector 28 are connected to each other while the power supply unit PS2 of the deskstation 2 is kept disabled. Therefore, when one of the portable computer 1 and the deskstation 2 is in a power ON state and the other is in a power OFF state, they are not connected to each other. Only when both the portable computer 1 and the deskstation 2 are in a power ON or OFF state, the expansion connector 14 and the connector 28 are connected to each other.

If the docking operation of the portable computer 1 is completed in a power OFF state, the ON operation of the computer 1 and the deskstation 2 is performed by operating the power supply switch (P-SW2) of the deskstation 2. Although two SMI routines are described in the processing routine of the CPU 111 in FIG. 6B, this description has been made to promote understanding of communication between the portable computer 1 and the deskstation 2. Only one routine is originally needed.

The procedures for the docking operation of the portable computer 1 and the deskstation 2 have been described above. In undocking processing for detaching the portable computer 1 from the deskstation 2 as well, a similar communication is executed between the portable computer 1 and the deskstation 2. In this case, the communication is performed to prevent an erroneous operation of the portable computer 1 when the portable computer 1 in a power ON state is detached from the deskstation 2 (hot eject).

The undocking operation in which the portable computer 1 is detached from the deskstation 2 will be described below with reference to FIGS. 7A and 7B.

When the portable computer 1 is to be undocked from the deskstation 2, the state is sequentially shifted in an order of the dock state, the set state, and the release state. This state shift is shown in FIG. 7A.

In the dock state, when the eject switch SW3 provided to the deskstation 2 is depressed by the user, the deskstation controller 211 detects the ON operation of the switch SW3. The deskstation controller 211 outputs an eject request command through the connectors 13 and 26 (step S21).

If the portable computer 1 is in a power ON state, the CPU 111 determines in accordance with the eject request command whether eject processing can be executed. If communication with external equipment is being performed through a LAN (Local Area Network) or the like, the eject request command is ignored (ABORT). If the eject processing poses no problem, the CPU 111 disables the dock-control gate array 125 and then sends an eject power OFF command to the power supply controller 123 to permit a power OFF operation (step S21). The power supply controller 123 issues an eject start command in accordance with this designation (step S22).

If the portable computer 1 is in a power OFF state, the eject request command is sent to the power supply controller 123. The power supply controller 123 outputs an eject start command to the deskstation controller 211 in accordance with the eject request command (step S22).

The deskstation controller 211 disables the power supply unit PS2 in accordance with the eject start command and controls the auto loading control mechanism 213 to perform eject processing. With this processing, the expansion connectors 14 and 28 are disconnected from each other, and the computer system is shifted from the dock state to the set state. With this operation, disadvantages caused by insertion/removal of a live cable can be eliminated.

The above-described undocking operation will be described in detail with reference to FIG. 7B as a flow chart showing the processing of the CPU 111 of the portable computer 1, the power supply controller 123, and the deskstation controller 211.

When the eject switch SW3 provided to the deskstation 2 is depressed by the user in the dock state, the deskstation controller 211 detects the ON operation of the switch SW3 and issues an eject request command to the portable computer 1 (step B1). The eject request command is a command for informing the portable computer 1 that the eject switch SW3 is turned on, i.e., that the undocking operation is requested, and set in the communication register of the deskstation interface 117 through connection between the connectors 26 and 13.

If the portable computer 1 is in a power ON state, the deskstation interface 117 issues an SMI to the CPU 111 in response to setting of the eject request command. With this operation, control is shifted to the system BIOS. The system BIOS determines whether the command set in the deskstation interface 117 is an eject request command (step B3). If the set command is an eject request command (YES in step B3), configuration set processing is performed to determine whether eject processing can be executed (step B5). The configuration set processing will be described below.

The system BIOS issues an About-change Config message for inquiring a change in system configuration to the OS. Thereafter, the OS sends a message representing detachment (removal) of a device mounted in the deskstation 2 to the device driver of this device mounted in the deskstation 2. The device driver determines whether the device can be detached. If YES, "OK" is returned to the OS. If any problem is posed, e.g., when LAN communication is being performed using a modem card mounted in the deskstation 2, "Abort" is returned to the OS. If "OK" is returned from the driver, the OS returns "OK" to the system BIOS. If "Abort" is returned from the driver, the OS displays a message representing that eject processing cannot be performed on the display unit 12 by window writing display or the like.

If "Abort" is returned from the driver, the configuration set processing is finished after display processing, and no special processing is performed any more (end). That is, if any problem is posed, and it is determined on the portable computer 1 side that eject processing cannot be performed, the depressing operation of the eject switch SW3 is ignored.

If "OK" is received from the OS, i.e., if no problem is posed upon ejection of the deskstation 2, the system BIOS disables the dock-control gate array 125 (step B7). The system BIOS issues an eject permission command to the power supply controller 123 (step B9).

The eject permission command is a command representing that the dock-control gate array 125 is disabled, and the undocking operation of the deskstation 2 is permitted, and sent to the power supply controller 123 through the communication register of the deskstation interface 117.

The power supply controller 123 issues an eject start command to the deskstation controller 211 in accordance with the eject permission command (steps B11 and B13). The eject start command is a permission response to the eject request command and sent to the deskstation controller 211 through the register of the deskstation interface 117.

If the portable computer 1 is in a power OFF state, the eject request command is sent to the power supply controller 123 by the deskstation interface 117 (step B15). The power supply controller 123 issues an eject start command to the deskstation controller 211 in response to the eject request command (step B17).

Upon reception of the eject start command, the deskstation controller 211 disables the power supply unit PS2 (steps B19 and B21). With this operation, the power supply voltages P2 applied to the expansion connectors 21a and 21b are stopped. Thereafter, the deskstation controller 211 controls the auto loading control mechanism 213 to reversely rotate the motor, thereby disconnecting the expansion connector 14 from the connector 28 (step B23). With this operation, the system is shifted from the dock state to the set state.

According to the above undocking method, generation of undocking is informed to the portable computer 1 before an actual undocking operation of the portable computer 1 and the deskstation 2. If the portable computer 1 is in a power ON state, it is determined on the basis of this information whether disadvantages are caused by the undocking operation. If it is disadvantageous, the switching operation for undocking is ignored. If the undocking operation can be performed, the dock-control gate array 125 is disabled to electrically disconnect the system bus 115 from the expansion connector 14. With this operation, an undocking operation can be prevented while the internal bus 218 of the deskstation 2 and the system bus 115 of the portable computer 1 are electrically connected to each other. Thereafter, the power supply unit PS2 is disabled, and undocking processing of the expansion connectors 21a and 21b is executed in a power OFF state. Therefore, an erroneous operation of the portable computer 1 can be prevented. When the undocking operation is completed, the portable computer 1 is kept in the power ON state, so that processing before the undocking operation of the deskstation 2 can be continued. With the configuration set processing, an erroneous operation caused by a difference between the system environment recognized by the operating system and the system BIOS and the actual system environment can be prevented. Therefore, hot ejection in which the portable computer 1 in a power ON state is detached from the deskstation 2 can be performed.

As described above, according to the first embodiment, connection of the expansion connector of the expansion unit is informed to the computer main body before actual electrical connection with the system bus of the computer main body. For this reason, even when the user attaches the expansion unit to the computer main body in a power ON state, disadvantages such as destruction of the expansion device or the option card of the expansion unit are prevented. Therefore, so-called hot docking can be performed. In addition, when the eject switch is turned on by the user, detachment of the expansion unit is informed to the computer main body before the expansion connector of the expansion unit is electrically disconnected from the system bus of the computer main body, and processing for electrically disconnecting the expansion connector from the system bus is automatically executed. For this reason, hot undocking can be realized in which the user removes the computer main body in a power ON state from the expansion unit.

The second embodiment according to the present invention will be described. A computer system according to the second embodiment is constituted by a portable computer and a deskstation 2, as in the first embodiment. They are connectable and substantially have outer appearances as shown in FIGS. 1 and 2. FIG. 8 is a block diagram showing the configuration of a portable computer 1 and the deskstation 2 according to the second embodiment. The same reference numerals denote the same constituent elements as in the first embodiment, and a detailed description thereof will be omitted.

The second embodiment is different from the first embodiment in two points. The first point is that the dock-control gate array 125 in the first embodiment is not arranged. That is, a system bus 115 and an expansion connector 14 are always connected to each other. The second point is that a specific pin 13p of a connector 13 is arranged in place of the switch SW1 for detecting the set state and pulled up by a voltage VD output from a power supply 122 in the portable computer 1. In a connector 26 of the deskstation 2, a pin 26p corresponding to the specific pin 13p is grounded. When the connector 13 of the portable computer 1 is connected to the connector 26 of the deskstation 2, the specific pin 13p is grounded. Therefore, connection between the connectors 13 and 26 can be detected with reference to the voltage VD.

A power supply unit 214 of the deskstation 2 has an arrangement shown in FIG. 4, as in the first embodiment. A deskstation controller 211, an EEPROM 212, and an auto loading control mechanism 213 substantially have a connection state as shown in FIG. 5. However, as described above, the switch SW1 shown in FIG. 5 is omitted.

The overall operation of docking the deskstation 2 with the portable computer will be described below. In the system of the second embodiment, as in the first embodiment, a release state in which the portable computer 1 is detached from the deskstation 2, a set state in which the portable computer 1 is set at the mounting position of the deskstation 2 while only the communication connector 13 and the connector 26 are connected to each other, and a dock state in which the connectors 13 and 26 are connected to each other while the expansion connectors 14 and 28 are connected to each other by an auto loading operation are available.

When the portable computer 1 is to be docked with the deskstation 2, the state is sequentially shifted in an order of the release state, the set state, and the dock state. This state shift is almost the same as that shown in FIG. 6A.

The main body of the portable computer 1 is fitted between guide portions 23 and 24 of the deskstation 2 by the user, and the main body is further pushed and set at the mounting position. At this time, the system is shifted from the release state to the set state.

In the set state, communication between a power supply controller 123 and the deskstation controller 211 is performed through the connectors 13 and 26. This communication is performed as 2-bit serial communication.

The power supply controller 123 monitors the voltage of the specific pin 13p and determines that the system is shifted from the release state to the set state when the voltage of the specific pin 13p becomes 0 V. This step corresponds to step S11 in FIG. 6A.

If the portable computer 1 is in a power ON state, a suspend request command is issued. A CPU 111 executes suspend processing in accordance with the suspend request command. Thereafter, the CPU 111 issues a dock power OFF command to the power supply controller 123. This step corresponds to step S12 in FIG. 6A. The power supply controller 123 performs power OFF processing of the portable computer 1 in response to the dock power OFF command and outputs a dock start command to the deskstation controller 211 (step S13).

If the portable computer 1 is in a power OFF state, the power supply controller 123 outputs a dock start command to the deskstation controller 211 in accordance with the ground state of the specific pin 13p (step S13).

Upon reception of the dock start command, the deskstation controller 211 performs docking (loading) processing, i.e., connection processing of the expansion connector 14 and the connector 28 (step S14). Thereafter, the deskstation controller 211 issues a dock completion command representing completion of the loading processing. If the portable computer 1 in a power ON state is shifted to the set state, the CPU 111 performs resume processing in accordance with setting of the dock completion command. With this processing, processing immediately before the computer system is shifted to the set state is resumed. The deskstation controller 211 enables a power supply unit PS2 in accordance with rising of a voltage VCC by power ON processing of the portable computer 1, thereby applying voltages P2 to expansion connectors 21a and 21b. With this operation, disadvantages caused by insertion/removal of a live cable can be eliminated.

Figure 9:
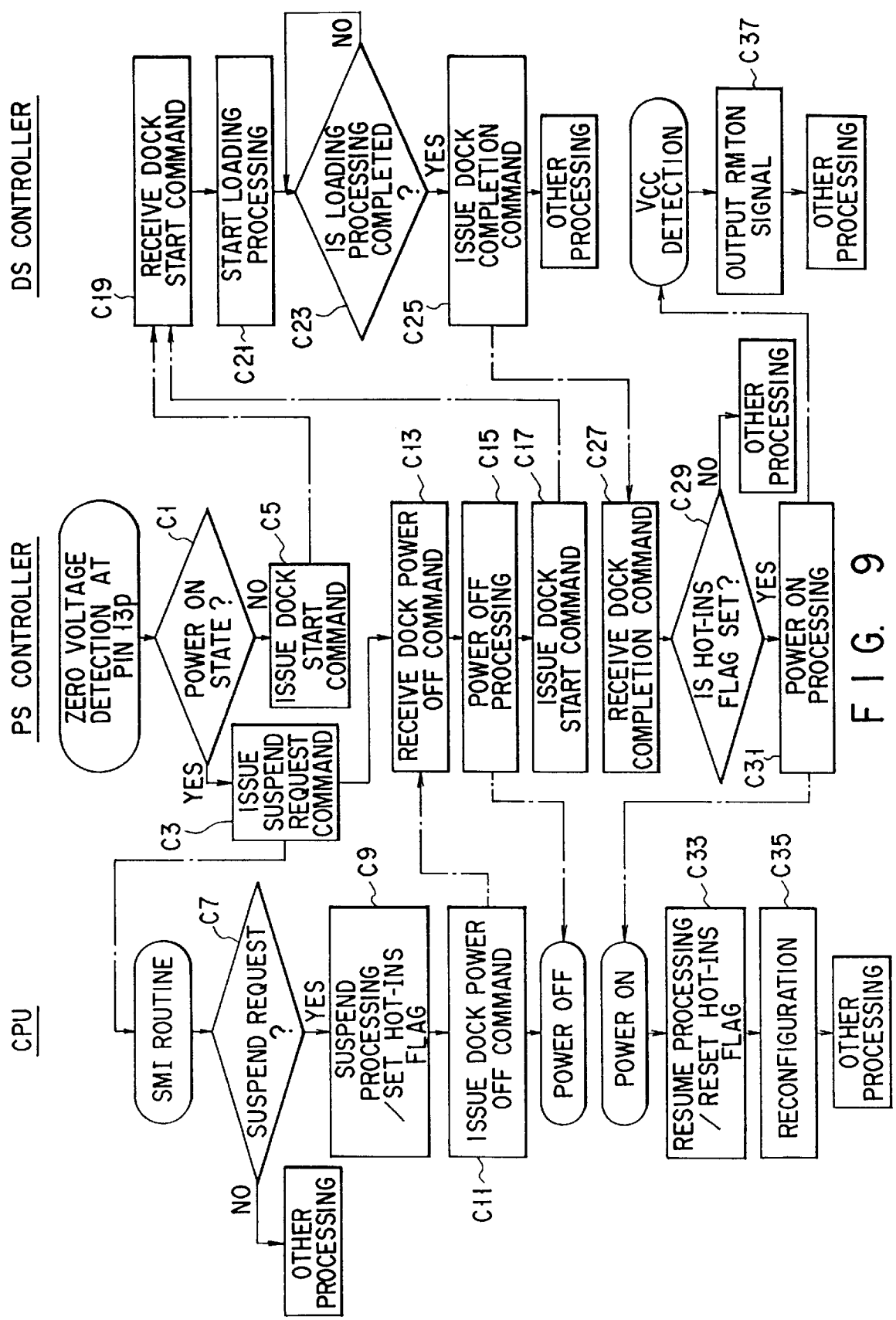
FIG. 9 is a flow chart for explaining communication between the CPU of a portable computer, a power supply controller, the deskstation controller of a deskstation when the portable computer is connected to the deskstation in the computer system of the second embodiment.

The docking operation will be described below in detail with reference to FIG. 9 as a flow chart showing the processing of the CPU 111 of the portable computer 1, the power supply controller 123, and the deskstation controller 211.

When the portable computer 1 is to be connected to the deskstation 2, the main body of the portable computer 1 is fitted between the guide portions 23 and 24 of the deskstation 2 by the user, and the main body of the portable computer 1 is further pushed and set at the mounting position. With this operation, the system is shifted from the release state to the set state. When the set state is set, the specific pin 13p of the connector 13 is grounded. Upon detection of the ground state of the specific pin 13p, the power supply controller 123 recognizes that the connector 13 is connected to the connector 26.

Thereafter, the power supply controller 123 determines whether a predetermined voltage, e.g., the voltage VCC is output from the power supply 122, thereby determining whether the portable computer 1 is in a power ON or OFF state (step C1). If the portable computer 1 is in a power ON state (YES in step C1), the power supply controller 123 issues a suspend request command (step C3). If the portable computer 1 is in a power OFF state (NO in step C1), a dock start command is issued (step C5). The dock start command is sent to the deskstation controller 211 through the connectors 13 and 26. If the ground state of the specific pin 13p is detected during a power OFF sequence, the power supply controller 123 issues the dock start command after the power OFF sequence is ended.

The suspend request command issued in step C3 is set in a predetermined register of a deskstation interface 117. If the portable computer 1 is in a power ON state, the deskstation interface 117 issues an SMI to the CPU 111 in accordance with setting of the suspend request command.

In accordance with issue of the SMI, control is shifted to a system BIOS. The system BIOS determines whether the command set in the deskstation interface 117 is a suspend request command (step C7). If a suspend request command is set (YES in step C7), the operating system is informed that docking with the deskstation 2 is to be performed.

If no problem is posed upon conversion of the system environment by connection of deskstation 2, the operating system informs the system BIOS that the docking operation can be performed (dock permission). The system BIOS executes suspend processing in accordance with this information (step C9).

More specifically, the system BIOS saves a system status (e.g., the contents of the register of the CPU 111 or various I/O registers) necessary for resuming the operating system or an application program which is being executed in a main memory 113 and also stores a suspend flag representing a suspend state in the backed-up CMOS memory of a realtime clock 120, and a HOT-INS flag representing that the portable computer 1 is docked in a power ON state (hot insertion) in a predetermined memory of the deskstation interface 117. The system BIOS issues a dock power OFF command to the power supply controller 123 (step C11). The dock power OFF command is a command for designating to temporarily power off the portable computer 1 for docking and set a suspend state and is sent to the portable computer 1 through the communication register of the deskstation interface 117.

Upon reception of the dock power OFF command, the power supply controller 123 controls the power supply 122 to execute the OFF operation (steps C13 and C15). Thereafter, the power supply controller 123 issues a dock start command to the deskstation controller 211 (step C17). The dock start command is a permission response to the dock request command and sent to the deskstation controller 211 through the register of the deskstation interface 117.

In step C7, if no suspend request command is set, the system BIOS performs other processing in the SMI routine.

Upon reception of the dock start command, the deskstation controller 211 controls the auto loading control mechanism 213 to execute an auto loading operation, thereby connecting the expansion connector 14 to the connector 28 (steps C19 and C21). When the expansion connector 14 and the connector 28 are connected to each other, i.e., when the docking operation is completed (YES in steps C23), a detection switch SW2 is turned on. In response to the ON operation of the detection switch SW2, the deskstation controller 211 controls the auto loading control mechanism 213 to stop the auto loading operation and issues a dock completion command (step C25). The dock completion command represents completion of docking between the portable computer 1 and the deskstation 2 and is set to the communication register of the deskstation interface 117 through connection between the connectors 26 and 13.

At this time, the portable computer 1 is in a power OFF state, so that the dock completion command is received by the power supply controller 123 (step C27). The power supply controller 123 determines whether the HOT-INS flag is set (step C29). If YES, the power supply 122 is controlled to perform power ON processing of the portable computer 1 (step C31). This processing is performed to power on the portable computer 1 again, which is temporarily powered off because the computer system is shifted to the set state while the main body of the portable computer 1 is kept in a power ON state.

In response to the power ON processing, the CPU 111 executes the system BIOS. The system BIOS checks whether the system is in a suspend state with reference to the suspend flag and executes resume processing if a suspend state is detected (step C33). In the resume processing, the system BIOS restores the contents saved in the main memory 113 to the original positions, thereby restoring the system to the state immediately before the power OFF operation. In addition, the HOT-INS flag set in step C9 is reset. Thereafter, the system BIOS confirms that the deskstation 2 is attached to the expansion connector 14 of the portable computer 1 and informs it to the operating system. The operating system or the system BIOS detects the type of the connected option card from the information stored in the EEPROM 212 of the deskstation 2, thereby reconfiguring the system environment into an environment for allowing the use of the option card (step C35).

If the system is not in a suspend state, the system BIOS executes an IRT routine to check the system configuration as in a normal operation, thereby recognizing the presence of the deskstation 2. After the operating system is bootstrapped, the system BIOS informs the operating system of the presence of the deskstation 2. Thereafter, the operating system or the system BIOS detects the type of the connected option card from the information stored in the EEPROM 212 of the deskstation 2, thereby reconfiguring the system environment into an environment for allowing the use of the option card.

The deskstation controller 211 of the deskstation 2 outputs an RMTON signal to the power supply unit PS2 in accordance with rising of the voltage VCC applied according to the power ON operation of the portable computer 1 (step C37). The power supply unit PS2 outputs the voltages PS2 in accordance with the RMTON signal. With this operation, both the portable computer 1 and the deskstation 2 are set in a power ON state.

With the above processing, generation of docking is informed to the operating system of the portable computer 1 before the portable computer 1 and the deskstation 2 are connected through the bus while the portable computer 1 is in a power ON state. If the docking operation can be performed, the power OFF operation of the portable computer 1 is automatically executed. No power supply voltage is applied to the expansion connectors 21a and 21b of the deskstation 2 until the portable computer 1 is powered on. For this reason, even when the user sets the computer 1 in a power ON state on the deskstation 2, disadvantages such as an erroneous operation of the portable computer 1 and destruction of the option card of the deskstation 2 can be prevented because the portable computer 1 can be docked with the expansion connectors 21a and 21b of the deskstation 2 in a power OFF state. If the portable computer 1 in a power ON state is set, the portable computer 1 is automatically powered on upon completion of the docking operation, thereby reconfiguring the system environment for allowing the use of the option card. Therefore, hot docking can be realized in which the portable computer 1 kept in a power ON state is docked with the deskstation 2.

The power ON operation of the docked computer 1 may be manually performed by the user. In this case, the portable computer 1 and the deskstation 2 are powered on by operating a power supply switch P-SW2 of the deskstation 2.

The procedures for docking the portable computer 1 with the deskstation 2 have been described above. In undocking processing for detaching the portable computer 1 from the deskstation 2 as well, the similar communication is executed between the portable computer 1 and the deskstation 2. In this case, the communication is performed to prevent an erroneous operation of the portable computer 1 when the portable computer 1 in a power ON state is detached from the deskstation 2 (hot eject).

The undocking operation in which the portable computer 1 is detached from the deskstation 2 will be described below.

When the portable computer 1 is to be undocked from the deskstation 2, the state is sequentially shifted in an order of the dock state, the set state, and the release state. This state shift is almost the same as that shown in FIG. 7A.

In the dock state, when an eject switch SW3 provided to the deskstation 2 is depressed by the user, the deskstation controller 211 detects the ON operation of the switch SW3. The deskstation controller 211 outputs an eject request command through the connectors 13 and 26 (step S21).

If the portable computer 1 is in a power ON state, the CPU 111 determines in accordance with the eject request command whether power OFF processing for ejection, which includes suspend processing, can be performed on the deskstation 2 side. If communication with an external equipment is being performed through a LAN (Local Area Network) or the like, the eject request command is ignored (ABORT). If the power OFF processing for ejection poses no problem, the CPU 111 performs predetermined processing including suspend processing and then sends an eject power OFF command to the power supply controller 123 to permit a power OFF operation (step S21). The power supply controller 123 performs the power OFF processing of the portable computer 1 and issues an eject start command in accordance with this designation (step S22).

If the portable computer 1 is in a power OFF state, the eject request command is sent to the power supply controller 123. The power supply controller 123 outputs an eject start command to the deskstation controller 211 in accordance with the eject request command (step S22).

The deskstation controller 211 disables the power supply unit PS2 in accordance with the eject start command and controls the auto loading control mechanism 213 to perform eject processing. With this processing, the expansion connector 14 and the connector 28 are disconnected from each other, and the computer system is shifted from the dock state to the set state. With this operation, the expansion connector 14 and the connector 28 can be disconnected from each other while keeping electrical connection, and disadvantages caused by insertion/removal of a live cable can be eliminated.

The above-described undocking operation will be described below in detail with reference to FIG. 10 as a flow chart showing the processing of the CPU 111 of the portable computer 1, the power supply controller 123, and the deskstation controller 211.

When the eject switch SW3 provided to the deskstation 2 is depressed by the user in the dock state, the deskstation 2 detects the ON operation of the switch SW3 and issues an eject request command to the portable computer 1 (step D1). The eject request command is a command for informing the portable computer 1 that the eject switch SW3 is turned on, i.e., that the undocking operation is requested, and set in the communication register of the deskstation interface 117 through connection between the connectors 26 and 13.

If the portable computer 1 is in a power ON state, the deskstation interface 117 issues an SMI to the CPU 111 in response to setting of the eject request command. With this operation, control is shifted to the system BIOS. The system BIOS recognizes whether the command set in the deskstation interface 117 is an eject request command (YES in step D3). Upon recognition of setting of an eject request command, the following processing is performed (step D5).

The system BIOS informs the operating system that an ejecting operation is to be performed. The operating system informs the system BIOS of eject permission when no problem is posed upon ejection of the deskstation 2. If communication with an option card is being executed and cannot be interrupted, the eject request is rejected by the operating system and aborted. The portable computer 1 informs the operator that the eject request is aborted by window display or the like. In addition, after the eject request is aborted, the CPU 111, the power supply controller 123, and the deskstation controller 211 do not perform special processing.

When the ejecting operation is permitted by the operating system, the system BIOS executes suspend processing.

More specifically, the system BIOS saves a system status (e.g., the contents of the register of the CPU 111 and various I/O registers) necessary for resuming the operating system or an application program which is being executed in the main memory 113 and also stores a suspend flag representing a suspend state for undocking in the CMOS memory of the real-time clock 120. The system BIOS issues an eject power ON command to the power supply controller 123 (step D7).

The eject power OFF command is a command for designating to temporarily power off the portable computer 1 for undocking and is sent to the power supply controller 123 through the communication register of the deskstation interface 117.

Upon reception of the eject power OFF command, the power supply controller 123 controls the power supply 122 to execute power OFF processing (steps D9 and D11). Thereafter, the power supply controller 123 issues an eject start command to the deskstation controller 211 (step D13). The eject start command is sent to the deskstation controller 211 through the register of the deskstation interface 117.

If the portable computer 1 is in a power OFF state, the eject request command is sent to the power supply controller 123 (step D15). The power supply controller 123 issues an eject start command to the deskstation controller 211 in response to the eject request command (step D17).

Upon reception of the eject start command, the deskstation controller 211 outputs the RMTON signal to the power supply unit PS2 (steps D19 and D21). With this operation, the power supply unit PS2 is disabled to stop the voltages P2 applied to the expansion connectors 21a and 21b. Thereafter, the deskstation controller 211 controls the auto loading control mechanism 213 to reversely rotate the motor, thereby disconnecting the expansion connector 14 from the connector 28 (step D23). With this operation, the system is shifted from the dock state to the set state.

According to the above undocking processing, generation of undocking is informed to the operating system of the portable computer 1 before actual undocking of the portable computer 1 and the deskstation 2. If the portable computer 1 is in a power ON state, generation of undocking is informed to the CPU 111. If the undocking operation can be performed, the power OFF operation of the computer 1 is automatically executed. Application of the power supply voltages to the expansion connectors 21a and 21b of the deskstation 2 is stopped in response to the power OFF operation of the computer 1. For this reason, the portable computer 1 can be normally undocked from the expansion connectors 21a and 21b of the deskstation 2 in a power OFF state, thereby preventing an erroneous operation of the portable computer 1. In this manner, a designation operation for detaching the portable computer 1 in a power ON state from the deskstation 2 can be performed.

The power ON operation of the portable computer 1 after the ejecting operation may be manually performed by the user or automatically performed upon completion of the ejecting operation. The user may select a mode to designate whether the computer 1 is automatically powered on upon after the ejecting operation. Instead of pulling up the specific pin 13p, a predetermined pin of the connector 26 on the deskstation 2 side may be pulled up. Alternatively, the switch SW1 shown in the first embodiment may be provided.

When the computer system is configured such that the portable computer 1 is powered on after the portable computer 1 is undocked from the deskstation 2, the deskstation controller 211 issues an eject completion command representing completion of the undocking operation of the portable computer 1 and the deskstation 2 upon completion of eject processing. More specifically, the deskstation controller 211 issues an eject completion command, and the eject completion command is set in the communication register of the deskstation interface 117 through connection between the connectors 26 and 13.

At this time, the portable computer 1 is in a power OFF state, so that the eject completion command is received by the power supply controller 123, and the portable computer 1 is powered on again.

In response to the power ON operation, the system BIOS is executed by the CPU 111. The system BIOS checks whether the system is in a suspend state with reference to the suspend flag and executes resume processing if a suspend state is detected. In the resume processing, the system BIOS restores the contents saved in the main memory 113 to the original positions, thereby restoring the system to the state immediately before the power OFF operation. Thereafter, the system BIOS confirms that the deskstation 2 is not attached to the expansion connector 14 of the portable computer 1 and informs it to the operating system. Thereafter, the operating system or the system BIOS reconfigures the system environment into an environment excluding the option card.

If the system is not in a suspend state, the system BIOS executes an IRT routine to check the system configuration as in a normal operation, thereby recognizing the absence of the deskstation 2. The operating system is then bootstrapped.

When an ejecting operation is designated to the operator, i.e., when the eject switch SW3 is operated, and the portable computer 1 is in a power ON state, a flag may be set. In accordance with setting/resetting of the flag, the power ON/OFF operation of the portable computer 1 may be controlled upon completion of eject processing.

As described above, according to the present invention, connection of the expansion connector of the expansion unit is informed to the computer main body before actual electrical connection with the system bus of the computer main body, and processing such as the power OFF operation of the computer main body is automatically executed. For this reason, even when the user attaches the expansion unit to the computer main body in a power ON state, disadvantages such as destruction of the expansion device such as an option card of the expansion unit are prevented. Therefore, so-called hot docking can be performed. In addition, when the eject switch is operated by the user, detachment of the expansion unit is informed to the computer main body before the expansion connector of the expansion unit is electrically disconnected from the system bus of the computer main body, and processing such as the power OFF operation of the computer main body is automatically executed. For this reason, hot undocking can be realized in which the user detaches the computer main body in a power ON state from the expansion unit.

The third embodiment of the present invention will be described below.

Figure 11:
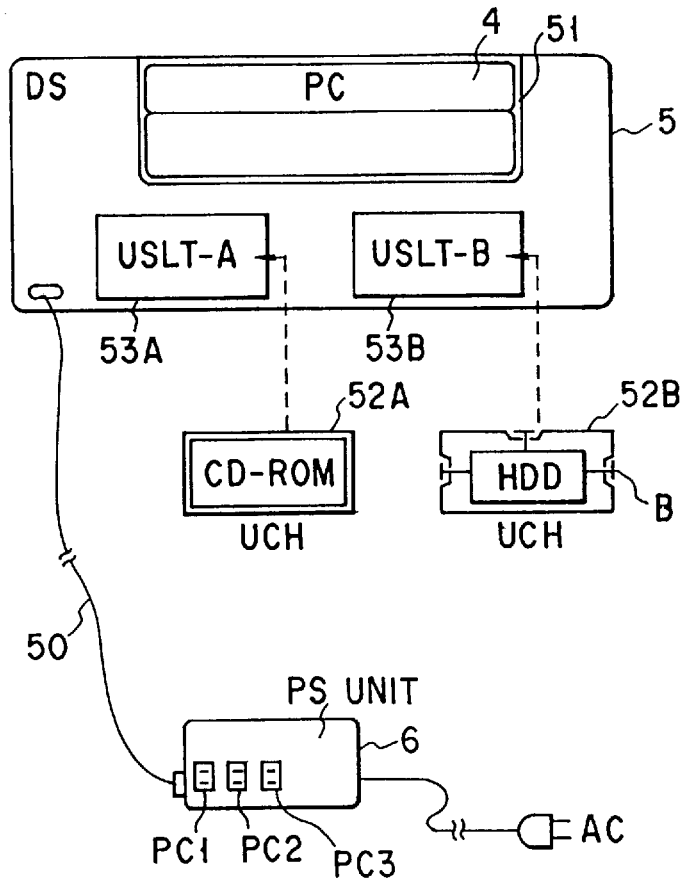
FIG. 11 is a block diagram schematically showing the structure of a deskstation in a computer system according to the third embodiment of the present invention.

FIG. 11 is a block diagram showing a computer system according to the third embodiment, which is constituted by a portable computer and a function expansion device (expansion unit).

FIG. 11 shows a portable computer 4, an expansion unit main body (DS) 5, and a power supply unit 6. The expansion unit main body (DS) 5 is connected to the power supply unit (PS UNIT) 6 through a cable 50 with a predetermined length and receives a plurality of (three) DC power supply voltages from the power supply unit (PS UNIT) 6 through the cable 50.

A portable computer mounting portion 51 where the portable computer (PC) 4 is slid back and forth to be attached or detached is arranged at the upper portion of the expansion unit main body (DS) 5. Chassis storage portions (USLT-A and USLT-B) 53A and 53B for storing regular-sized universal chassis (UCH) 52A and 52B each having a loaded I/O equipment are arranged at the front portion of the expansion unit main body (DS) 5.

The portable computer 4 can be mounted on the expansion unit main body (DS) 5. When the rear surface portion of the portable computer 4 is slid and inserted to the portable computer mounting portion 51 of the expansion unit main body (DS) 5 in a predetermined amount, an expansion connector (receptacle) (CNa in FIG. 13) provided to the rear surface portion is coupled to a connector (CNn in FIG. 13) provided to the expansion unit main body (DS) 5 in correspondence with the above connector, thereby circuit-connecting the portable computer (PC) 4 to the expansion unit main body (DS) 5.

Figure 13:
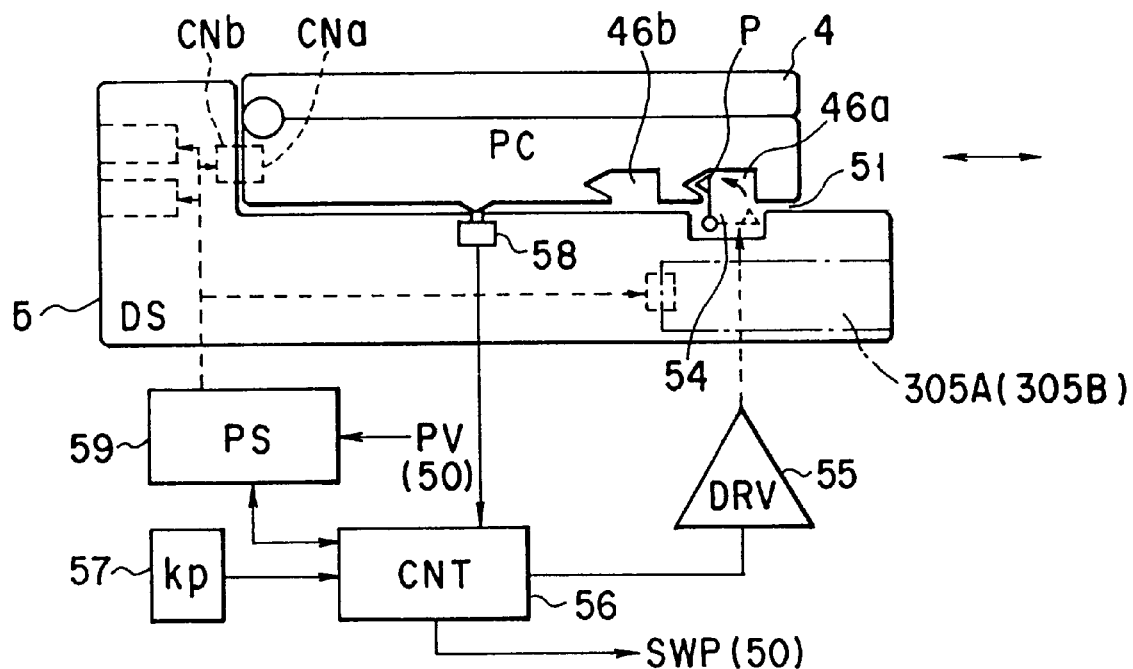
FIG. 13 is a block diagram for explaining a lock mechanism and peripheral constituent elements related to the lock mechanism in the computer system of the third embodiment.

As shown in FIG. 13, the portable computer (PC) 4 has lock engagement mechanisms (lock grooves) 46a and 46b which are engaged or disengaged by the expansion unit main body (DS) 5.

Figure 12:
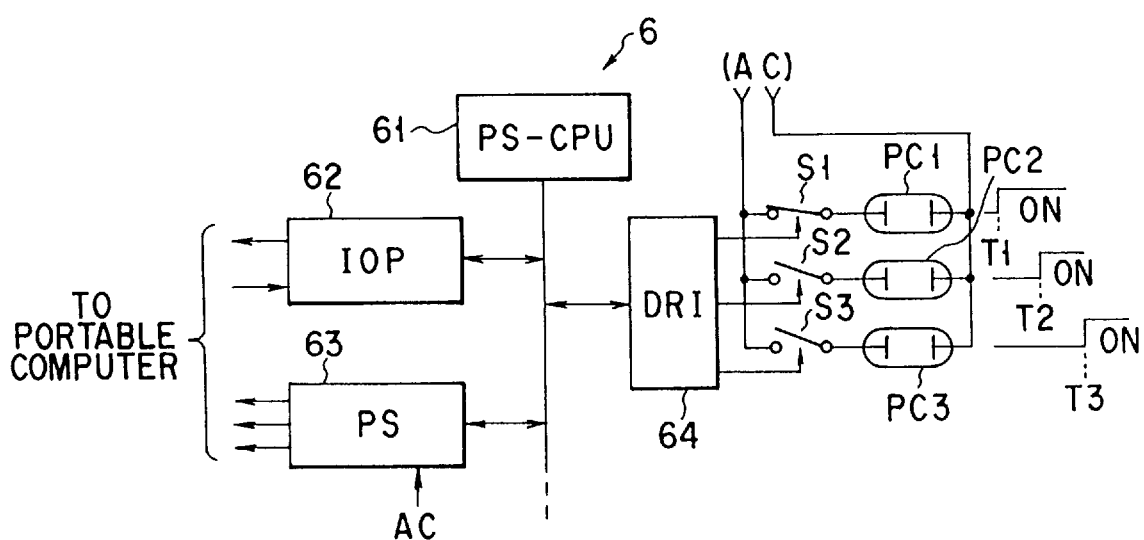
FIG. 12 is a block diagram showing the internal arrangement of a power supply unit in the computer system shown in FIG. 11.

The power supply unit (PS UNIT) 6 applies power supply voltages to the expansion unit main body (DS) 5. In this embodiment, three DC power supply voltages (+5 V, +12 V, and +15 V) are generated in accordance with a designation from the expansion unit main body (DS) 5 through the cable 50 and supplies the power to the portable computer (PC) 5. As shown in FIG. 12, the power supply unit (PS UNIT) 6 has a plurality of (three) power supply (AC) outlets PC1 to PC3 which are ON/OFF-controlled with predetermined time lags. A power supply unit for generating the three power supply voltages and a function circuit including a power supply control microprocessor are arranged in the power supply unit (PS UNIT) 6.

The cable 50 is constituted by a plurality of power supply lines for connecting the expansion unit main body (DS) 5 to the power supply unit (PS UNIT) 6 and applying the three DC power supply voltages generated by the power supply unit (PS UNIT) 6 to the expansion unit main body (DS) 5, and a single control signal line for supplying, to the power supply unit (PS UNIT) 6, a power supply control signal for designating the ON/OFF operation of the power supply voltage generated by the expansion unit main body (DS) 5.

The regular-sized universal chassis (UCH) 52A and 52B are used to load (connect) IO equipments in the expansion unit main body (DS) 5 and equalize the sizes of the IO equipments loaded in the expansion unit main body (DS) 5. In this embodiment, as the IO equipments mounted in the expansion unit main body (DS) 5, a CD-ROM is mounted on the universal chassis (UCH) 52A while a hard disk drive (HDD) is mounted on the universal chassis (UCH) 52B. In this case, the IO equipments such as the CD-ROM and the HDD are adjusted to predetermined positions in the chassis by a plurality of screws (B, . . . ) such that the connector coupling positions are matched, and fixed on the chassis.

When the universal chassis (UCH) 52A and 52B incorporating the IO equipments are respectively inserted in the chassis storage portions (USLT-A and USLT-B) 53A and 53B provided to the expansion unit main body (DS) 5 by a predetermined amount, the IO equipments mounted on the chassis are coupled through connectors and form circuits with the expansion unit main body (DS) 5. With this arrangement, when an option unit such as a hard disk unit is to be mounted, mounting and exchange of option units can be easily performed without using a tool such as a driver.

FIG. 12 is a block diagram showing the internal arrangement of the power supply unit (PS UNIT) 6 shown in FIG. 11.

Referring to FIG. 12, a power supply control microprocessor (PS-CPU) 61 controls the entire power supply unit. The power supply control microprocessor (PS-CPU) 61 receives a power supply control signal for designating the ON/OFF operation of the power supply from the expansion unit main body (DS) 5 through the cable 50 and an IO port (IOP) 62. Upon reception of designation of the power ON operation, the microprocessor 61 starts operating a power supply (PS) 63 for generating three DC power supply voltages (+5 V, +12 V, and +15 V) required by the expansion unit main body (DS) 5. In this embodiment, while an AC plug is inserted, the power supply control microprocessor (PS-CPU) 61 always receives an operating power supply voltage and is set in an operable (sleep) state. When a power supply control signal for designating the ON/OFF operation of the power supply is received as an interrupt signal, a normal operative mode is set to execute power supply control processing. More specifically, upon reception of a power supply control signal through the IO port (IOP) 62, the power supply control microprocessor (PS-CPU) 61 executes power OFF processing if the system is in a power ON state or power ON processing if the system is power OFF state.

The IO port (IOP) 62 transmits a control signal between the microprocessor (PS-CPU) 61 and the control unit (microprocessor) of the expansion unit main body (DS) 5. The IO port (IOP) 62 receives a power supply control signal for designating the ON/OFF operation of the power supply from the expansion unit main body (DS) 5 through the control signal line of the cable 50 and informs the contents of the signal to the microprocessor (PS-CPU) 61. In this embodiment, to simplify the arrangement, the control signal line of the cable 50 is always pulled up. Every time the power supply control signal on the line goes to a ground level ("0") for a predetermined period of time (e.g., 0.5 sec), a power supply control signal for designating the ON/OFF operation of the power supply is supplied to the power supply control microprocessor (PS-CPU) 61. Upon reception of the power supply control signal, the power supply control microprocessor (PS-CPU) 61 executes power OFF processing if the system is in a power ON state or power ON processing if the system is in a power OFF state.

The power supply (PS) 63 is a power supply circuit as a main constituent element of the power supply unit (PS UNIT) 6. The power supply (PS) 63 generates three DC power supply voltages (+5 V, +12 V, and +15 V) required by the expansion unit main body (DS) 5 under control of the power supply control microprocessor (PS-CPU) 61 and sends the voltages to the power supply lines of the cable 50.

A driver (DRV) 64 has a sequence controller for ON/OFF-controlling the power supply (AC) outlets PC1 to PC3, which ON/OFF-controls feed switches S1 to S3 at different timings (T1 to T3) with predetermined time lags under the control of the power supply control microprocessor (PS-CPU) 61 and sequentially controls the ON/OFF operation of the AC power supplies (commercial AC power supplies) of the power supply (AC) outlets PC1 to PC3 at the predetermined different timings (T1 to T3).

With the sequence control of the power supply (AC) outlets PC1 to PC3, a power ON/OFF sequence mechanism according to the system configuration can be easily realized. Disadvantages such as variations in voltage or breaker down caused by rapid power consumption due to rush can be prevented, thereby ensuring a stable operation. Additionally, the rated power of each equipment or line member can be suppressed to simplify the system.

FIG. 13 is a block diagram showing part of the function circuit in the expansion unit main body (DS) 5 shown in FIG. 11 and the lock mechanism of the portable computer.

Referring to FIG. 13, a lock mechanism 54 is driven to fix the portable computer (PC) 4 to the expansion unit main body (DS) 5 when the portable computer (PC) 4 is set at a predetermined position of the portable computer mounting portion 51 provided to the expansion unit main body (DS) 5.

The lock mechanism 54 has a lock lever p which is arranged at a predetermined position of the slide surface of the portable computer mounting portion and pivotally set at lying and rising positions. When the portable computer (PC) 4 is not set, the lock lever p is at the lying position to match the slide surface. When the portable computer (PC) 4 is set, the lock lever p rises to project from the slide surface and is engaged with the lock engagement mechanism (to be referred to as a lock groove) 46a (or 46b) provided at a predetermined position of the bottom surface of the portable computer (PC) 4, thereby stationarily holding the portable computer (PC) 4 at a predetermined position.

A driving unit (DRV) 55 controls the lying/rising operation of the lock lever p of the lock mechanism 54. The driving unit (DRV) 55 drives, e.g., an electromagnetic plunger under the control of a control unit 56 to raise/lay the lock lever a, thereby engaging (locking) the lock lever p with the lock groove 46a (or 46b) or disengaging (releasing) them.

The control unit (CNT) 56 is constituted by a microprocessor for controlling the expansion unit main body (DS) 5. The control unit 56 sends a power supply control signal (SWP), supplied upon operation of a power supply control key 57, for designating the ON/OFF operation of the power supply to the power supply unit (PS) 6 through the power supply control line of the cable 50, and supplies the above three DC power supply voltages (PV) received from the power supply unit (PS) 6 to an internal circuit. In this embodiment, when the power supply control key 57 is operated, the power supply control line pulled up on the power supply unit (PS UNIT) 6 side is shorted to a ground line, thereby outputting the power supply control signal (SWP) for designating the ON/OFF operation of the power supply.

The control unit 56 recognizes in accordance with a switch signal (to be described later) that the portable computer (PC) 4 is set at a predetermined position of the mounting portion 51 and performs control such that the driving unit (DRV) 55 is driven to operate the lock mechanism 54, thereby stationarily holding the portable computer (PC) 4 at a predetermined position of the mounting portion 51. With this lock mechanism, disadvantages such as data destruction caused by a releasing operation during the operation can be prevented. At the same time, the portable computer (PC) 4 is integrated with the expansion unit main body (DS) 5, thereby obtaining an effect for security.

The power supply control key (KP) 57 is used to designate the ON/OFF operation of the power supply of the expansion unit main body (DS) 5 and feed/stop of the power supply (AC) outlets PC1 to PC3 provided to the power supply unit (PS UNIT) 6. In this embodiment, as a simplest arrangement, the power supply control line pulled up on the power supply unit (PS UNIT) 6 side is shorted to the ground line by operating a key, and a power supply control signal on the power supply control line is set at a ground ("0") level. However, for example, when a keypad having a plurality of numeric keys is used, and a key code input by operating the keys of the keypad is input to the control unit 56, the ON/OFF operation of the power supply of the expansion unit and feed/stop of the power supply (AC) outlets PC1 to PC3 can be individually designated. When these designations are made valid by combining specific keys, a security function can also be obtained. In this case, however, a circuit for operating the control unit 56 in a sleep mode is necessary.

A status detection switch 58 is used to detect that the portable computer (PC) 4 is set at a predetermined position of the portable computer mounting portion 51 and informs the detection state to the control unit 56.

A power supply (PV) 59 is incorporated in the expansion unit main body (DS) 5 and supplies the above three DC power supply voltages (PV) received from the power supply unit 6 through the cable 50 to the internal circuit including the connector (CNb) under the control of the control unit 56.

Figure 14:
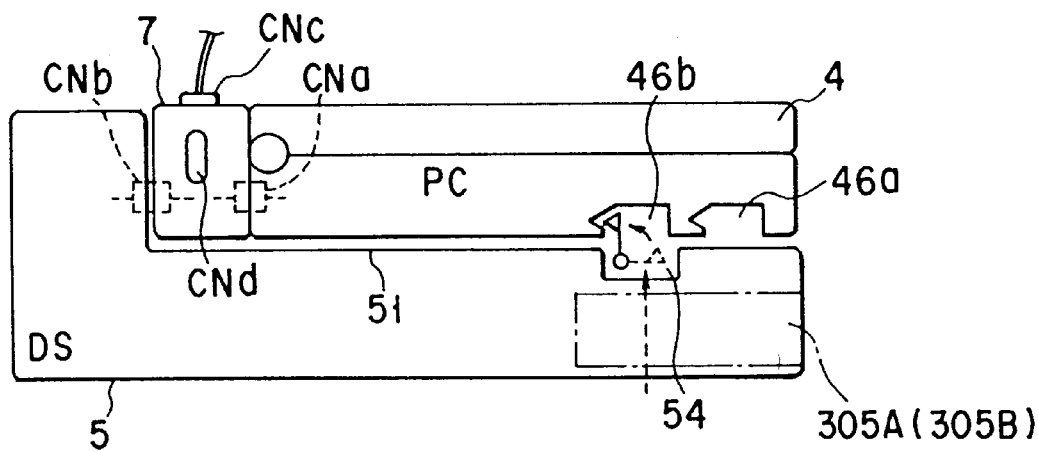
FIG. 14 is a view showing a connection example in which a port replicator is mounted in a portable computer, and the portable computer and the port replicator are mounted in the deskstation in the computer system of the third embodiment.

FIG. 14 is a view showing a connection example of the portable computer (PC) 4 mounted in the expansion unit main body (DS) 5 through a port replicator.

Referring to FIG. 14, a port replicator 7 is connected between the portable computer (PC) 4 and the expansion unit main body (DS) 5 through connectors. In the use of the port replicator 7, when the lock lever p of the lock mechanism 54 rises, the lock lever p is engaged with the lock groove 46b of the lock engagement mechanisms (lock grooves) 46a and 46b provided at predetermined positions of the bottom surface of the portable computer (PC) 4, thereby stationarily holding the portable computer (PC) 4 at a predetermined position.

With such a port replicator structure, when the portable computer (PC) 4 is mounted on the expansion unit main body (DS) 5, each I/O port such as a printer connection port, a serial (RS-232C) port, or a CRT (R, G, and B) connection port, which is closed by a connection between the portable computer (PC) 4 and the expansion unit main body (DS) 5, can be easily used, thereby easily connecting arbitrary option equipments.

The operation of the third embodiment of the present invention will be described below with reference to FIGS. 11 to 14.

The function expansion device (expansion unit) according to this embodiment has a power supply unit constituted in a housing independent of the expansion unit main body, and the power supply unit and the expansion unit main body are connected by a cable. With this arrangement, when the expansion unit main body (DS) 5 is set on a desk, and the power supply unit (PS UNIT) 6 is placed under the desk (on the floor), the space can be effectively used. In addition, since the expansion unit main body (DS) 5 does not include a power supply mechanism which generates heat or noise, a compact and light expansion unit can be realized. With this arrangement, easy handling and a stable operation with a high reliability can be maintained.

In the above embodiment, when the expansion unit is to be used, the portable computer (PC) 4 is mounted at a predetermined position of the mounting portion 51 provided to the expansion unit main body (DS) 5 by a slide operation, and the power supply control key 57 is operated.

The power supply control signal (SWP), input by operating the power supply control key 57, for designating the ON/OFF operation of the power supply is supplied to the control unit 56.

The control unit 56 sends the power supply control signal (SWP) supplied upon operation of the power supply control key 57 to the power supply unit (PS UNIT) 6 through the power supply control line of the cable 50. More specifically, in this embodiment, the power supply control signal on the power supply control line of the cable 50 is switched from "1" (pull-up state) to "0" (ground state) in accordance with the ON operation of the power supply control key 57.

The power supply control signal on the power supply control line of the cable 50 is received by the IO port (IOP) 62 of the power supply unit (PS UNIT) 6.

When the power supply control signal on the power supply control line goes to the ground level ("0") for a predetermined period of time (e.g., 0.5 sec), the IO port (IOP) 62 supplies the power supply control signal for designating the ON/OFF operation of the power supply to the power supply control microprocessor (PS-CPU) 61.

Upon reception of the power supply control signal from the IO port (IOP) 62, the power supply control microprocessor (PS-CPU) 61 executes power OFF processing if the system is in a power ON state, or power ON processing if the system is in a power OFF state. In the power ON processing, the power supply (PS) 63 is started, and the driver (DRV) 64 is also started.

The power supply (PS) 63 generates three DC power supply voltages (+5 V, +12 V, and +15 V) required by the expansion unit main body (DS) 5 under the control of the power supply control microprocessor (PS-CPU) 61 and sends these voltages to the power supply lines of the cable 50.

The driver (DRV) 64 turns on the feed switches S1 to S3 at the different timings (T1 to T3) with predetermined time lags under the control of the power supply control microprocessor (PS-CPU) 61, and sequentially supplies the AC power supply voltages (commercial AC power supply voltages=AC) of the power supply (AC) outlets PC1 to PC3 at the predetermined different timings (T1 to T3).

The three DC power supply voltages (+5 V, +12 V, and +15 V) output from the power supply (PS) 63 are supplied to the power supply (PS) 59 of the expansion unit main body (DS) 5 through the power supply lines of the cable 50 so as to serve as the operating power supply voltages (PV).

When the operating power supply voltages (PV) are supplied, and a detection signal for informing that the portable computer (PC) 4 is set at a predetermined position is received from the status detection switch 58, the control unit 56 of the expansion unit main body (DS) 5 starts operating the driving unit (DRV) 55 to drive the lock mechanism 54, thereby raising the lock lever p of the lock mechanism 54. The lock lever p is engaged with the lock engagement mechanism (lock groove) 46a of the portable computer (PC) 4, thereby stationarily holding the portable computer (PC) 4 at a predetermined position of the portable computer mounting portion 51.

The control unit 56 controls the power supply (PS) 59 to distribute and supply the operating power supply voltages (PV) received through the cable 50 to predetermined circuits including connectors in a predetermined order.

With this operation, the connection equipments including the portable computer (PC) 4 mounted in the expansion unit main body (DS) 5, and the I/O equipments on the universal chassis (UCH) 52A and 52B stored in the chassis storage portions (USLT-A and USLT-B) 53A and 53B (in this embodiment, the CD-ROM mounted on the universal chassis (UCH) 52A and the hard disk drive (HDD) mounted on the universal chassis (UCH) 52B) are started by power ON control according to a predetermined power supply sequence.

When the system operation is to be finished, the power supply control key 57 of the expansion unit main body (DS) 5 is operated. The power supply control signal (SWP) according to the operation of the power supply control key 57 is sent to the power supply unit (PS UNIT) 6 through the power supply control line of the cable 50, as in the above operation, and received by the power supply control microprocessor (PS-CPU) 61 through the IO port (IOP) 62 of the power supply unit (PS UNIT) 6.

When the power supply control signal (ground level="0") for designating the ON/OFF operation of the power supply is received in a power ON state, the power supply control microprocessor (PS-CPU) 61 executes power OFF processing. The power supply (PS) 63 and the driver (DRV) 64 are started to stop the operating power supply voltages for the expansion unit main body (DS) 5 in a predetermined order and also stop feeding to the power supply (AC) outlets PC1 to PC3 in a predetermined order.

As described above, in the function expansion unit (expansion unit) having the above arrangement according to the embodiment of the present invention, the expansion unit has a power supply unit constituted in a housing independent of the expansion unit main body, and they are connected by a cable. For this reason, when the expansion unit main body (DS) 5 is set on a desk, and the power supply unit (PS UNIT) 6 is placed under the desk (on the floor), the space can be effectively used. In addition, since the expansion unit main body (DS) 5 does not include a power supply mechanism which generates heat or noise, a compact and light expansion unit can be realized. With this arrangement, easy handling and a stable operation with a high reliability can be maintained.

With the power ON/OFF sequence control function of the expansion unit main body (DS) 5 and the feed/stop sequence control function of the power supply (AC) outlets PC1 to PC3, the power ON/OFF operation according to the start/end of operation of the entire system can be facilitated, thereby largely decreasing the work load. At the same time, an erroneous operation caused by a shift of power supply states can be prevented.

Since the expansion unit main body (DS) 5 has the lock mechanism 54 for the mounted portable computer (PC) 4, disadvantages such as data destruction caused by a releasing operation during the operation can be prevented. At the same time, the portable computer (PC) 4 is integrated with the expansion unit main body (DS) 5, thereby obtaining an effect for security.

When the universal chassis (UCH) 52A and 52B incorporating the IO equipments are inserted in the chassis storage portions (USLT-A and USLT-B) 53A and 53B provided to the expansion unit main body (DS) 5 by a predetermined amount, the IO equipments mounted on the chassis are coupled through connectors and form circuits with the expansion unit main body (DS) 5. With this arrangement, when an option unit such as a hard disk unit is to be mounted, mounting and exchange of various arbitrary option units can be easily performed without using a tool such as a driver.

With the arrangement in which the feed/stop operations of the power supply (AC) outlets PC1 to PC3 are sequentially controlled at the predetermined different timings (T1 to T3), a power ON/OFF sequence mechanism according to the system configuration can be easily realized. Disadvantages such as variations in voltage or breaker down caused by rapid power consumption due to rush can be prevented, thereby ensuring a stable operation. Additionally, the rated power of each equipment or line member can be suppressed to simplify the system.

In the above embodiment, the power ON operation of the expansion unit is designated by operating the power supply control key (KP) 57. However, as another embodiment, the control unit 56 may designate the power ON operation of the expansion unit main body (DS) 5 on the basis of a detection signal from the status detection switch 58.

In this case, when the portable computer (PC) 4 is set at a predetermined position of the portable computer mounting portion 51 provided to the expansion unit main body (DS) 5, this state is detected by the power supply control key 57 and informed to the control unit 56, and a power supply control signal for designating to the power ON operation is sent to the power supply unit (PS UNIT) 6 through the cable 50.

In the power supply unit (PS UNIT) 6, the power supply control signal on the cable 50 is received by the power supply control microprocessor (PS-CPU) 61 through the IO port (IOP) 62.

Upon reception of the power supply control signal for designating the ON operation of the power supply, the power supply control microprocessor (PS-CPU) 61 generates a power supply voltage necessary for operating the expansion unit and sends the power supply voltage to the expansion unit main body (DS) 5 through the cable 50.

With this automatic power ON control mechanism, the work load of the user can be decreased, thereby improving the convenience.

In addition to the above-described automatic power ON control mechanism using a switch, a function of sequentially applying power supply voltages to the power supply (AC) outlets PC1 to PC3, as described above, may be added.

With this automatic power ON control mechanism, the work load of the user can be decreased, thereby improving the convenience. In this case, the expansion unit main body (DS) 5 does not always need an operation designating means such as the power supply control key (KP) 57, and automatic power supply control of the entire system can be realized.

An arrangement may also be used in which, when the power ON operation is designated on the expansion unit main body (DS) 5 side, the designation signal is sent to the power supply unit (PS UNIT) 6 via a radio channel.

In the above embodiment, the lock mechanism has an arrangement in which the lock lever is controlled to be laid/raised by a electromagnetic plunger, and the lock lever p is engaged with the lock groove of the portable computer, thereby fixing the portable computer at a predetermined position of the expansion unit main body. However, the arrangement is not limited to this. For example, a lock mechanism with another arrangement may also be used in which a motor is used as a driving source, and the portable computer main body is sandwiched at its both sides and fixed at a predetermined position of the expansion unit main body.

In this embodiment, as a simplest arrangement, the power supply control line pulled up on the power supply unit (PS UNIT) 6 side is simply shorted to the ground line by operating the key, and a power supply control signal on the power supply control line is set at a ground ("0") level. However, for example, when a keypad having a plurality of numeric keys is used, and a key code input by operating the keys of the keypad is input to the control unit 56, the ON/OFF operation of the power supply of the expansion unit and feed/stop of the power supply (AC) outlets PC1 to PC3 can be individually designated. When these designations are made valid by combining specific keys, a security function can also be obtained. In this case, however, a circuit for operating the control unit 56 in a sleep mode is necessary.

Figure 15:
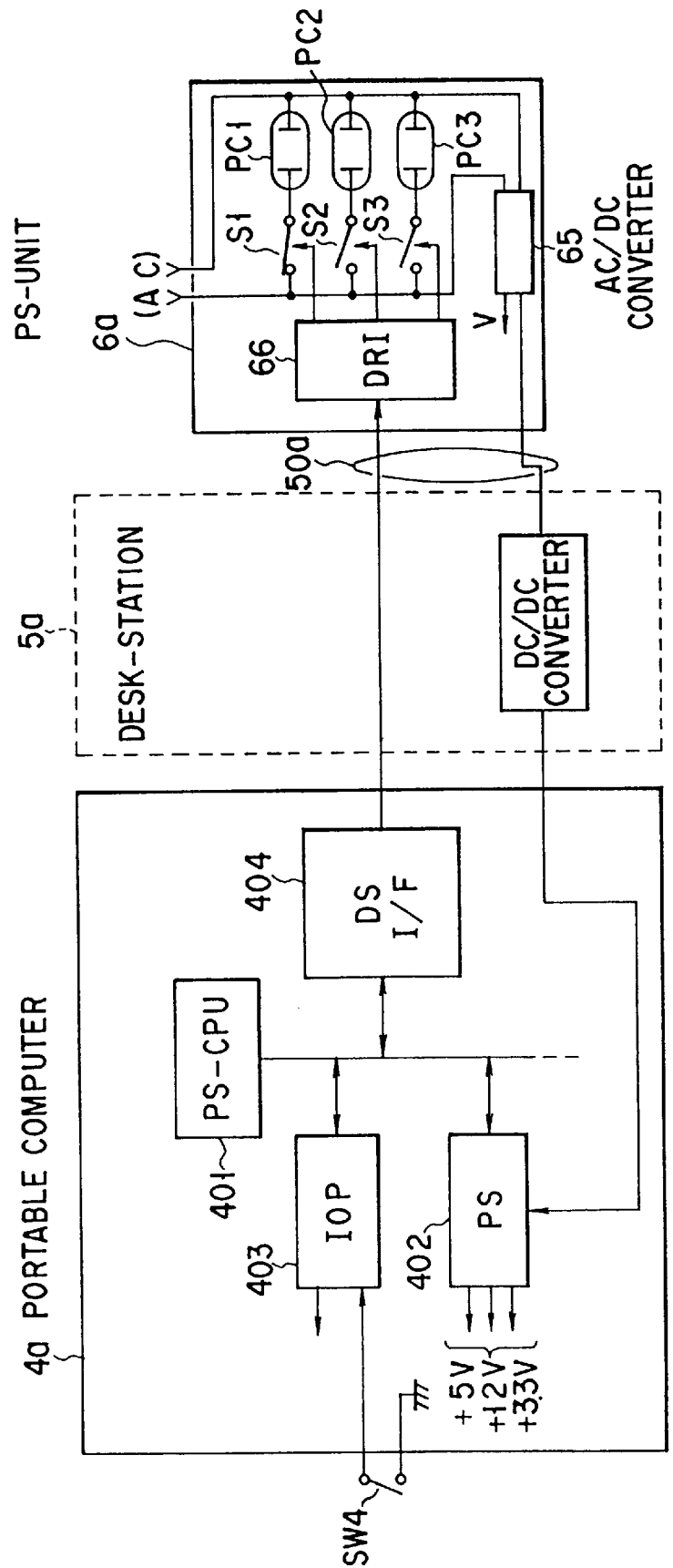
FIG. 15 is a block diagram schematically showing the configuration of the computer system, in which feed/stop control of the AC power supplies of power supply outlets in the third embodiment is applied to the first embodiment.

An example in which the feed/stop control of the AC power supplies of the power supply outlets PC1 to PC3 in the third embodiment is applied to the first embodiment will be described below. FIG. 15 is a block diagram schematically showing the configuration of the computer system in application of the feed/stop control to the first embodiment. Of the constituent elements of a portable computer 4a and a deskstation 5a, only minimum constituent elements necessary for the description are shown in FIG. 15. In this example, the driving unit (DRV) provided to the power supply unit (PS-UNIT) is driven and controlled by the power supply controller of the portable computer.

The expansion unit main body (deskstation) 5a is connected to a power supply unit (PS-UNIT) 6a through a cable 50a having a predetermined length. The expansion unit main body (DS) 5a receives a DC power supply voltage from the power supply unit 6a and applies a predetermined voltage to the constituent elements of the deskstation 5a by using a DC/DC converter, and at the same time, applies a predetermined voltage of, e.g., 16 V to the portable computer 4a.

The power supply unit (PS-UNIT) 6a applies a power supply voltage to the expansion unit main body (DS) 5a. As shown in FIG. 15, the power supply unit 6a has an AC/DC converter 65 for converting an AC power supply voltage into a DC power supply voltage and generates a predetermined DC voltage in accordance with a designation sent through the cable 50a and applies the voltage to the expansion unit main body (DS) 5a. The power supply unit (PS-UNIT) 6a has a plurality of (three) power supply (AC) outlets PC1 to PC3 which are ON/OFF-controlled with predetermined time lags.

The cable 50a connects the expansion unit main body (DS) 5a and the power supply unit (PS-UNIT) 6a. In this case, the cable 50a is constituted by a power supply line for applying a DC voltage generated by the power supply unit (PS) 6a to the expansion unit main body (DS) 5a, and a single control signal line for supplying a control signal for designating the ON/OFF operation of the power supply voltage from the portable computer 4a to the power supply unit (PS-UNIT) 6a through the expansion unit main body (DS) 5a.

Referring to FIG. 15, a power supply control microprocessor (PS-CPU) 401 of the portable computer 4a controls a power supply (PS) 402 for applying a predetermined voltage to the various constituent elements of the portable computer 4a and also enables/disables the outlets PC1 to PC3 of the power supply unit (PS-UNIT) 6a. More specifically, the power supply control microprocessor (PS-CPU) 401 receives a designation of the ON/OFF operation of the power supply from a power switch (SW4) for designating the ON/OFF operation of the power supply of the portable computer 4a and the expansion unit main body (DS) 5a through an IO port (IOP) 403. When a power ON operation is performed, the AC/DC converter 65 of the power supply unit (PS-UNIT) 6a, the DC/DC converter of the deskstation main body 5a, and the power supply (PS) 402 are started to apply an operating voltage to each constituent element of the computer system. In this embodiment, the power supply control microprocessor (PS-CPU) 401 always receives an operating power supply voltage while an AC plug is inserted, and receives a control signal for designating the ON/OFF operation of the power supply as an interrupt signal. In accordance with this interruption, power supply control processing is performed. More specifically, in accordance with the control signal supplied through the IO port (IOP) 403, the power supply control microprocessor (PS-CPU) 401 executes power OFF processing if the system is in a power ON state or power ON processing if the system is in a power OFF state.

The IO port (IOP) 403 transmits the control signal between the power supply control microprocessor (PS-CPU) 401 and the power switch (SW4). More specifically, the IO port (IOP) 403 receives a control signal for designating the ON/OFF operation of the power supply from the power switch (SW4) and informs the contents of the signal to the microprocessor (PS-CPU) 401. In this embodiment, to simplify the arrangement, one end of the power switch (SW4) is always pulled up. Every time a ground level ("0") is set for a predetermined period of time (e.g., 0.5 sec) in accordance with the switching operation, a control signal for designating the ON/OFF operation of the power supply is supplied to the power supply control microprocessor (PS-CPU) 401. Upon reception of the power supply control signal, the power supply control microprocessor (PS-CPU) 401 executes power OFF processing if the system is in a power ON state or power ON processing if the system is in a power OFF state.

The power supply (PS) 402 generates various voltages (+5 V, +12 V, and +3.3 V) under the control of the power supply control microprocessor (PS-CPU) 401 and applies the voltages to the various constituent elements of the portable computer 4a.

A deskstation interface 404 performs data transmission between the power supply control microprocessor (PS-CPU) 401 and a driver 66 of the power supply unit (PS-UNIT) 6a. More specifically, a designation output from the power supply control microprocessor (PS-CPU) 401 upon execution of power ON processing is sent to the driver 66 through the deskstation 5a and the cable 50a. A signal output from the power supply control microprocessor (PS-CPU) 401 is sent to the deskstation 5a through a dedicated signal line and further sent to the driver 66 through the cable 50a. As the dedicated signal line from the portable computer 4a to the deskstation 5a, the predetermined pins of the communication connectors 13 and 26 shown in the first and second embodiments may also be used.

Like the above-described driver 64, the driver (DRV) 66 provided to the power supply unit 6a has a sequence controller for ON/OFF-controlling the power supply (AC) outlets PC1 to PC3 and ON/OFF-controls the feed switches S1 to S3 at different timings (T1 to T3) with predetermined time lags under the control of the power supply control microprocessor (PS-CPU) 401.

Figure 16:
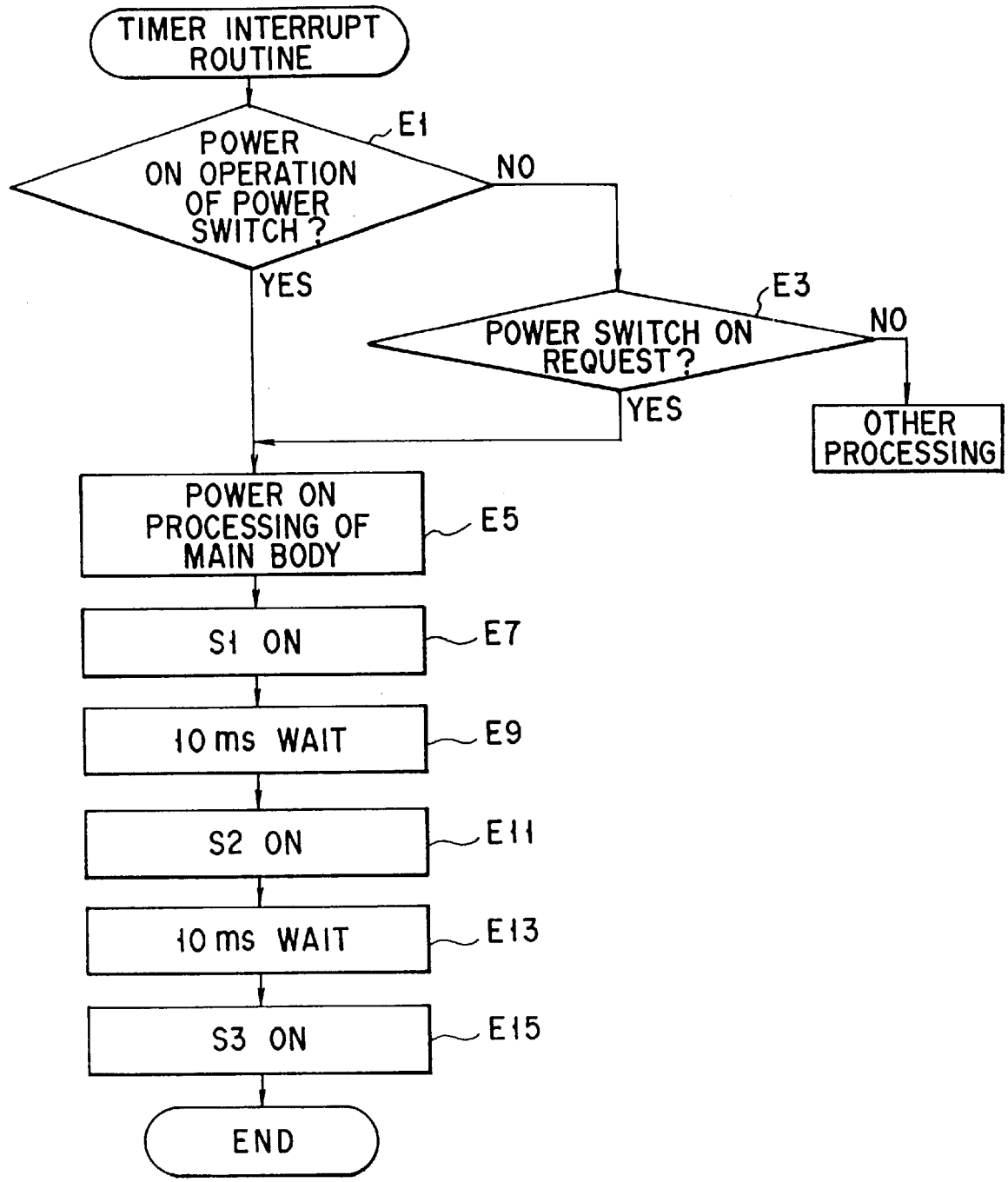
FIG. 16 is a flow chart for explaining an example of feed control of the AC power supplies in FIG. 15.

An example of feed control of AC power supply voltages to the power supply (AC) outlets PC1 to PC3 will be described below with reference to the flow chart in FIG. 16. The routine shown in FIG. 16 is executed in accordance with a predetermined timer interrupt.

The power supply control microprocessor 401 determines whether the power switch (SW4) is operated to power on the portable computer 4a (step E1). Particularly, when the power switch (SW4) is not operated to power on the portable computer 4a (NO in step E1), it is determined whether a power switch ON request is sent from the deskstation 5a (step E3). If no power switch ON request is sent, processing for determining execution of the power OFF processing of the portable computer 4a is performed. The power switch ON request is a command issued in accordance with the operation of the power switch provided to the deskstation 5a and sent through the communication connectors shown in the first and second embodiments.

When the power switch (SW4) is operated to power on the portable computer 4a (YES in step E1), or when the power switch ON request is set in the deskstation interface 404, (YES in step E3), the power supply control microprocessor 401 controls the power supply 402 to perform power ON processing of the portable computer 4a (step E5). With this operation, operating voltages are applied to the constituent elements of the portable computer 4a. Thereafter, the power supply control microprocessor 401 sends a predetermined control signal to the driver 66 through the deskstation interface 404, the deskstation 5a, and the cable 50a.

More specifically, the power supply control microprocessor 401 controls the driver 66 to turn on the switch S1 (step E7). With this operation, the outlet PC1 is enabled. After the switch S1 is turned on, the power supply control microprocessor 401 waits for 10 ms and further controls the driver 66 to turn on the switch S2 (steps E9 and E11). Thereafter, the power supply control microprocessor 401 waits for 10 ms again and then controls the driver 66 to turn on the switch S3 (steps E13 and E15).

With this processing, the switches S1 to S3 are sequentially turned on, and the outlets PC1 to PC3 are sequentially enabled accordingly.

With the above-described sequence control of the power supply (AC) outlets PC1 to PC3, a power ON/OFF sequence mechanism according to the system configuration can be easily realized. Disadvantages such as variations in voltage or breaker down caused by rapid power consumption due to rush can be prevented, thereby ensuring a stable operation. Additionally, the rated power of each equipment or line member can be suppressed to simplify the system.

Figure 17:
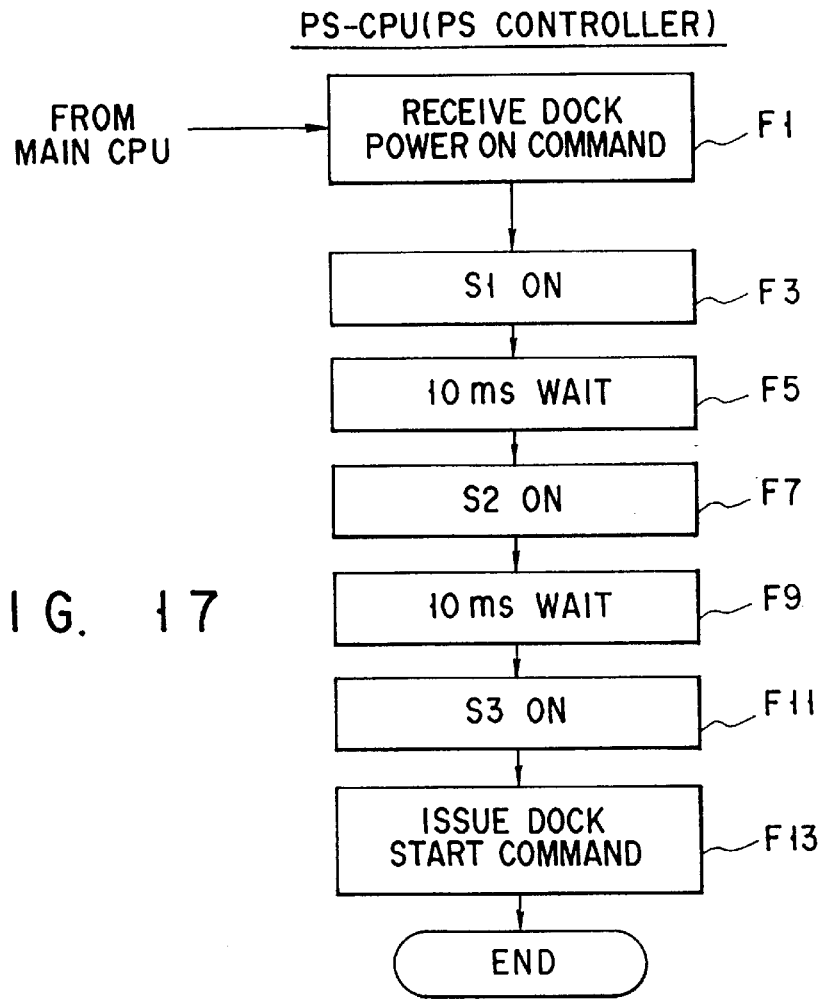
FIG. 17 is a flow chart for explaining an operation of hot/cold insertion of the portable computer with respect to the deskstation when feed control of the AC power supplies of the power supply outlets in the third embodiment is applied to the first embodiment.

In addition, when the power supply control microprocessor 401 is controlled in accordance with a flow chart shown in FIG. 17, the power supply outlet control can be applied to hot/cold insertion of the power supply controller 123 of the first embodiment. More specifically, the power supply control microprocessor 401 receives a dock power ON command sent from the CPU for controlling the entire portable computer 4a (step F1). The power supply control microprocessor 401 controls the driver 66 to turn on the switch S1 in accordance with this command (step F3). Thereafter, the power supply control microprocessor 401 sequentially turns on the switches S2 and S3 in a wait time of 10 ms (steps F5 to F11). After ON-control of the switches S1 to S3 is completed, and all the power supply outlets PC1 to PC3 are enabled, a dock start command is output to the deskstation 5a (step F13). With this operation, even when the power supply unit (PS-UNIT) 6a is provided to the computer system of the first embodiment, sequence control of the power supply outlets as in the third embodiment can be performed. When this control is to be applied to the second embodiment, sequence control may be performed in accordance with a dock completion command on the deskstation side.

Such sequence control can be performed by the power supply unit (PS-UNIT) 6a by providing a control processor to the power supply unit 6, as shown in FIG. 12.

An example in which the above-described lock mechanism control of the third embodiment is applied to the loading/ejecting operation of the first embodiment will be described below.

The control unit 56 of the deskstation main body 5 in FIG. 13 is constituted by a microprocessor for controlling the expansion unit main body (DS) 5. In this case, a power switch ON command for designating the ON/OFF operation of the power supply, which is input by operating the control key 57, is sent to the deskstation interface 404 shown in FIG. 15, and at the same time, the power supply (PS) 59 is controlled to apply three DC power supply voltages (PV) to internal circuits. In this embodiment, when the control key 57 is operated, a power supply control line which is pulled up in advance is shorted to the ground line to output a power switch ON command for designating the ON/OFF operation of the power supply. A designation for turning on the switches S1 to S3 may be sent to the driver 66 in accordance with this control key.

The status detection switch 58 detects that the portable computer (PC) 4 is set at a predetermined position of the portable computer mounting portion 51 and informs the detection state to the control unit 56. The status detection switch 58 corresponds to the switch S1 shown in the first and second embodiments.

For the descriptive convenience, it is assumed that the portable computer 4 has the same constituent elements as those of the portable computer 4a shown in FIG. 15. It is also assumed that the portable computer (PC) 4 has a control unit for controlling the entire portable computer (PC) 4.

Figure 18:
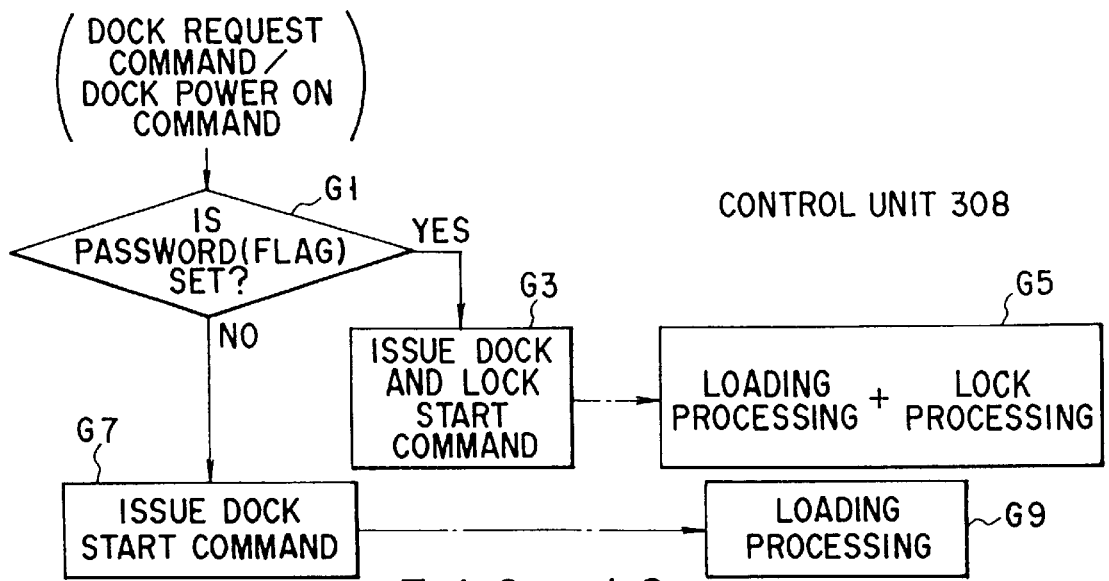
FIG. 18 is a flow chart for explaining the operation of lock mechanism control for connecting the portable computer to the deskstation when the lock mechanism control in the third embodiment is applied to the first embodiment.

An example in which control using the lock mechanism 54 is applied to the first embodiment will be described below with reference to FIGS. 18 and 19. In control shown in FIGS. 18 and 19, lock processing is performed at the time of docking in accordance with a password which is designated in advance, and unlock processing is performed at the time of undocking. The password may be input from a ten-key pad connectable to the deskstation 5, set using the control key 57, or set from a keyboard provided to the main body of the portable computer 4. The password is held in a predetermined nonvolatile memory in the portable computer 4. A flag (password flag) representing setting of the password is provided in the power supply control microprocessor 401. This lock processing can also be applied to the second embodiment.

First of all, loading processing will be described with reference to FIG. 18. In accordance with a dock request command sent from the deskstation 5 when the portable computer 4 is in a power OFF state, or in accordance with a dock power ON command from the control unit for controlling the entire portable computer 4 when the portable computer 4 is in a power ON state, the power supply control microprocessor 401 determines whether the password flag is set (step G1). If the password is set, a dock and lock start command is issued to the deskstation 5 (step G3). The control unit (CNT) 56 of the deskstation 5 executes loading processing in accordance with the dock and lock start command and drives the driving unit (DRV) 55 to operate the lock mechanism 54, thereby stationarily holding the portable computer (PC) 4 at a predetermined position of the mounting portion 51 (step G5).

If the password flag is not set (NO in step G1), a dock start command is issued, as in the first embodiment (step G5). The control unit 56 of the deskstation 5 executes only loading processing in accordance with the dock start command (step G7).

With the above processing, the above-described lock control can be applied to connect the portable computer 4 to the deskstation 5.

If the password is set while the portable computer 4 connected to the deskstation 5 without setting a password is being used, the driving unit (DRV) 55 may be driven in accordance with this setting to operate the lock mechanism 54, thereby stationarily holding the portable computer (PC) 4 at a predetermined position of the mounting portion 51.

An operation of detaching the portable computer 4 from the deskstation 5 will be described below with reference to FIG. 19.

The control unit 56 of the deskstation 5 issues an eject request command in accordance with the operation of the power switch provided to the deskstation 5 or the control key (step H1). The power supply control microprocessor 401 determines in accordance with the eject request command whether the password is set from the presence/absence of the password flag (step H3). If the password flag is not set (NO in step H3), an eject start command is issued (step H5). The control unit 56 of the deskstation 5 executes eject processing in response to the eject start command (step H7).

If the password flag is set (YES in step H3), the power supply control microprocessor 401 performs power ON processing (step H9). With this processing, the portable computer 4 is forcibly powered on.

Upon the forced power ON operation, the control unit of the portable computer 4 requests a password from the operator and checks whether the password is correct (step H11). If the received password is not correct (NG in step H11), the control unit of the portable computer 4 ends the processing. Thereafter, the control unit of the portable computer 4 may send a command for requesting the power OFF operation of the portable computer 4 to the power supply control microprocessor 401 such that the portable computer 4 is set in a power OFF state again.

If the received password is correct (OK in step H11), configuration set processing is performed as in the first embodiment (step H13). The control unit of the portable computer 4 performs predetermined processing and issues an eject permission command (step H15). The power supply control microprocessor 401 issues an unlock and eject start command in accordance with the eject permission command (step H17). The control unit 56 of the deskstation 5 executes unlock processing in accordance with the unlock and eject start command and thereafter performs eject processing (steps H19 and H17).

With the above processing, unlock control in detachment of the portable computer 4 from the deskstation 5 is performed. Independently of execution of the eject processing, a specific command may be input to operate the lock mechanism 54 for unlocking. However, it is necessary that the specific command input at this time is known by a few persons such as the manager of the computer system.

Figure 19:
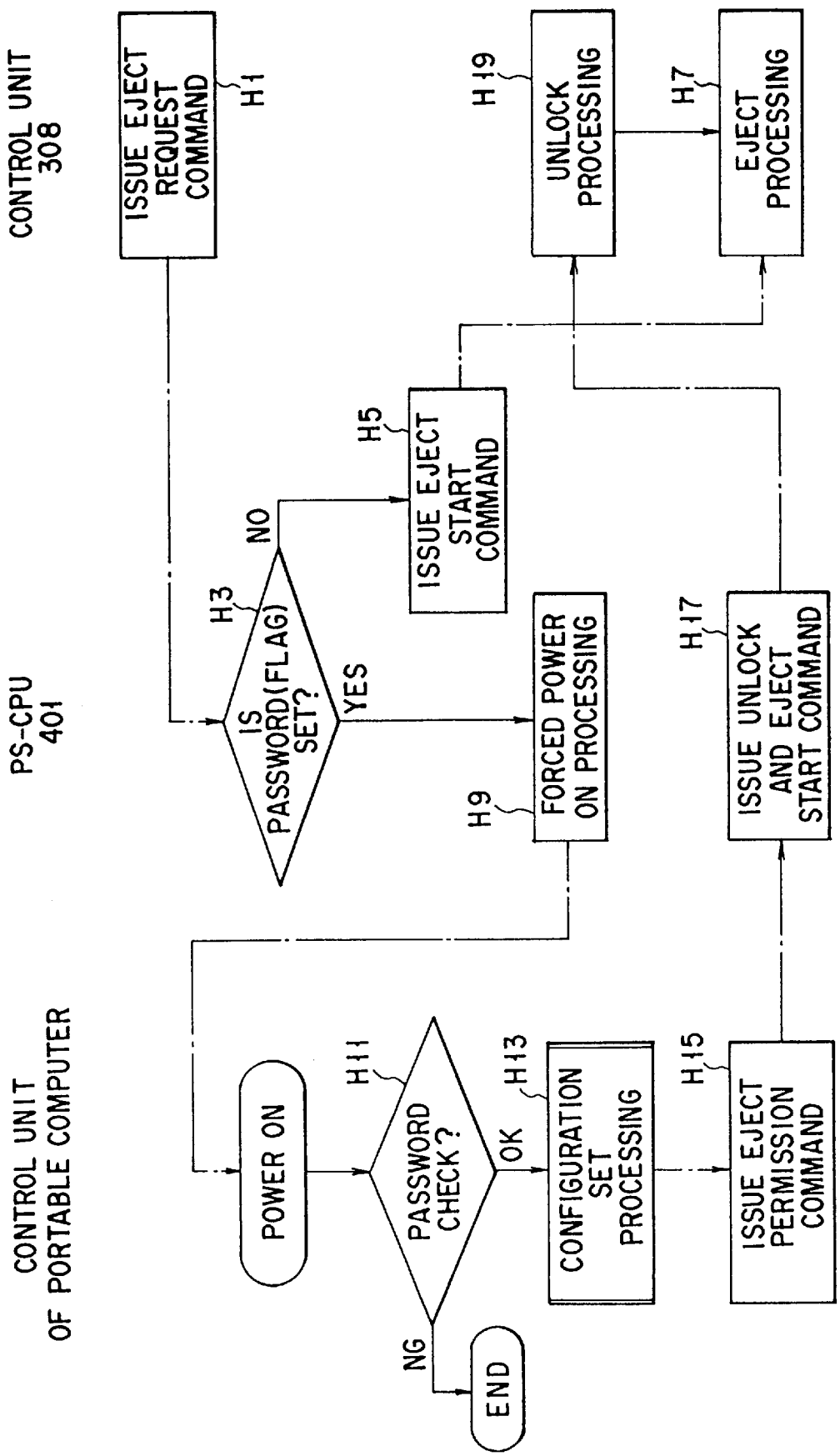
FIG. 19 is a flow chart for explaining the operation of lock mechanism control for detaching the portable computer from the deskstation when lock mechanism control in the third embodiment is applied to the first embodiment.

The processing in the flow chart of FIG. 19 shows an operation of detaching the portable computer 4 in a power OFF state, i.e., a cold ejecting operation. In a hot ejecting operation, processing for checking the password need to be performed in an SMI routine started by an SMI.

The above-described password may be held in a predetermined nonvolatile memory on the deskstation 5 side.

Registration/deletion management of the password used for control of the lock mechanism 54 will be described below with reference to FIGS. 45 and 46. It is assumed that password management is performed by the control unit 56 for controlling the entire deskstation 5. A password (PW) can be registered/deleted using the control key 57. FIG. 45 is a view showing an example of the control key 57. As shown in FIG. 45, the control key 57 has numeric keys "0" to "9", "." and "#" keys, a CLR (clear) key, an end key, and a return key. The control key 57 can be attached/detached to/from the deskstation 5. The password (PW) is held in an EEPROM provided in the deskstation 5. In addition to the password, a PW suspend flag representing whether the password is held, a PW check interruption flag representing that interrupt processing is performed during check of the password, and the like are held in the EEPROM.

Figure 46:
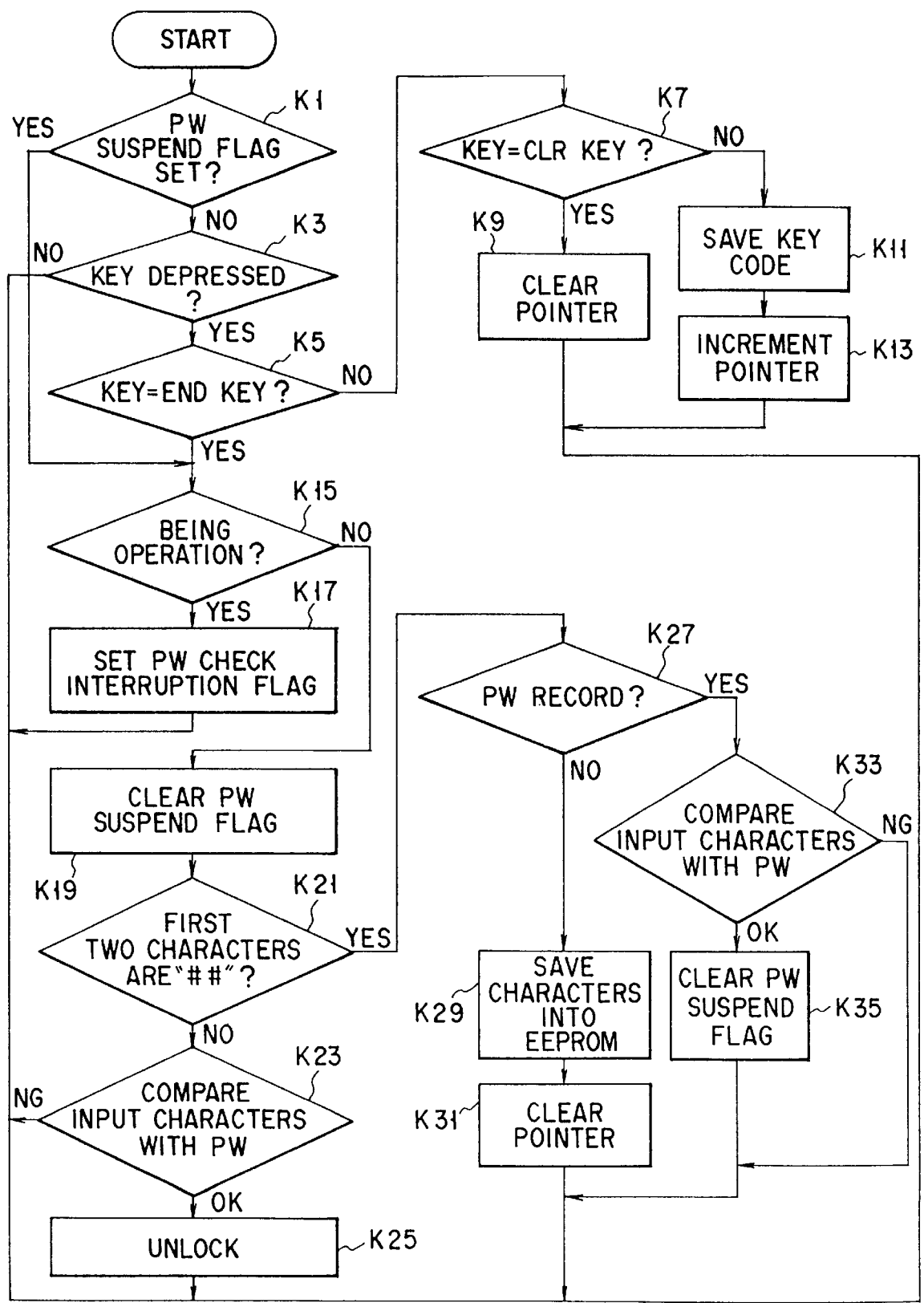
FIG. 46 is a flow chart for explaining password management using the control key shown in FIG. 45.

The control unit 56 executes the following processing in the flow chart of FIG. 46 in accordance with a timer interrupt every predetermined period of time. The control unit 56 determines whether the PW suspend flag is set in the EEPROM (step K1). If the suspend flag is not set (NO in step K1), key scan is performed to determine whether any key is depressed. If YES, it is determined whether the depressed key is the end key (steps K3 and K5). If any key of the control key 57 is not depressed (NO in step K3), password control processing is ended.

If the depressed key is not the end key (NO in step K5), it is determined whether the depressed key is the clear key (step K7). If the depressed key is the clear key (YES in step K7), a pointer is cleared. This pointer indicates a position in the register for holding a plurality of characters of a key code corresponding to character (numeric) keys input using the control key 57. If the depressed key is not the clear key (NO in step K7), a key code corresponding to the depressed key is stored in an area indicated by the pointer, and the pointer is incremented by one (steps K11 and K13).

When the PW suspend flag is not set in step K1, or when it is determined in step K5 that the end key is depressed, it is determined in the computer system including the deskstation 5 whether loading or eject processing is being executed (step K15). If some processing is being executed (YES in step K15), the PW check interrupt flag is set to a predetermined memory area (step K17), thereby ending the password control processing. If the processing which is being executed in step K17 is ended, the control unit 56 refers to the PW check interruption flag to determine whether password control processing is being performed. If the PW check interruption flag is set, processing in FIG. 46 is resumed.

In step K15, if neither loading nor eject processing is being executed, the PW suspend flag is cleared, and it is determined whether the first two of the received characters are "##" (steps K19 and K21). If the first two characters are not "##" (NO in step K21), the control unit 56 compares the characters which are input using the control key 57 with the password held in the EEPROM (step K23). If the input characters coincide with the held password (OK in step K23), the lock mechanism 54 is controlled to perform unlock processing (step K25). If the received characters do not coincide with the password (NG in step K23), the PW suspend flag is set again, thereby ending password processing.

If the first two of the received characters are "##" in step K21, the control unit 56 determines whether registration (deletion) of the password is to be performed (step K27). More specifically, when the first two of the received characters are "##", it is recognized that the characters input by the operator designate to register or delete the password, and it is determined whether the password is already input. If the password is not registered yet, characters subsequent to the third character are input as a password. Thereafter, the pointer is cleared (steps K29 and K31).

If the password is already registered (YES in step K27), the password held in the EEPROM is compared with the received characters (step K33). If the registered password coincides with the input characters (OK in step K35), the PW suspend flag is cleared, and registration of the password is canceled. If the password registered in the EEPROM does not coincide with the received characters (NG in step K33), input by the operator is ignored, thereby ending the processing.

With the above processing, password registration/deletion for driving the lock mechanism can be performed from the deskstation 5. Therefore, while the lock mechanism is being driven after registration of the password, the portable computer 4 is prevented from being detached from the deskstation 5 by a third party.

Figure 20:
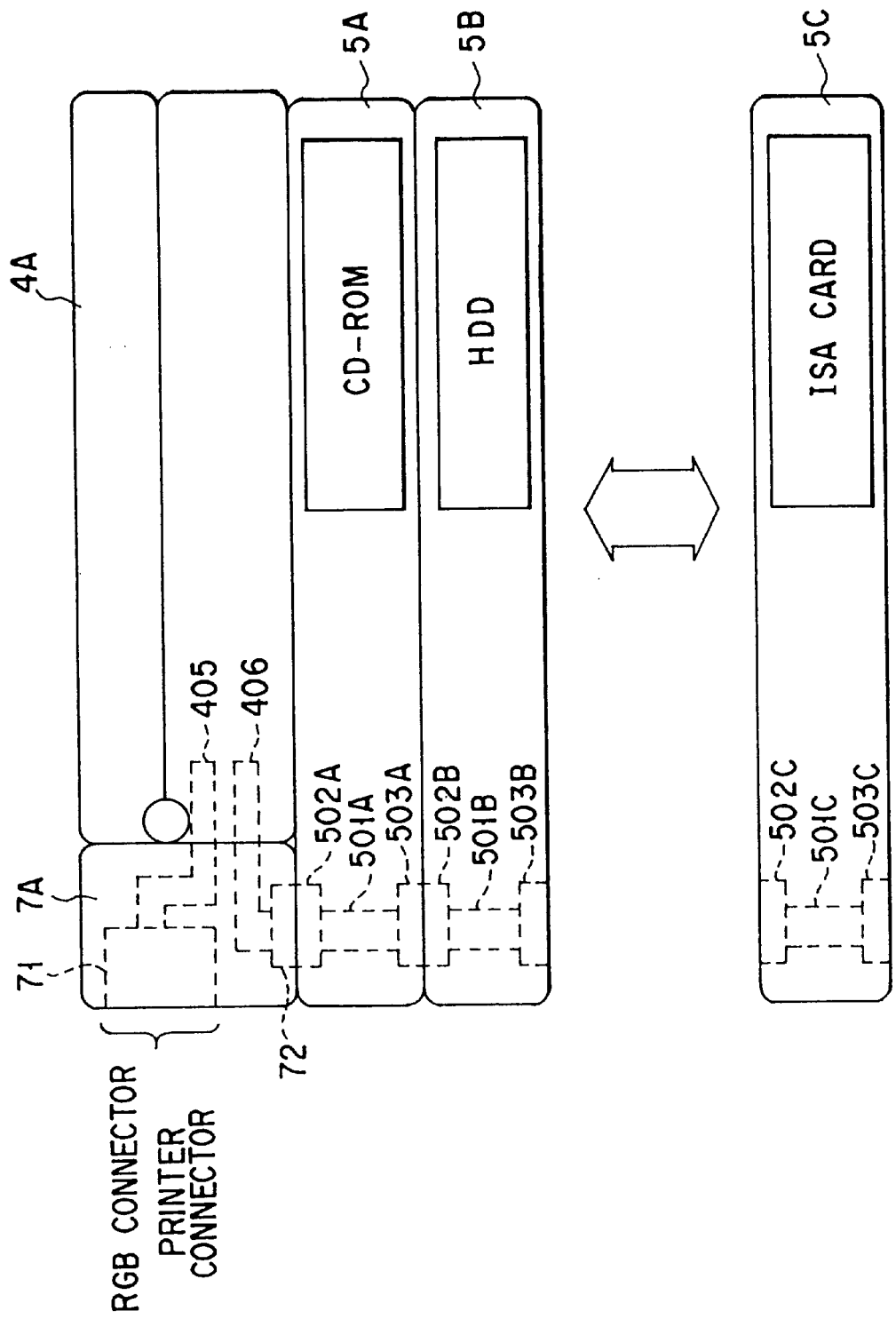
FIG. 20 is a side view showing a connection state of a computer system as a modification of the third embodiment, which is constituted by the portable computer, the port replicator, and a plurality of expansion units.

A modification of the third embodiment will be described below with reference to FIGS. 20 and 21. FIG. 20 is a side view showing a state in which a portable computer 4A, a port replicator 7A, and expansion units 5A and 5B are connected to each other. FIG. 21 is a perspective view of the portable computer 4A, and the port replicator 7A connected to the expansion units 5A and 5B.

A connector group 405 including an RGB connector and a printer connector, and an expansion connector 406 connected to a system bus in the portable computer 4A are provided on the rear surface of the portable computer 4A.

The port replicator 7A has a connector connectable to the connector group 405 and the expansion connector 406 of the portable computer 4A and is connected to the rear surface of the portable computer 4A. The port replicator 7A has a connector group 71 including an RGB connector and a printer connector on a surface opposite to that connected to the portable computer 4A. The connector group 71 is connected to the connector group 405 through the port replicator 7A. Therefore, the portable computer 4A can be connected to a CRT monitor, a printer, and the like through the port replicator 7A. With the port replicator 7A, the operator need not sequentially detach the terminals of external equipments connected to the rear surface before the portable computer 4A is carried. The operator only need to detach the port replicator 7A. To the contrary, when external equipments such as a CRT monitor and a printer are to be connected to the portable computer 4A, these external equipments can be used only by connecting the portable computer 4A to the port replicator 7A as far as desired external equipments are connected to the connector group 71 of the port replicator 7A in advance.

The port replicator 7A has an expansion connector 72 on the lower surface portion. The expansion connector 72 is connected inside the port replicator 7A to a connector which is connected in correspondence with the expansion connector 406 of the portable computer 4A. Therefore, when the portable computer 4A is connected to the port replicator 7A, the expansion connector connected to the bus of the portable computer 4A appears to the lower surface portion of the port replicator 7A.

The expansion units 5A and 5B are detachable. In FIG. 20, the expansion unit 5A is connected to the lower surface portions of the portable computer 4A and the port replicator 7A while the expansion unit 5B is connected to the lower surface portion of the expansion unit 5A. Each of the upper and lower surfaces of the expansion units 5A and 5B has the same area as that of the lower surface of the portable computer 4A and the port replicator 7A in a connected state. When the expansion units 5A and 5B are arranged as a single housing under the portable computer 4A and the port replicator 7A in a connected state, the expansion units 5A and 5B respectively have connectors 502A and 502B1 which oppose the expansion connector 72 of the port replicator 7A. The connectors 502A and 502B are connected to expansion connectors 503A and 503B in the lower surface portions through buses 501A and 501B in the expansion units 5A and 5B. Therefore, when the expansion unit 5A is arranged under the portable computer 4A and the port replicator 7A in a connected state, the expansion connector 72 of the port replicator 7A can be connected to the connector 502A provided on the upper surface of the expansion unit 5A. The expansion unit 5B also has the same structure.

In addition, one of the expansion units 5A and 5B can be connected to the upper surface of the other. As shown in FIG. 20, when the expansion unit 5B is arranged under the expansion unit 5A, the expansion connector 503A of the expansion unit 5A can be connected to the connector 502B of the expansion unit 5B.

With this arrangement, the portable computer 4A, the port replicator 7A, and the expansion units 5A and 5B can be connected to each other, as shown in FIG. 20. In this case, the system bus of the portable computer 4A is connected to an external equipment mounted in the expansion unit 5A through the expansion connector 406, the expansion connector 72 of the port replicator 7A, and the connector 502A and the bus 501A of the expansion unit 5A, and to an external equipment mounted in the expansion unit 5B through the expansion connector 503A, and the connector 502B of the expansion unit 5B. As shown in FIG. 20, a CD-ROM drive and a hard disk drive (HDD) are mounted in the expansion units 5A and 5B, respectively.

An additional expansion unit can be connected to this computer system. More specifically, as shown in FIG. 20, an expansion unit 5C having a communication card (ISA card) corresponding to an ISA bus can also be connected.

The computer system having the above configuration can effectively use the port replicator and easily connect an expansion unit having an expansion equipment. Therefore, the function can be easily expanded.

The fourth embodiment of the present invention will be described below with reference to the accompanying drawings.

FIG. 22 is a block diagram showing a system configuration according to the fourth embodiment of the present invention.

Referring to FIG. 22, a CPU (CPU device) 610 has a cache memory as one chip constituted by a semiconductor integrated circuit. The CPU 610 is constituted by bipolar CMOSs and has a control terminal (Pa) for receiving a clock stop control signal (STP-CLK) for stopping the clock to stop execution of a command, and a forced interrupt terminal (Pb) for receiving a forced interrupt (system management interrupt called an SMI is exemplified in this embodiment).

In the fourth embodiment, as control for decreasing the chip temperature of the CPU 610, CPU temperature control is exemplified in which the clock stop control signal (STP-CLK) supplied to the control terminal (Pa) is not used for the original clock stop control but for switching control for lowering the clock frequency supplied to the CPU 610 to decrease the speed, thereby decreasing the chip temperature.

In the chip of the CPU 610, a p-n junction circuit element 611 constituting, e.g., a silicon diode for measuring the temperature in the chip is arranged on an internal integrated circuit substrate constituting the CPU. Pins (Pc and Pd) dedicated to the p-n junction circuit element are assigned to the connection terminal portion of the chip.

As is known, a silicon diode constituted by the p-n junction circuit element 611 has temperature drift characteristics of about −2 to −2.5 mV/° C. Therefore, when a forward current path is formed between an anode and a cathode, the voltage on the anode side changes depending on the peripheral temperature, and the voltage becomes lower with an increase in temperature. As indicated by a broken line in FIG. 22, a forward current path is formed between the pins (Pc and Pd) dedicated to the p-n junction circuit element 611, and a signal with a change in voltage, which is obtained from the dedicated pins (Pc and Pd), is externally output as a temperature detection signal (TH).

The CPU 610 also has a PLL (phase locked loop) circuit 612 for generating an internal operating clock on the basis of a reference clock (B-CLK) input from the outside, an internal clock controller (G) 613 for controlling supply of the clock generated by the PLL (phase locked loop) circuit 612 to an internal circuit, and the like.

A system power supply control unit (PSC) 620 uses a microprocessor to realize an intelligent power supply. The system power supply control unit (PSC) 620 has an A/D (analog-to-digital) converter 621 and a power supply control microprocessor (μ p) 622. The power supply control microprocessor (μ p) 622 receives signal states from various observation targets through the A/D (analog-to-digital) converter 621 and recognizes the states, thereby controlling various power supplies and operations including the ON/OFF control of the operating power supply. In this embodiment, the temperature detection signal (TH) obtained from the pins (Pc and Pd) dedicated to the p-n junction circuit element 611 provided in the CPU 610 is supplied to the A/D (analog-to-digital) converter 621, and the analog temperature detection signal (TH) with a change in voltage is converted into a digital signal. The digital temperature detection signal (TH) is recognized by the power supply control microprocessor (μ p) 622 and compared with a predetermined set voltage value. When the value of the temperature detection signal (TH) exceeds the set voltage value, a CPU temperature control command for informing the state is set in a status register in a status LCD control gate array (SLCDC-GA) 630, and an SMI issue command is set in an SMI register in the gate array 630.

The gate array (SLCDC-GA) 630 is a peripheral control gate array having a register group including a status register and an SMI register. In this embodiment, the status LCD control gate array (SLCDC-GA) for performing display control of a status LCD (not shown) as a main function is exemplified. In this embodiment, an interrupt generation function using the status and SMI registers of the gate array is used. In accordance with various CPU temperature control commands issued when the temperature detection signal (TH) exceeds the set voltage value, predetermined status and SMI registers are set, and a system management interrupt (SMI) is issued from the system power supply control unit (PSC) 620.

A system control gate array (SYS.CONT-GA) 640 is a gate array incorporating various logic circuits for system control. The system control gate array (SYS.CONT-GA) 640 generates the system management interrupt (SMI) to the CPU 610 on the basis of the system management interrupt (SMI) as one factor for CPU temperature control, which is received from the status LCD control gate array (SLCDC-GA) 630, and outputs a clock switching signal (CLK-C), the clock stop control signal (STP-CLK), and the like under the control of the CPU 610.

A clock controller (CLK-CONT) 650 generates and outputs the reference clock (B-CLK) as a reference of the operating clock of the CPU 610. In this embodiment, the clock controller (CLK-CONT) 650 receives the clock switching control signal (CLK-C) output from the system control gate array (SYS.CONT-GA) 640, thereby switching the clock frequency. In this case, upon reception of the clock switching control signal (CLK-C), the clock supplied to the CPU 610 is retarded at a predetermined rate.

Figure 23A:
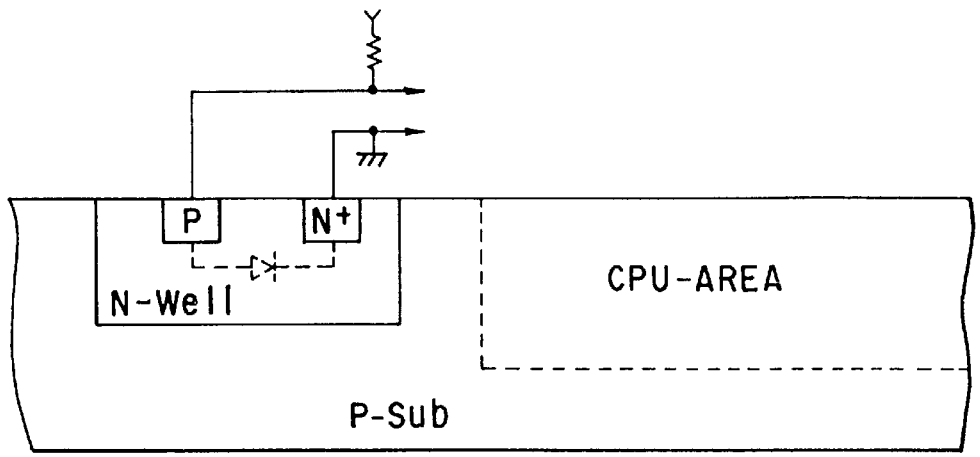
FIGS. 23A to 23C are sectional views showing mounting examples of a temperature detector in the fourth embodiment.

FIG. 23A is a sectional view showing the structure of the p-n junction circuit element 611 constituting, e.g., a silicon diode for measuring the temperature in the chip, which is arranged on the integrated circuit substrate in the CPU 610. Referring to FIG. 23A, P-Sub denotes a p-type semiconductor integrated circuit substrate; CPU-area, a circuit mounting area of the CPU 611 having a cache memory; and N-well, an n-type well.

FIGS. 24 and 25 are charts showing relationships between temperatures and processing in the above embodiment.

Tsd, Trst, and Tpof represent set temperatures for chip temperature control of the CPU 610. These set temperatures are compared with the temperature detection signal (TH) representing the chip temperature in the CPU 610 by the power supply control microprocessor (fp) 622 of the system power supply control unit (PSC) 620 and set to satisfy a relationship [Tsd<Trst<Tpof].

More specifically, Tsd is a set temperature for decreasing the speed of the CPU 610. When a chip temperature (CPU-TH) of the CPU 610 amounts to the set temperature Tsd, the system management interrupt (SMI) is issued from the power supply control microprocessor (μ p) 622 through the system control gate array (SYS.CONT-GA) 640 to decrease the speed (clock speed) of the CPU 610, thereby decreasing the heat amount of the CPU 610.

Trst is a set temperature for canceling (resetting) the speed-down control of the CPU 610. When the chip temperature (CPU-TH) of the CPU 610 falls to the set temperature Trst, the above speed-down operation is canceled, thereby restoring a normal processing speed according to setup or another setting means.

Tpof is a set temperature for performing a forced power OFF operation of the apparatus (system main body). When the chip temperature (CPU-TH) of the CPU 610 further increases regardless of the speed-down control according to the set temperature Tsd because of a severe application condition including peripheral environment, and amounts to the set temperature Tpof, the system management interrupt (SMI) is issued to execute auto resume processing (power OFF processing is performed after suspend processing).

As for a detailed means for recognizing the chip temperature (CPU-TH) by the power supply control microprocessor (μ p) 622, for example, a voltage input through the A/D (analog-to-digital) converter 621 is integrated during a time t, and an average value is defined as a voltage at a certain point of time.

$$V1 = \Sigma(\Delta V1)/t \tag{1}$$

A chip temperature T1 is obtained from a voltage V1, a known CPU reference temperature T0, a voltage V0, and a temperature drift coefficient A.

$$T1 = (V1 - V0)/A + T0 \tag{2}$$

The temperature T1 obtained by equation (2) is defined as the chip temperature (CPU-TH) of the CPU 610 and compared with the set temperatures Tsd, Trst, and Tpof.

FIG. 24 is a chart showing processing according to the set temperatures Tsd and Trst. P1 represents a timing when the system management interrupt (SMI) is issued to decrease the speed of the CPU 610. P2 represents a timing when the system management interrupt (SMI) is issued to restore the original speed of the CPU 610.

FIG. 25 is a chart showing processing according to the set temperature Tpof. Pa represents a timing when the system management interrupt (SMI) is issued to execute auto resume processing (power OFF processing is performed after suspend processing).

Figure 26:
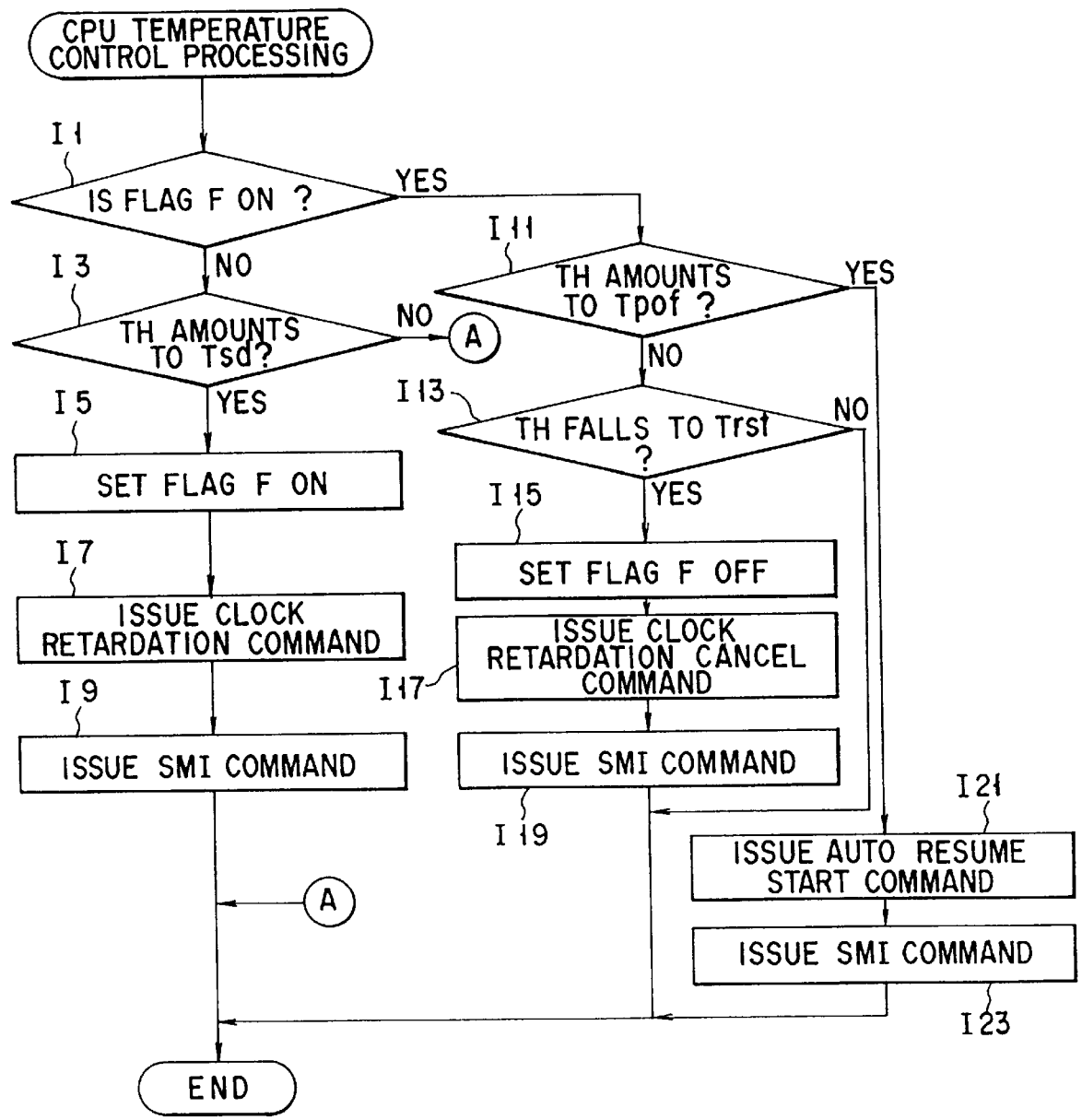
FIG. 26 is a flow chart for explaining temperature control in the fourth embodiment.

FIG. 26 is a flow chart showing the CPU temperature control processing routine executed by the power supply control microprocessor (μ p) 622 of the system power supply control unit (PSC) in this embodiment.

Figure 27:
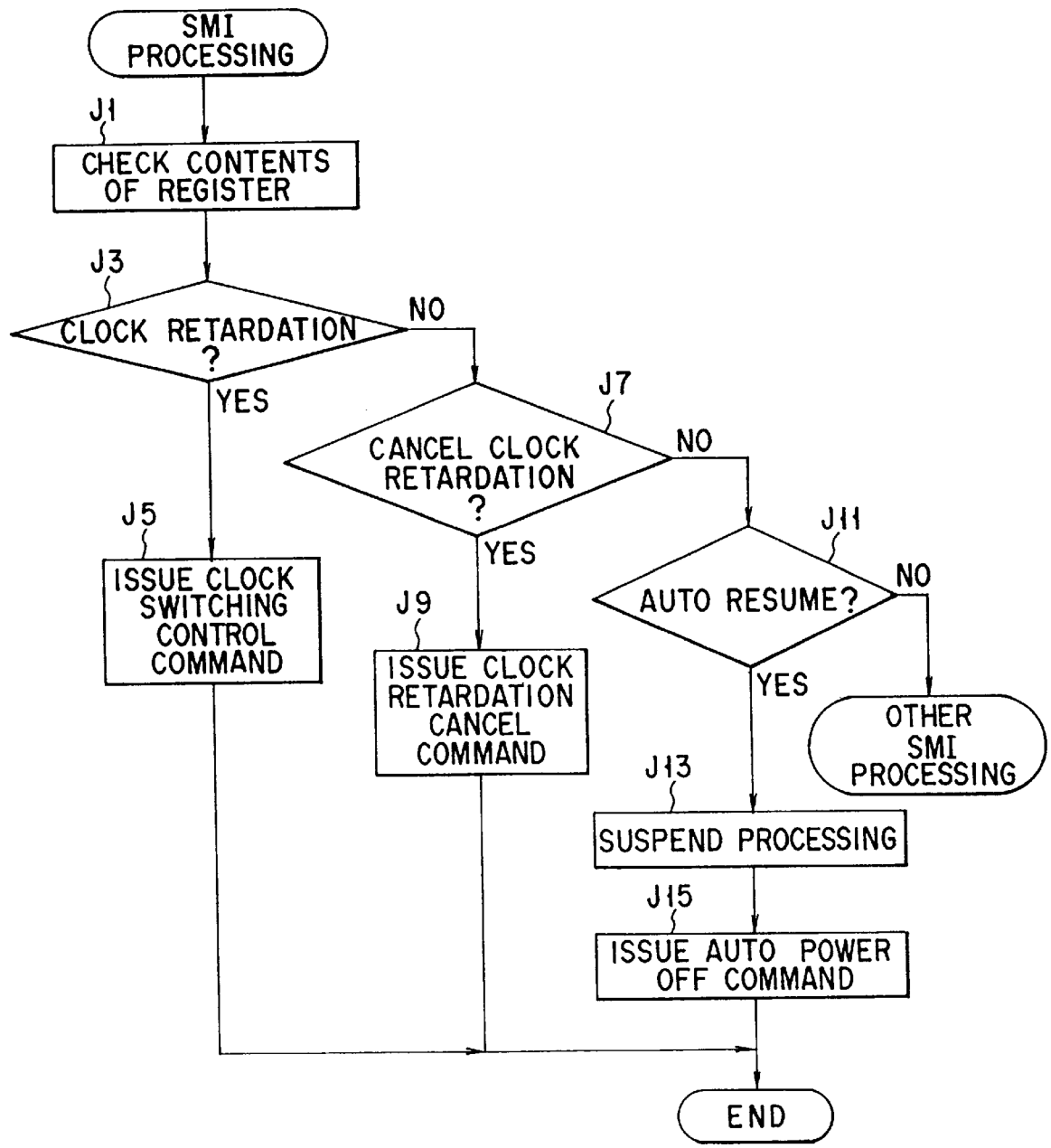
FIG. 27 is a flow chart for explaining SMI processing of the processing shown in FIG. 26.

FIG. 27 is a flow chart showing the SMI processing routine of CPU temperature control executed by the CPU 610 in this embodiment.

FIGS. 30A and 30B are timing charts for explaining a clock retardation control operation by CPU temperature control in this embodiment.

An operation according to the fourth embodiment of the present invention will be described below with reference to the above drawings. In the fourth embodiment, as control for decreasing the chip temperature of the CPU 610, CPU temperature control is exemplified in which the stop control signal (STP-CLK) supplied to the control terminal (Pa) is not used for the original clock stop control (FIGS. 31A and 31B) but for switching control for lowering the clock frequency supplied to the CPU 610 to decrease the speed, as shown in FIGS. 30A and 30B, thereby decreasing the chip temperature.

As shown in FIGS. 22 and 23A, a forward current path is formed between the dedicated pins (Pc and Pd) for externally guiding the two terminals (the anode and the cathode) of the p-n junction circuit element 611 arranged on the integrated circuit substrate of the CPU 610. The voltage between the pins (Pc and Pd) is changed by a temperature drift of the p-n junction circuit element 611, which is caused due to an increase in chip temperature.

More specifically, the p-n junction circuit element 611 directly receives heat generated in the chip and changes the detection voltage of the dedicated pins (Pc and Pd) with temperature drift characteristics of about −2 to −2.5 mV/° C. as the chip temperature increases. A signal with a change in voltage, which is obtained from the dedicated pins (Pc and Pd), is externally output from the CPU chip as the temperature detection signal (TH).

The temperature detection signal (TH) obtained from the dedicated pins (Pc and Pd) of the CPU chip is supplied to the A/D (analog-to-digital) converter 621 of the system power supply control unit (PSC) 620. The analog temperature detection signal (TH) with a change in voltage is converted into a digital signal.

The digital temperature detection signal (TH) is recognized by the power supply control microprocessor ($\mu$ p) 622 and compared with a predetermined set voltage value. When the value of the temperature detection signal (TH) exceeds the set voltage value, a CPU temperature control command for informing this state is set in the status register in the status LCD control gate array (SLCDC-GA) 630.

More specifically, the power supply control microprocessor ($\mu$ p) 622 of the system power supply control unit (PSC) 620 refers to a clock retardation control flag (F) provided in an internal register in the CPU temperature check routine (step I1 in FIG. 26). If the flag is set in an OFF state, the chip temperature (CPU-TH) according to the temperature detection signal (TH) is compared with the set temperature Tsd, thereby determining whether the chip temperature (CPU-TH) amounts to the set temperature Tsd (step I3).

Upon recognizing that the chip temperature (CPU-TH) according to the temperature detection signal (TH) amounts to the set temperature Tsd (timing P1 in FIG. 24), the power supply control microprocessor ($\mu$ p) 622 sets the clock retardation control flag (F) in the internal register to an ON state (step I5 in FIG. 26), issues a CPU temperature control command for designating clock retardation control, and sets the command in the status register in the status LCD control gate array (SLCDC-GA) 630. At the same time, the power supply control microprocessor ($\mu$ p) 622 sets the SMI register and issues the system management interrupt (SMI) from the system control gate array (SYS- CONT-GA) 640 through the SMI register (steps I7 and I9).

The system management interrupt (SMI) is input to the forced interrupt terminal (Pb) of the CPU 610.

Upon reception of the system management interrupt (SMI) by the forced interrupt terminal (Pb), the CPU 610 fetches the contents of the register of the status LCD control gate array (SLCDC-GA) 630 through a system bus (SYS-BUS) (step J1 in FIG. 27). If the contents of the register represent a CPU temperature control command for designating clock retardation control (YES in step J3), the clock stop control signal (STP-CLK) is output from the system control gate array (SYS.CONT-GA) 640 through the system bus (SYS-BUS), and thereafter, the clock switching control signal (CLK-C) is output (step J5).

The clock stop control signal (STP-CLK) is supplied to the control terminal (Pa) of the CPU 610 while the clock switching control signal (CLK-C) is supplied to the clock controller (CLK-CONT) 650.

Upon reception of the clock stop control signal (STP-CLK), the CPU 610 ends processing at a current clock period in a predetermined unit of processing and prepares for processing at a new clock speed. Upon reception of the clock switching control signal (CLK-C), the clock controller (CLK-CONT) 650 retards the clock supplied to the CPU 610 at a predetermined rate.

With this processing, the clock speed of the CPU 610 is retarded, and accordingly, the heat amount is reduced to decrease the chip temperature in the CPU 610.

When the clock retardation control flag (F) is referred to (step I1 in FIG. 26), and the flag (F) is in an ON state, the temperature detection signal (TH) is compared with the set temperature Tpof, thereby determining whether the chip temperature (CPU-TH) in the CPU 610 amounts to the set temperature Tpof (step I11 in FIG. 26).

Upon recognizing that the chip temperature (CPU-TH) in the CPU 610 amounts to the set temperature Tpof, an auto resume start command is issued and set in the status register in the status LCD control gate array (SLCDC-GA) 630, and the system management interrupt (SMI) is issued from the system control gate array (SYS.CONT-GA) 640 through the register (steps I21 and I23 in FIG. 26).

Upon reception of the system management interrupt (SMI), the CPU 610 fetches the contents of the register of the status LCD control gate array (SLCDC-GA) 630 through the system bus (SYS-BUS) (step J1 in FIG. 27). If the contents of the register represent an auto resume start command (YES in step J11), suspend processing is executed (step J13), and auto power OFF processing is executed (step J15).

If the clock retardation control flag (F) is in an OFF state (YES in step I1 in FIG. 26), and the chip temperature (CPU-TH) of the CPU 610 does not amount to the set temperature Tpof (NO in step I11), the temperature detection signal (TH) is compared with the set temperature Trst, thereby determining whether the chip temperature (CPU-TH) of the CPU 610 falls to the set temperature Trst (step I13).

Upon recognizing that the chip temperature (CPU-TH) of the CPU 610 falls to the set temperature Trst, the clock retardation control flag (F) is set in an OFF state (step I15), a clock retardation cancel command is issued and set in the status register in the status LCD control gate array (SLCDC-GA) 630, and the system management interrupt (SMI) is issued from the system control gate array (SYS.CONT-GA) 640 through the register (steps I17 and I19).

Upon reception of the system management interrupt (SMI), the CPU 610 fetches the contents of the register of the status LCD control gate array (SLCDC-GA) 630 through the system bus (SYS-BUS) (step J1 in FIG. 27). If the contents of the register represent a CPU temperature control command for clock retardation cancel (YES in step J7), a clock retardation cancel command is issued to cancel the clock switching control signal (CLK-C) output from the system control gate array (SYS.CONT-GA) 640 through the system bus (SYS-BUS) (step J9).

When the clock switching control signal (CLK-C) is canceled, the clock controller (CLK-CONT) 650 restores the speed of the clock supplied to the CPU 610 to the original speed according to setup or another setting means, thereby restoring the operation of the CPU 610 to the normal processing speed.

In the above embodiment, as control for decreasing the chip temperature of the CPU 610, the clock frequency supplied to the CPU 610 is lowered to decrease the speed, thereby decreasing the chip temperature. Instead, as shown in FIGS. 31A and 31B, temperature decrease control can also be used in which an internal clock (CPU-CLK) is intermittently stopped for a predetermined period of time in accordance with the stop control signal (STP-CLK) supplied to the control terminal (Pa) of the CPU 610 when a CPU temperature control SMI is issued.

More specifically, upon recognizing that the chip temperature (CPU-TH) of the CPU 610 amounts to the set temperature Tsd (timing P1 in FIG. 24), the power supply control microprocessor (fp) 622 sets the clock retardation control flag (F) provided in the internal register to an ON state, issues a clock stop command and sets it in the status register in the status LCD control gate array (SLCDC-GA) 630, and issues the system management interrupt (SMI) from the system control gate array (SYS.CONT-GA) 640 through the register.

Upon reception of the system management interrupt (SMI), the CPU 610 fetches the contents of the register of the status LCD control gate array (SLCDC-GA) 630 through the system bus (SYS-BUS). If the contents of the register represent a clock stop command, the clock stop control signal (STP-CLK) is output from the system control gate array (SYS.CONT-GA) 640 through the system bus (SYS-BUS).

The clock stop control signal (STP-CLK) is supplied to the control terminal (Pa) of the CPU 610.

Upon reception of the clock stop control signal (STP-CLK) at the control terminal (Pa), the CPU 610 intermittently stops the internal clock to execute processing while setting an OFF time having a predetermined period. By setting an OFF time having a predetermined period, temperature decrease control is performed to fall the chip temperature of the CPU 610.

Upon recognizing that the chip temperature (CPU-TH) of the CPU 610 falls to the set temperature Trst, clock stop control is canceled to restore the normal operation.

With this chip temperature control, the change in chip temperature of the CPU 610 can be rapidly and accurately reflected to control of the internal circuit of the CPU 610, thereby suppressing an increase in chip temperature of the CPU 610.

Instead of the above temperature control for lowering the clock frequency, or temperature control for intermittently stopping the internal clock while setting an OFF time having a predetermined period, temperature control for executing a HALT instruction in accordance with issue of the SMI can also be performed, as shown in FIGS. 31A and 31B. More specifically, when the CPU temperature control SMI is issued, the HALT instruction is executed, and an interrupt or the like is generated after a predetermined period of time to perform the normal operation. In the HALT state, the operation of the internal circuit is stopped, so that the heat amount of the chip temperature is decreased.

Modifications of the fourth embodiment will be described below with reference to FIGS. 23B, 23C, 28, and 29.

FIGS. 23B, 23C, 28, and 29 shows other embodiments of the chip temperature detection element of the CPU 610.

Figure 23B:
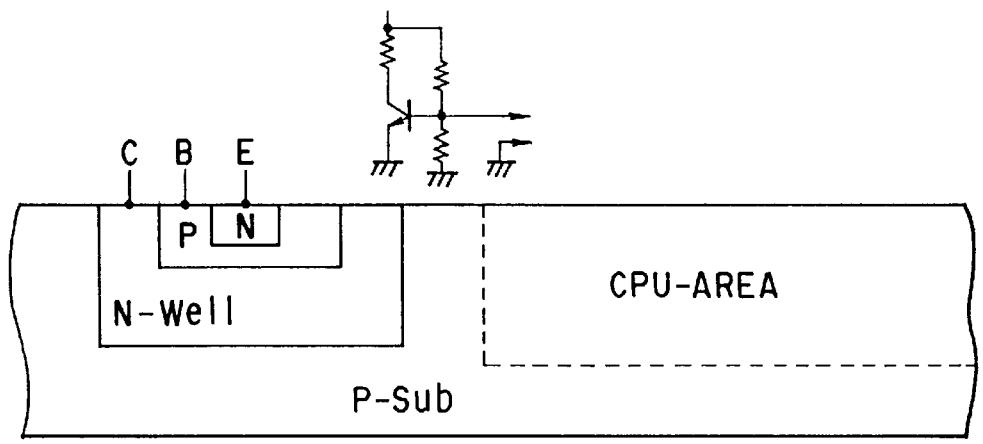

In FIG. 23B, in place of the p-n junction circuit element 611 of the embodiment shown in FIG. 23A, a transistor circuit element is arranged near the heat generating portion (hot spot) of the integrated circuit substrate in the chip of the CPU 610 as an element for measuring the internal temperature of the chip.

The temperature detector using the transistor circuit element also has temperature drift characteristics as in the p-n junction circuit element 611 of the embodiment shown in FIG. 23A. For this reason, the temperature in the chip can be directly monitored by monitoring a base-to-emitter voltage.

Figure 23C:
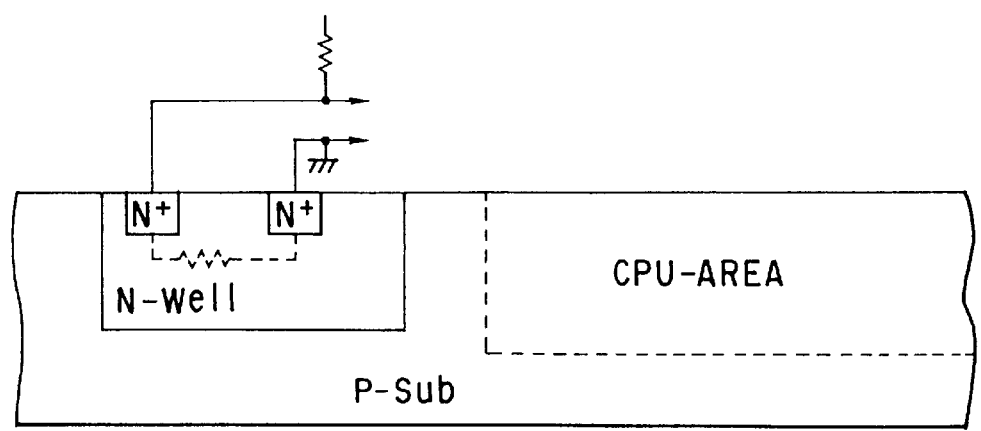

In FIG. 23C, in place of the p-n junction circuit element 611 of the embodiment shown in FIG. 23A, a thermistor circuit element is buried near the heat generating portion (hot spot) of the integrated circuit substrate in the chip of the CPU 610 as an element for measuring the internal temperature of the chip.

In the temperature detector using the thermistor circuit element, when a change in resistance according to a change in temperature of the thermistor circuit element is detected by a voltage, the temperature in the chip can be directly monitored.

Figure 28:
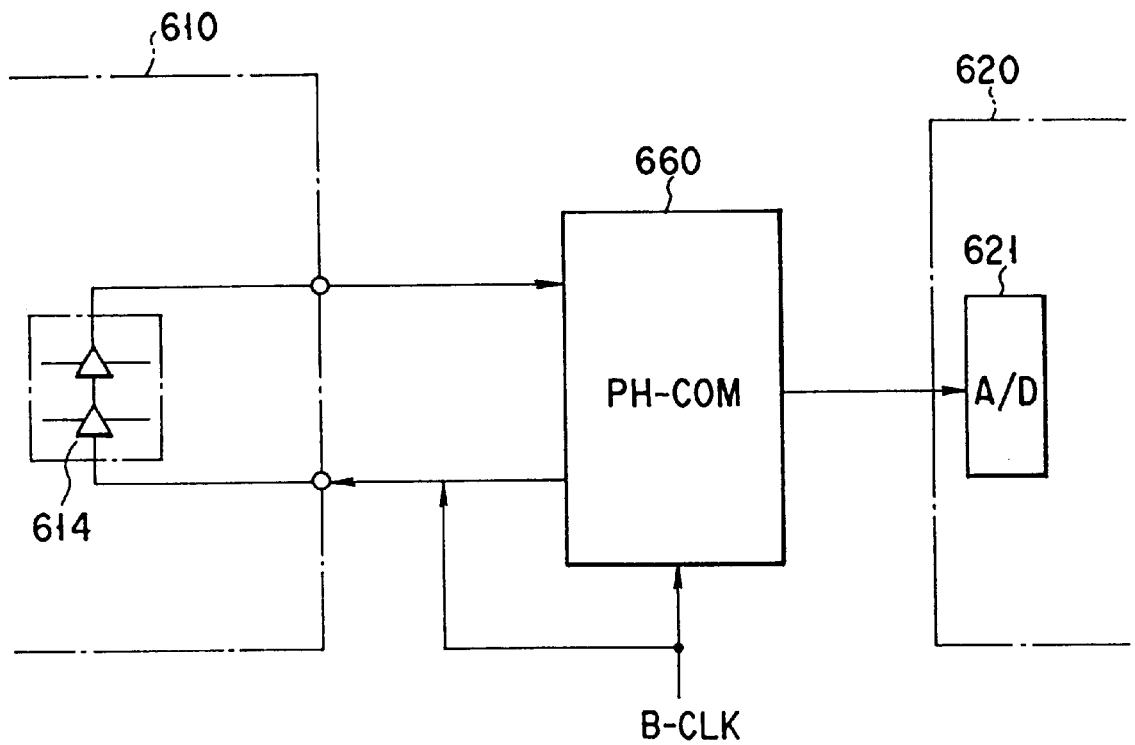
FIG. 28 is a view showing a mounting example of the temperature detector in the fourth embodiment.

In FIG. 28, as an element for measuring the internal temperature of the chip, a buffer circuit 614 is buried near the heat generating portion (hot spot) of the integrated circuit substrate of the chip of the CPU 610, and a response delay caused due to a change in temperature in the chip is used to measure the temperature in the chip. In this case, the reference clock (B-CLK) with a predetermined frequency is applied to the buffer circuit 614, and an output from the buffer circuit 614 is supplied to a phase comparator (PH-COM) 660. Phase comparison with respect to the reference clock (B-CLK) is performed, and the chip temperature is detected from an analog signal according to the duty ratio.

Figure 29:
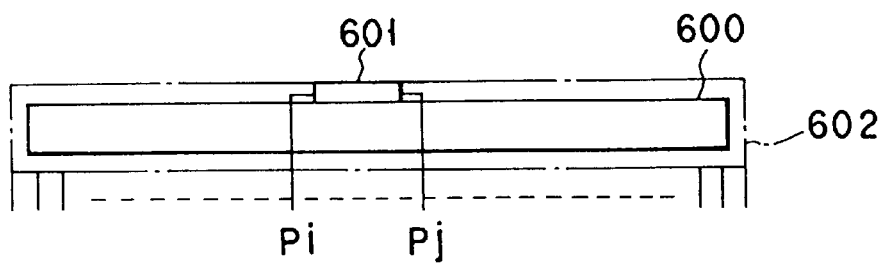
FIG. 29 is a view showing a mounting example of the temperature detector in the fourth embodiment.

FIG. 29 shows a CPU chip 602. The CPU chip 602 is constituted by integrally forming a temperature measurement element (chip) 601 and an integrated circuit substrate 600 of the CPU 610 with a molding resin. In the CPU chip 602, the temperature measurement element 602 is arranged at the heat generating portion (hot spot) on the integrated circuit substrate 600, and dedicated pins (Pi and Pj) are provided, thereby performing temperature control similar to the above embodiment.

In the embodiments shown in FIGS. 23A to 23C, 28, and 29, instead of arranging a single temperature detection element, a plurality of temperature detection elements may be arranged on the integrated circuit substrate to detect the chip temperature. In this case, the temperature detection elements are separately provided at a plurality of portions on the integrated circuit substrate. In either an arrangement in which these temperature detection elements are connected in series, and one or two dedicated pins are assigned for temperature detection or an arrangement in which one or two dedicated pins are assigned to the respective temperature detection elements which are separately arranged at a plurality of portions on the integrated circuit substrate, the detection precision and response characteristics can be further improved.

In the above embodiment, two dedicated pins are assigned to the temperature detection element. However, one terminal of the element may be connected to a ground terminal (GND) or another specific pin, and one dedicated pin may be assigned to the temperature detection element.

As described above in detail, according to the present invention, a one-chip controller capable of rapidly and accurately recognizing a change in temperature in the chip can be provided. In addition, the change in temperature in the one-chip controller can be rapidly and accurately reflected to circuit control in the one-chip controller, thereby efficiently driving and controlling the one-chip controller to almost the operating limitation.

The fifth embodiment according to the present invention will be described below. The method described in the fourth embodiment can be applied to or combined with temperature detection and clock control in the fifth embodiment (to be described later). Additionally, in the fifth embodiment, a fan is arranged in the deskstation to cool a heat generating portion such as a CPU and a CPU board.

Figure 33A:
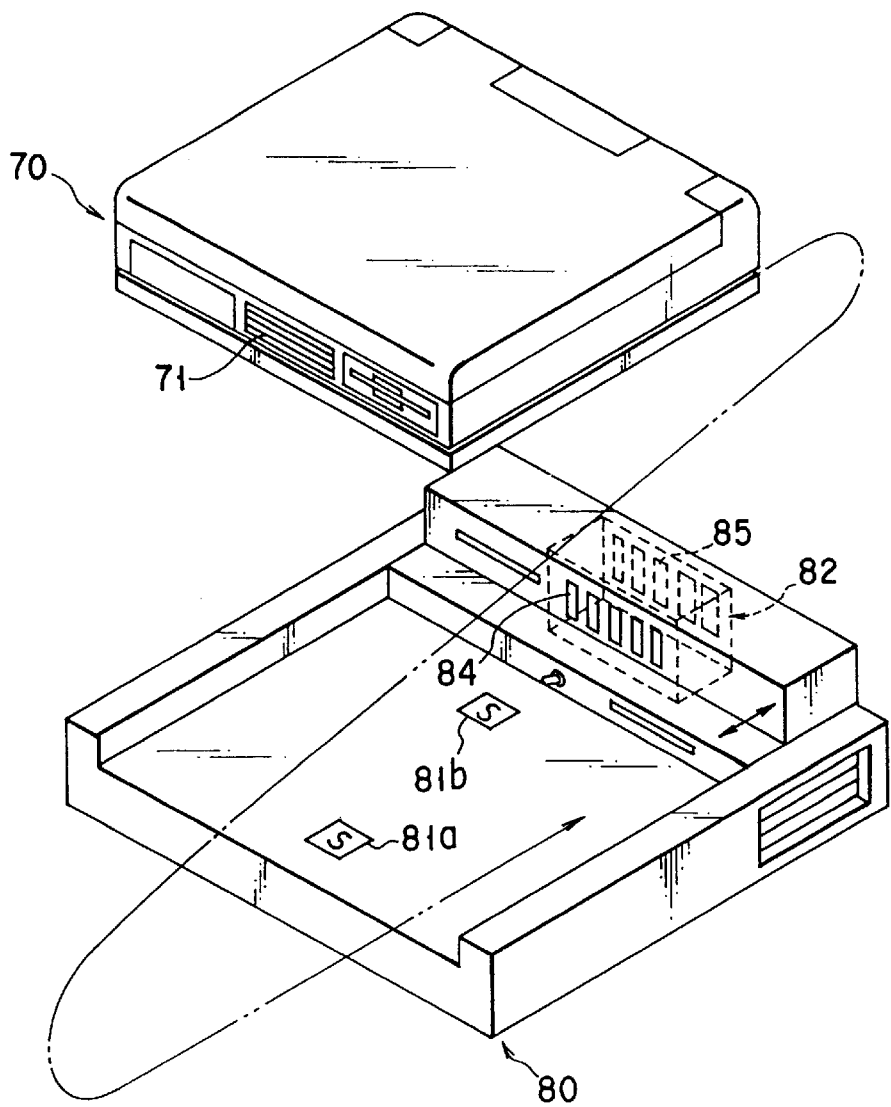
Figure 33B:
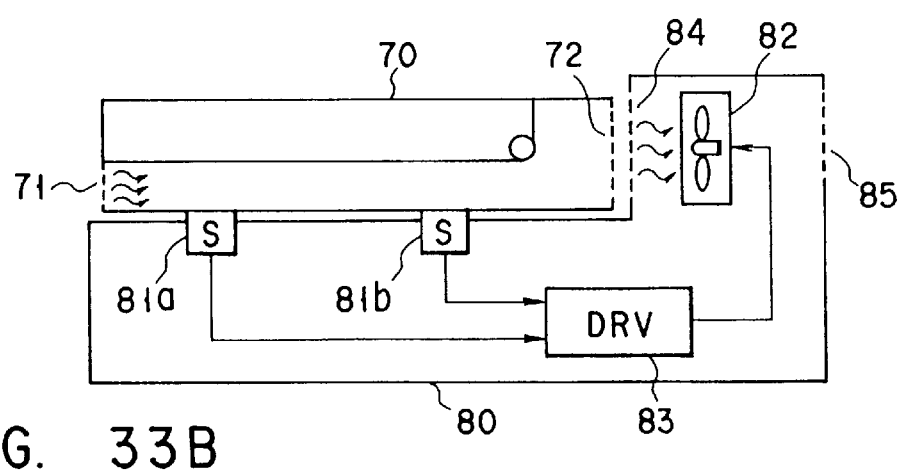

The first example of the fifth embodiment is shown in FIGS. 33A and 33B. A computer system shown in FIGS. 33A and 33B is constituted by a portable computer 70 and a deskstation 80 used to expand the function of the portable computer 70. The portable computer 70 can be attached/detached to/from the deskstation 80, as shown in FIG. 33A, and the control in the first or second embodiment can be applied for attachment/detachment.

FIG. 33B shows the structure of the computer system. As shown in FIG. 33B, the portable computer 70 has a suction port 71 in the front surface of the main body and an exhaust port 72 in the rear surface. The deskstation 80 used to expand the function of the portable computer 70 has sensors (S) 81$a$ and 81$b$, a fan 82, and a drive controller (DRV) 83. The deskstation 80 also has a suction port 84 in a surface connected to an expansion or communication connector and an exhaust port 85 for exhausting air in the rear surface. When the portable computer 70 is loaded in (connected to) the deskstation 80, the exhaust port 72 of the portable computer 70 contacts the suction port 84 of the deskstation 80 to oppose each other.

The sensors 81$a$ and 81$b$ detect the temperature of a CPU chip (CPU board) incorporated in the portable computer 70 mounted in the deskstation 80. Two sensors are provided in this embodiment. However, for the purpose of cooling the CPU chip, only one sensor may be sufficiently arranged near the CPU chip. The fan 82 draws hot air in the portable computer 70 through the suction port 84 and externally exhausts the air through the exhaust port 85 under the control of the drive controller 83. The drive controller 83 controls the fan 82 in accordance with detection signals from the sensors 81$a$ and 81$b$, thereby exchanging air in the portable computer 70, which is heated by the heat generating portion such as the CPU chip and the CPU board. With this operation, when the portable computer 70 is mounted in the deskstation 80 serving as a function expansion unit, degradation in heat dissipation of the portable computer 70 can be covered, thereby maintaining a reliable function expansion operation.

In this structure, the internal temperature of the portable computer 70 mounted in the portable computer mounting portion of the deskstation 80 is detected by the temperature sensors (S) 81$a$ and 81$b$, and detection signals are supplied to the drive controller (DRV) 83.

When one of detection temperatures from the temperature sensors (S) 81$a$ and 81$b$ amounts to a set temperature, the drive controller (DRV) 83 drives the air-cooling fan 82 to draw hot air in the portable computer 70 through the exhaust port 72 and the suction port 84 and exhaust the air through the exhaust port 85.

With this cooling mechanism of the portable computer, degradation in heat dissipation of the portable computer 70 mounted in the deskstation 80 can be covered, thereby maintaining a reliable function expansion operation. The fan 82 is driven to draw air in the portable computer 70. However, air cooled in the deskstation 80 may be exhausted into the portable computer 70.

In addition, the computer system can also have a structure in which the sensors are arranged in the portable computer 70, and signals representing values detected by the sensors are sent to the deskstation 80 through, e.g., the communication connector shown in the first or second embodiment, thereby executing the above control in the deskstation 80. In this case, the function of the drive controller may be provided to a deskstation controller for controlling the entire deskstation.

The second example of the fifth embodiment will be described below with reference to FIGS. 34A and 34B.

Figure 34A:
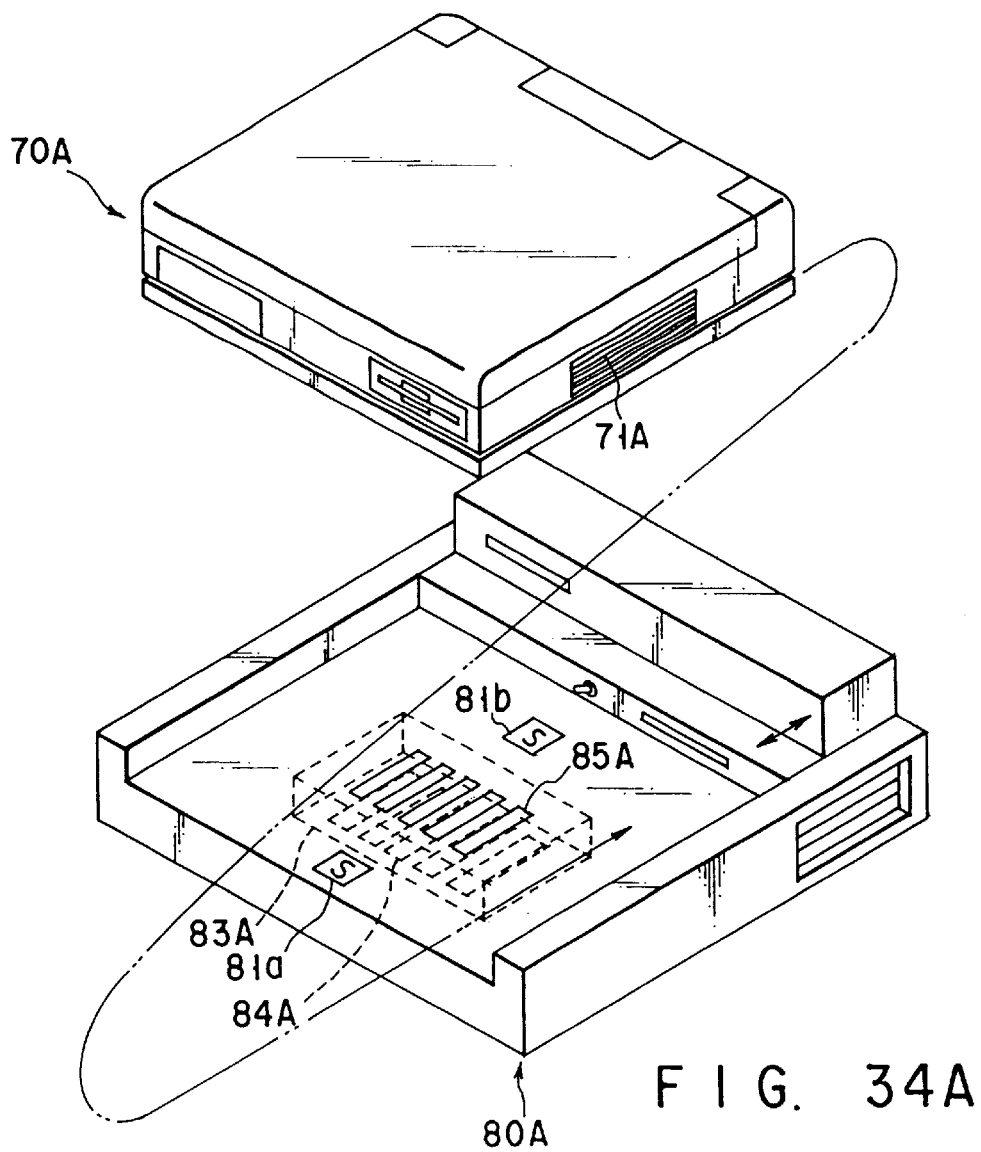
Figure 34B:
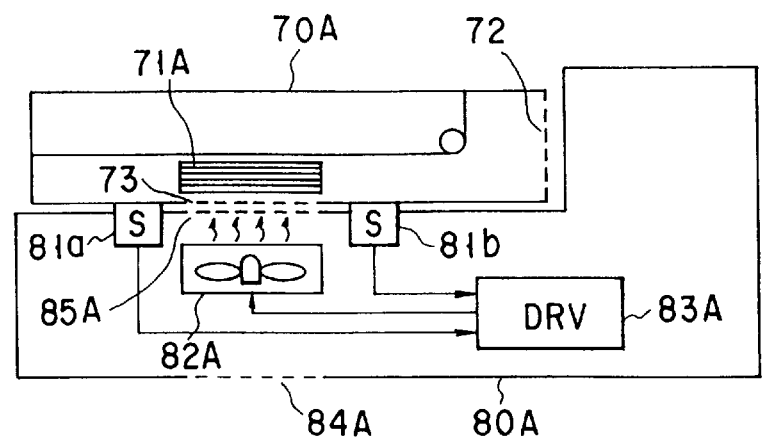

A computer system shown in FIGS. 34A and 34B is also constituted by a portable computer 70A and a deskstation 80A used to expand the function of the portable computer 70A. As in the first example, the deskstation has a fan. However, in the deskstation 80A, the fan is arranged below a position where the portable computer is loaded and sends cooled air into the portable computer.

FIG. 34B shows the structure of the computer system of the second example. As shown in FIG. 34B, the portable computer 70A has exhaust ports 71A in both the side surfaces of the main body and the exhaust port 72 on the rear surface. A suction port 73 for drawing cooled air blown from the deskstation 80A is formed in the bottom surface of the portable computer 70A. The deskstation 80A used to expand the function of the portable computer 70A has the sensors (S) 81$a$ and 81$b$, a fan 82A, and a drive controller 83A, as in the first example. The deskstation 80A also has a suction port 84A in its bottom surface, and an exhaust port 85A for exhausting the cooled air in a surface which contacts the bottom surface of the portable computer 70A upon connection to the portable computer 70A. When the portable computer 70A is loaded in (connected to) the deskstation 80A, the exhaust port 73 of the portable computer 70A contacts the suction port 85A of the deskstation 80A to oppose each other.

The sensors 81$a$ and 81$b$ detect the temperatures of the CPU chip (CPU board) incorporated in the portable computer 70A mounted in the deskstation 80A. Two sensors are provided in this embodiment. However, for the purpose of cooling the CPU chip, only one sensor may be sufficiently arranged near the CPU chip. The fan 82A blows external air drawn from the suction port 84A, or cooled air if a mechanism for cooling the air is arranged, into the portable computer 70A under the control of the drive controller 83A. The drive controller 83A controls the fan 82A in accordance with detection signals from the sensors 81$a$ and 81$b$, thereby exchanging air in the portable computer 70A, which is heated by the heat generating portion such as the CPU chip and the CPU board. With this operation, when the portable computer 70A is mounted in the deskstation 80A serving as a function expansion unit, degradation in heat dissipation of the portable computer 70A can be covered, thereby maintaining a reliable function expansion operation.

An operation in this structure is the same as that of the first example, and a detailed description thereof will be omitted. With this cooling mechanism of the portable computer, degradation in heat dissipation of the portable computer 70A mounted in the deskstation 80A can be covered, thereby maintaining a reliable function expansion operation. The fan 82A may be driven to draw air in the portable computer 70A, as in the first example.

In addition, the computer system can also have a structure in which the sensors are arranged in the portable computer 70A, and signals representing values detected by the sensors are sent to the deskstation 80A through, e.g., the communication connector shown in the first or second embodiment, thereby executing the above drive control in the deskstation 80A.

Some variations of temperature detection of the CPU chip in temperature control shown in the first and second examples will be described below.

The first variation is shown in FIG. 35. Referring to FIG. 35, a CPU board 710 has the mounting circuit pattern of a CPU. A CPU chip 711 is mounted at the CPU mounting position of the CPU board 710.

A temperature sensor (S) 712 is directly attached to the CPU chip 711 and directly detects the temperature of the heat generating portion of the CPU chip 711.

An air-cooling fan 713 blows cooled air to the CPU chip 711. A fan drive controller (DRV) 714 drives and controls the air-cooling fan 713 on the basis of a detection signal from the temperature sensor (S) 712.

When the detection temperature from the temperature sensor (S) 712 amounts to a set value, the fan drive controller (DRV) 714 drives the air-cooling fan 713 to blow cooled air to the CPU chip 711.

In the above structure, the surface temperature of the CPU chip 711 is detected by the temperature sensor (S) 712, and a detection signal is supplied to the fan drive controller (DRV) 714.

When the detection temperature from the temperature sensor (S) 712 amounts to the set temperature, the fan drive controller (DRV) 714 drives the air-cooling fan 713 to blow cooled air to the CPU chip 711. The fan drive controller (DRV) 714 may also drive the fan 713 to draw and exhaust air heated by the CPU 711, as shown in the first example.

With the structure in which the fan 713 for cooling the CPU chip 711 is directly driven and controlled on the basis of the detection signal from the temperature sensor (S) 712 directly attached to the CPU chip 711, the temperature of the CPU chip 711 can be immediately (i.e., with a largely shortened delay time) reflected on cooling control of the CPU chip 711. Therefore, the performance of the CPU chip 711 can be sufficiently used to realize a high-speed operation of the CPU chip at an almost threshold frequency.

The second variation is shown in FIG. 36. Referring to FIG. 36, a CPU board 720 has the mounting circuit pattern of a CPU. A CPU chip 721 is mounted at the CPU mounting position of the CPU board 720.

A temperature sensor (S) 722 is arranged at the CPU chip mounting portion of the CPU chip 721 and directly detects the temperature of the heat generating portion of the chip from the lower surface of the CPU chip 721.

An air-cooling fan 723 blows cooled air to the CPU chip 721. A fan drive controller (DRV) 724 drives and controls the air-cooling fan 723 on the basis of a detection signal from the temperature sensor (S) 722.

When the detection temperature from the temperature sensor (S) 722 amounts to a set value, the fan drive controller (DRV) 724 drives the air-cooling fan 723 to blow cooled air to the CPU chip 721.

In the above structure, the temperature of the CPU chip 721 is detected by the temperature sensor (S) 722, and a detection signal is supplied to the fan drive controller (DRV) 724.

When the detection temperature from the temperature sensor (S) 722 amounts to the set temperature, the fan drive controller (DRV) 724 drives the air-cooling fan 723 to blow cooled air to the CPU chip 721.

With the structure in which the fan 723 for cooling the CPU chip 721 is directly driven and controlled on the basis of the detection signal from the temperature sensor (S) 722 directly attached to the CPU chip 721, the temperature of the CPU chip 721 can be immediately (i.e., with a largely shortened delay time) reflected on cooling control of the CPU chip 721. Therefore, the performance of the CPU chip 721 can be sufficiently used to realize a high-speed operation of the CPU chip at an almost threshold frequency.

The third variation is shown in FIG. 37. Referring to FIG. 37, a CPU board 730 has the mounting circuit pattern of a CPU. A CPU chip 731 is mounted at the CPU mounting position of the CPU board 730, and fins (F) for radiating the heat of the chip are arranged at the upper surface portion of the chip.

A temperature sensor (S) 732 is directly attached to the fins (F) of the CPU chip 731 and directly detects the temperature of the heat generating portion of the CPU chip 731 by directly measuring the temperature of the fins (F).

An air-cooling fan 733 blows cooled air to the CPU chip 731. A fan drive controller (DRV) 734 drives and controls the air-cooling fan 733 on the basis of a detection signal from the temperature sensor (S) 732.

When the detection temperature from the temperature sensor (S) 732 amounts to a set value, the fan drive controller (DRV) 734 drives the air-cooling fan 733 to blow cooled air to the CPU chip 731.

In the above structure, the temperature of the CPU chip 731 is detected by the temperature sensor (S) 732, and a detection signal is supplied to the fan drive controller (DRV) 734.

When the detection temperature from the temperature sensor (S) 732 amounts to the set temperature, the fan drive controller (DRV) 734 drives the air-cooling fan 733 to blow cooled air to the CPU chip 731.

With the structure in which the fan 733 for cooling the CPU chip 731 is directly driven and controlled on the basis of the detection signal from the temperature sensor (S) 732 directly attached to the fins (F) for radiating the heat of the CPU chip 731, the temperature of the CPU chip 731 can be immediately reflected on cooling control of the CPU chip 731. Therefore, the performance of the CPU chip 731 can be sufficiently used to realize a high-speed operation of the CPU chip at an almost threshold frequency.

The fourth variation is shown in FIG. 38. Referring to FIG. 38, a CPU board 740 has the mounting circuit pattern of a CPU. A CPU chip 741 is mounted at the CPU mounting position of the CPU board 740, and a thermal conductor (H) for transmitting the heat generated in the chip is arranged at the upper surface portion of the chip.

A temperature sensor (S) 742 is directly attached to the thermal conductor (H) of the CPU chip 741 and directly detects the temperature of the heat generating portion of the CPU chip 741 by directly measuring the temperature of the thermal conductor (H).

An air-cooling fan 743 blows cooled air to the CPU chip 741. A fan drive controller (DRV) 744 drives and controls the air-cooling fan 743 on the basis of a detection signal from the temperature sensor (S) 742.

When the detection temperature from the temperature sensor (S) 742 amounts to a set value, the fan drive controller (DRV) 744 drives the air-cooling fan 743 to blow cooled air to the CPU chip 741.

In the above structure, the temperature of the CPU chip 741 is detected by the temperature sensor (S) 742, and a detection signal is supplied to the fan drive controller (DRV) 744.

When the detection temperature from the temperature sensor (S) 742 amounts to the set temperature, the fan drive controller (DRV) 744 drives the air-cooling fan 743 to blow cooled air to the CPU chip 741.

With the structure in which the fan 743 for cooling the CPU chip 741 is directly driven and controlled on the basis of the detection signal from the temperature sensor (S) 742 directly attached to the thermal conductor (H) of the CPU chip 741, the temperature of the CPU chip 741 can be immediately reflected on cooling control of the CPU chip 741. Therefore, the performance of the CPU chip 741 can be sufficiently used to realize a high-speed operation of the CPU chip at an almost threshold frequency.

Variations related to CPU temperature detection in the clock control of the fourth embodiment will be described below. The following fifth to eighth variations correspond to the above-described four variations, respectively.

The fifth variation is shown in FIG. 39. Referring to FIG. 39, a CPU board 810 has the mounting circuit pattern of a CPU. A CPU chip 811 is mounted at the CPU mounting position of the CPU board 810. The CPU chip 811 is directly mounted at the CPU mounting position of the CPU board 810 through a CPU connector by soldering or the like.

A temperature sensor (S) 812 is directly attached to the CPU chip 811 and directly measures the temperature of the heat generating portion on the upper surface of the CPU chip 811.

A clock generator (CLK-GEN) 813 supplies an operating clock (CPU clock) to the CPU chip 811 and controls the CPU clock frequency on the basis of a detection signal from the temperature sensor (S) 812. When the detection temperature from the temperature sensor (S) 812 increases beyond a set temperature, the CPU clock frequency is lowered in accordance with the increase in temperature.

A circuit 814 supplies the CPU clock to the CPU chip 811. The circuit 814 supplies the CPU clock generated by the clock generator (CLK-GEN) 813 to the clock input terminal (Tc) of the CPU chip 811.

In the above structure, the temperature sensor (S) 812 directly attached to the CPU chip 811 directly measures the temperature of the heating portion on the upper surface of the CPU 811 and supplies a temperature detection signal to the clock generator (CLK-GEN) 813.

The clock generator (CLK-GEN) 813 monitors the temperature of the CPU chip 811 on the basis of the detection signal from the temperature sensor (S) 812. When the temperature of the CPU chip 811 is lower than the set temperature, a CPU clock having a predetermined defined frequency is supplied to the clock input terminal (Tc) of the CPU chip 811 through the clock supplying circuit 814.

Thereafter, when the temperature of the CPU chip 811 increases beyond the set temperature, the clock generator (CLK-GEN) 813 controls the CPU clock frequency on the basis of the detection signal from the temperature sensor (S) 812. More specifically, when the detection temperature from the temperature sensor (S) 812 increases beyond the set temperature, the CPU clock frequency is lowered in accordance with the increase in temperature. The CPU clock is supplied to the clock input terminal (Tc) of the CPU chip 811 through the clock supplying circuit 814.

Since the CPU clock frequency supplied to the CPU chip 811 is controlled on the basis of the detection signal from the temperature sensor (S) 812 directly attached to the CPU chip 811, the temperature of the CPU chip 811 can be immediately (i.e., accurately without any time delay) reflected on temperature control by clock frequency control of the CPU chip 811. Therefore, the performance of the CPU chip 811 can be sufficiently used to realize a high-speed operation of the CPU chip 811 at an almost threshold frequency.

The sixth variation will be described below with reference to FIG. 40. Referring to FIG. 40, a CPU board 820 has the mounting circuit pattern of a CPU. A CPU chip 821 is mounted at the CPU mounting position of the CPU board 820.

A temperature sensor (S) 822 is arranged at the CPU chip mounting portion of the CPU board 820. The temperature sensor (S) 822 measures the temperature of the heat generating portion on the lower surface of the CPU chip 821 directly or in a closest range.

A clock generator (CLK-GEN) 823 supplies an operating clock (CPU clock) to the CPU chip 821 and controls the CPU Clock frequency on the basis of a detection signal from the temperature sensor (S) 822. When the detection temperature from the temperature sensor (S) 822 increases beyond a set temperature, the CPU clock frequency is lowered in accordance with the increase in temperature.

A circuit 824 supplies the CPU clock to the CPU chip 821. The circuit 824 supplies the CPU clock generated by the clock generator (CLK-GEN) 823 to the clock input terminal (Tc) of the CPU chip 821.

In the above structure, the temperature sensor (S) 822 arranged at the CPU chip mounting portion of the CPU chip 821 measures the temperature of the heating portion on the lower surface of the CPU 821 directly or in a closest range and supplies a temperature detection signal to the clock generator (CLK-GEN) 823.

The clock generator (CLK-GEN) 823 monitors the temperature of the CPU chip 821 on the basis of the detection signal from the temperature sensor (S) 822. When the temperature of the CPU chip 821 is lower than the set temperature, a CPU clock having a predetermined defined frequency is supplied to the clock input terminal (Tc) of the CPU chip 821 through the clock supplying circuit 824.

Thereafter, when the temperature of the CPU chip 821 increases beyond the set temperature, the clock generator (CLK-GEN) 823 controls the CPU clock frequency on the basis of the detection signal from the temperature sensor (S) 822. More specifically, when the detection temperature from the temperature sensor (S) 822 increases beyond the set temperature, the CPU clock frequency is lowered accordingly. The CPU clock is supplied to the clock input terminal (Tc) of the CPU chip 821 through the clock supplying circuit 824.

Since the CPU clock frequency supplied to the CPU chip 821 is controlled on the basis of the detection signal from the temperature sensor (S) 822 provided at the CPU chip mounting portion of the CPU board 820, the temperature of the CPU chip 821 can be immediately (i.e., accurately without any time delay) reflected on temperature control by clock frequency control of the CPU chip 821. Therefore, the performance of the CPU chip 821 can be sufficiently used to realize a high-speed operation of the CPU chip 821 at an almost threshold frequency.

The seventh variation will be described below with reference to FIG. 41. Referring to FIG. 41, a CPU board 830 has the mounting circuit pattern of a CPU. A CPU chip 831 is mounted at the CPU mounting position of the CPU board 830, and the fins (F) for radiating heat generated in the chip are arranged at the upper surface portion of the chip.

A temperature sensor (S) 832 is directly attached to the fins (F) of the CPU chip 831. The temperature sensor (S) 832 detects the temperature of the heat generating portion of the CPU chip 831 by directly measuring the temperature of the fins (F).

A clock generator (CLK-GEN) 833 supplies an operating clock (CPU clock) to the CPU chip 831 and controls the CPU clock frequency on the basis of a detection signal from the temperature sensor (S) 832. When the detection temperature from the temperature sensor (S) 832 increases beyond a set temperature, the CPU clock frequency is lowered in accordance with the increase in temperature.

A circuit 834 supplies the CPU clock to the CPU chip 831. The circuit 834 supplies the CPU clock generated by the clock generator (CLK-GEN) 833 to the clock input terminal (Tc) of the CPU chip 831.

In the above structure, the temperature sensor (S) 832 directly attached to the fins (F) of the CPU chip 831 detects the temperature of the heat generating portion of the CPU chip 831 by directly measuring the temperature of the fin (F) and supplies a temperature detection signal to the clock generator (CLK-GEN) 833.

The clock generator (CLK-GEN) 833 monitors the temperature of the CPU chip 831 on the basis of the detection signal from the temperature sensor (S) 832. When the temperature of the CPU chip 831 is lower than the set temperature, a CPU clock having a predetermined defined frequency is supplied to the clock input terminal (Tc) of the CPU chip 831 through the clock supplying circuit 834.

Thereafter, when the temperature of the CPU chip 831 increases beyond the set temperature, the clock generator (CLK-GEN) 833 controls the CPU clock frequency on the basis of the detection signal from the temperature sensor (S) 832. More specifically, when the detection temperature from the temperature sensor (S) 832 increases beyond the set temperature, the CPU clock frequency is lowered in accordance with the increase in temperature. The CPU clock is supplied to the clock input terminal (Tc) of the CPU chip 831 through the clock supplying circuit 834.

Since the CPU clock frequency supplied to the CPU chip 831 is controlled on the basis of the detection signal from the temperature sensor (S) 832 directly attached to the fins (F) of the CPU chip 831, the temperature of the CPU chip 831 can be immediately (i.e., accurately with a largely shortened delay time) reflected on temperature control by clock frequency control of the CPU chip 831. Therefore, the performance of the CPU chip 831 can be sufficiently used to realize a high-speed operation of the CPU chip 831 at an almost threshold frequency.

The eighth variation will be described below with reference to FIG. 42. Referring to FIG. 42, a CPU board 840 has the mounting circuit pattern of a CPU. A CPU chip 841 is mounted at the CPU mounting position of the CPU board 840, and the thermal conductor (H) for transmitting heat generated in the chip is arranged at the upper surface portion of the chip.

A temperature sensor (S) 842 is directly attached to the thermal conductor (H). The temperature sensor (S) 842 detects the temperature of the heat generating portion of the CPU chip 841 by directly measuring the temperature of the thermal conductor (H).

A clock generator (CLK-GEN) 843 supplies an operating clock (CPU clock) to the CPU chip 841 and controls the CPU clock frequency on the basis of a detection signal from the temperature sensor (S) 842. When the detection temperature from the temperature sensor (S) 842 increases beyond a set temperature, the CPU clock frequency is lowered in accordance with the increase in temperature.

A circuit 844 supplies the CPU clock to the CPU chip 841. The circuit 844 supplies the CPU clock generated by the clock generator (CLK-GEN) 843 to the clock input terminal (Tc) of the CPU chip 841.

In the above structure, the temperature sensor (S) 842 directly attached to the thermal conductor (H) detects the temperature of the heat generating portion of the CPU chip 841 by directly measuring the temperature of the thermal conductor (H) and supplies a detection signal to the clock generator (CLK-GEN) 843.

The clock generator (CLK-GEN) 843 monitors the temperature of the CPU chip 841 on the basis of the detection signal from the temperature sensor (S) 842. When the temperature of the CPU chip 841 is lower than the set temperature, a CPU clock having a predetermined defined frequency is supplied to the clock input terminal (Tc) of the CPU chip 841.

Thereafter, when the temperature of the CPU chip 841 increases beyond the set temperature, the clock generator (CLK-GEN) 843 controls the CPU clock frequency on the basis of a temperature represented by the detection signal from the temperature sensor (S) 842. More specifically, when the detection temperature from the temperature sensor (S) 842 increases beyond the set temperature, the CPU clock frequency is lowered in accordance with the increase in temperature.

The CPU clock is supplied to the clock input terminal (Tc) of the CPU chip 841 through the clock supplying circuit 844.

Since the CPU clock frequency supplied to the CPU chip 841 is controlled on the basis of the detection signal from the temperature sensor (S) 842 directly attached to the thermal conductor (H) for transmitting the heat generated in the CPU chip 841, the temperature of the CPU chip 841 can be immediately (i.e., accurately with a largely shortened delay time) reflected on temperature control by clock frequency control of the CPU chip 841. Therefore, the performance of the CPU chip 841 can be sufficiently used to realize a high-speed operation of the CPU chip 841 at an almost threshold frequency.

A modification according to the fifth embodiment will be described below with reference to FIG. 43. In this modification, in a portable computer having a suspend/resume function, the temperature of a CPU chip is detected by a temperature sensor. When the temperature sensor detects an operating limitation temperature of the CPU chip, suspend processing is executed.

Referring to FIG. 43, a CPU (CPU chip) 91 controls the entire system and is connected to a main memory (MEM) 94, a storage memory 96, and various input/output devices (I/O) through a system bus.

A temperature sensor (S) 92 measures the chip temperature of the CPU 91. As an example, the temperature sensor (S) 92 is directly attached to the chip, as shown in the first and second examples.

An interrupt generation unit (IRG) 93 monitors the detection temperature from the temperature sensor (S) 92 and generates a forced interrupt when the detection temperature amounts to a predetermined operating limitation temperature. When the chip temperature of the CPU 91 amounts to the operating limitation temperature, a forced interrupt is generated to the CPU 91.

A suspend/resume processing unit (S/R) 95 is resident in the main memory (MEM) 94. When the suspend/resume processing unit (S/R) 95 is set in a resume mode by setup, it is started in accordance with the ON/OFF operation of the power supply.

The suspend/resume function itself is the same as that of a normal personal computer. In this embodiment, however, when a forced interrupt is generated by the interrupt generation unit (IRG) 93 independently of the set contents of the resume mode, the suspend/resume processing unit is forcibly started to execute suspend processing. Upon completion of the suspend processing, the power supply is turned off (powered off). Thereafter, when the power supply is turned on (powered on), resume processing is executed to restore a processing state at the time of interrupt so that the processing before the interrupt can be continued.

In the above structure, the temperature sensor (S) 92 measures the chip temperature of the CPU 91 and supplies a temperature detection signal to the interrupt generation unit (IRG) 93.

The interrupt generation unit (IRG) 93 monitors the detection temperature from the temperature sensor (S) 92. When the detection temperature amounts to a predetermined operating limitation temperature, a forced interrupt is generated to the CPU 91.

Upon reception of the forced interrupt from the interrupt generation unit (IRG) 93, the CPU 91 ends the processing in an appropriate step and starts the suspend/resume processing unit (S/R) 95 to execute suspend processing. Data obtained in the suspend processing is stored in the storage memory 96.

As described above, when the chip temperature of the CPU 91 amounts to a high temperature which does not allow continuation of a normal operation, suspend processing is executed. With this processing, when a state for maintaining the normal operation is attained, a processing state at the time of interrupt can be restored to continue the processing. Therefore, a reliable operation can be maintained.

The second modification according to the fifth embodiment will be described below with reference to FIG. 44. This modification is a combination of the above-described second and third variations. In the second modification, a temperature sensors 912 arranged at the CPU chip mounting portion of a CPU board 910 measures the temperature of the heat generating portion on the lower surface of a CPU chip 911 directly or in a closest range and supplies a temperature detection signal to a clock generator (CLK-GEN) 913 and a fan drive controller (DRV) 914.

The clock generator (CLK-GEN) 913 monitors the temperature of the CPU chip 911 on the basis of the detection signal from the temperature sensor (S) 912. When the temperature of the CPU chip 911 is lower than a set temperature, a CPU clock having a predetermined defined frequency is supplied to the clock input terminal (Tc) of the CPU chip 911 through the clock generator 913.

The fan drive controller (DRV) 914 monitors the temperature of the CPU chip 911 on the basis of the detection signal from the temperature sensor (S) 912. When the temperature of the CPU chip 911 is lower than a set temperature, a fan 915 is set in a stop state.

Thereafter, when the detection temperature from the temperature sensor (S) 912 amounts to the set temperature, the fan drive controller (DRV) 914 drives the fan 915 to blow cooled air to the CPU chip 911.

When the temperature of the CPU chip 911 increases beyond the set temperature, the clock generator (CLK-GEN) 913 controls the CPU clock frequency on the basis of the detection signal from the temperature sensor (S) 912. More specifically, when the detection temperature from the temperature sensor (S) 912 increases, the CPU clock frequency is lowered accordingly. The CPU clock is supplied to the clock input terminal (Tc) of the CPU chip 911 through the clock generator 913.

The set temperature of the fan drive controller (DRV) 914 is set lower than that of the clock generator (CLK-GEN) 913. In this case, the fan 915 is driven to cool the CPU chip 911 before the clock generator (CLK-GEN) 913 retards the CPU clock. For this reason, a high-speed operation of the CPU chip can be performed at an almost threshold frequency for a long time. When the set temperature of the fan drive controller (DRV) 914 is set to be equal to that of the clock generator (CLK-GEN) 913, cooling by the fan 915 and retardation of the CPU clock are simultaneously started, thereby restoring the high-speed CPU clock state within a short time.

In the above examples except for the first and second examples, only one temperature sensor is arranged. However, a plurality of temperature sensors may also be separately arranged. In this case, as for positions where the temperature sensors are arranged, the above variations may be combined with each other or another position (e.g., on the inner wall of the housing) may also be combined.

As described above in detail, according to the fifth embodiment, air heated by a heat generating portion in the portable computer is drawn on the deskstation side, or cooled air is blown from the deskstation side, thereby enabling appropriate temperature control. Therefore, the performance of the CPU chip can be sufficiently used to realize a high-speed operation of the CPU chip at an almost threshold frequency. In addition, since the fan is arranged on the deskstation side, the size of the portable computer can be further reduced.

According to this embodiment, an electronic equipment incorporating a CPU board comprises a circuit for supplying a clock to a CPU chip, a temperature sensor directly attached to the CPU chip, and a circuit for controlling the clock frequency on the basis of a detection signal from the temperature sensor. The clock frequency supplied to the CPU chip is controlled on the basis of the detection signal from the temperature sensor directly attached to the CPU chip. With this structure, the temperature of the CPU chip can be directly reflected on chip temperature control by clock frequency control. For this reason, the performance of the CPU chip can be sufficiently used to realize a high-speed operation of the CPU chip at an almost threshold frequency.

According to this embodiment, an electronic equipment incorporating a CPU board comprises a circuit for supplying a clock to a CPU chip, a temperature sensor arranged at the CPU chip mounting portion of the CPU board, and a circuit for controlling the clock frequency on the basis of a detection signal from the temperature sensor. The clock frequency supplied to the CPU chip is controlled on the basis of the detection signal from the temperature sensor arranged at the CPU chip mounting portion of the CPU board. with this structure, the temperature of the CPU chip can be immediately reflected on chip temperature control. For this reason, the performance of the CPU chip can be sufficiently used to realize a high-speed operation of the CPU chip at an almost threshold frequency.

According to this embodiment, an electronic equipment incorporating a CPU board comprises a circuit for supplying a clock to a CPU chip, fins for radiating the heat of the CPU chip, a temperature sensor provided to the fins, and a circuit for controlling the clock frequency on the basis of a detection signal from the temperature sensor. The clock frequency supplied to the CPU chip is controlled on the basis of the detection signal from the temperature sensor provided to the fins of the CPU chip. With this structure, the temperature of the CPU chip can be immediately reflected to chip temperature control. For this reason, the performance of the CPU chip can be sufficiently used to realize a high-speed operation of the CPU chip at an almost threshold frequency.

According to this embodiment, an electronic equipment incorporating a CPU board comprises a circuit for supplying a clock to a CPU chip, a thermal conductor for transmitting the heat of the CPU chip, a temperature sensor for detecting the temperature of the CPU chip through the thermal conductor, and a circuit for controlling the clock frequency on the basis of a detection signal from the temperature sensor. The clock frequency supplied to the CPU chip is controlled on the basis of the detection signal from the temperature sensor provided to the thermal conductor for transmitting the heat of the CPU chip. With this structure, the temperature of the CPU chip can be immediately reflected on chip temperature control. For this reason, the performance of the CPU chip can be sufficiently used to realize a high-speed operation of the CPU chip at an almost threshold frequency.

According to this embodiment, an electronic equipment incorporating a CPU board comprises a fan for cooling a CPU chip, a temperature sensor directly attached to the CPU chip, and a circuit for driving and controlling the fan on the basis of a detection signal from the temperature sensor. The fan for cooling the CPU chip is driven and controlled on the basis of the detection signal from the temperature sensor directly attached to the CPU chip. With this structure, the temperature of the CPU chip can be directly reflected on chip temperature control. For this reason, the performance of the CPU chip can be sufficiently used to realize a high-speed operation of the CPU chip at an almost threshold frequency.

According to this embodiment, an electronic equipment incorporating a CPU board comprises a fan for cooling a CPU chip, a temperature sensor arranged at the CPU chip mounting portion of the CPU board, and a circuit for driving and controlling the fan on the basis of a detection signal from the temperature sensor. The fan for cooling the CPU chip is driven and controlled on the basis of the detection signal from the temperature sensor arranged at the CPU chip mounting portion of the CPU board. With this structure, the temperature of the CPU chip can be immediately reflected on chip temperature control. For this reason, the performance of the CPU chip can be sufficiently used to realize a high-speed operation of the CPU chip at an almost threshold frequency.

According to this embodiment, an electronic equipment incorporating a CPU board comprises fins for radiating the heat of a CPU chip, a temperature sensor provided to the fins, a fan for cooling the CPU chip through the fins, and a circuit for driving and controlling the fan on the basis of a detection signal from the temperature sensor. The fan for cooling the CPU chip is driven and controlled on the basis of the detection signal from the temperature sensor provided to the fins of the CPU chip. With this structure, the temperature of the CPU chip can be immediately reflected on chip temperature control. For this reason, the performance of the CPU chip can be sufficiently used to realize a high-speed operation of the CPU chip at an almost threshold frequency.

According to this embodiment, an electronic equipment incorporating a CPU board comprises a thermal conductor for transmitting the heat of a CPU chip, a temperature sensor for detecting the temperature of the CPU chip through the thermal conductor, a fan for cooling the CPU chip through the thermal conductor, an d a circuit for driving and controlling the fan on the basis of a detection signal from the temperature sensor. The fan for cooling the CPU chip is driven and controlled on the basis of the detection signal from the temperature sensor provided to the thermal conductor of the CPU chip. With this structure, the temperature of the CPU chip can be immediately reflected on chip temperature control. For this reason, the performance of the CPU chip can be sufficiently used to realize a high-speed operation of the CPU chip at an almost threshold frequency.

According to this embodiment, a portable computer having a suspend/resume function comprises a temperature sensor for detecting the temperature of a CPU chip, and a control means for executing suspend processing on the basis of a detection signal from the temperature sensor. When the temperature of the CPU chip amounts to a high temperature which does not allow continuation of a normal operation, suspend processing is executed. With this processing, when a state for maintaining the normal operation is attained, a processing state interrupted upon execution of forced suspend processing can be restored. For this reason, a reliable operation can be maintained.

According to this embodiment, a function expansion unit for expanding the function of a portable computer comprises a sensor for detecting the temperature of a chip incorporated in the portable computer mounted in the unit, a fan and air blow port for blowing cooled air to the mounted portable computer, and a control means for driving and controlling the fan on the basis of a detection signal from the temperature sensor. With this structure, degradation in heat dissipation of the portable computer mounted in the function expansion unit can be covered, thereby maintaining a reliable function expansion operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system comprising:
    a portable computer having a first electrical pin group; and
    an expansion unit removably engageable mechanically and electrically with the portable computer, and having a second electrical pin group, for extending functions of the portable computer,
    wherein the expansion unit comprises:
       controller for controlling the expansion unit; and
       detecting means for detecting that the portable computer is mounted on a predetermined position of the expansion unit, and
    the portable computer comprises:
       control section for, in response to detection of the detecting means, performing processing according to an ON state of the portable computer during a first stage, and issuing a command for docking the portable computer with the expansion unit to the controller during a second stage.

2. The computer system according to claim 1, wherein the expansion unit further comprises a lock mechanism for fixing the portable computer at the predetermined position of the expansion unit.

3. The computer system according to claim 1, the control section further for, in response to detection of the detecting means, performing processing according to an OFF state of the portable computer during the first stage.

4. The computer system according to claim 1, wherein the expansion unit further comprises an option card and the computer system further comprises means for preventing an erroneous operation of the portable computer and destruction of the option card of the expansion unit during said docking of the portable computer with the expansion unit during the second stage.

5. The computer system according to claim 1, wherein the expansion unit further comprises a power supply unit, said controller further for outputting a signal to enable said power supply unit, when the controller determines that the portable computer is in the power ON state.

6. The computer system according to claim 5, wherein the expansion unit further comprises an option card said power supply unit of said expansion unit prevents an erroneous operation of the portable computer and destruction of the option card of the expansion unit during said docking of the portable computer with the expansion unit during the second stage, when said power supply unit is enabled.

7. The computer system according to claim 1, wherein the first electrical pin group is connected with the second electrical pin group when the portable computer is mounted on the predetermined position.

8. The computer system according to claim 1, wherein the expansion unit further comprises a lock mechanism which fixes the portable computer at the predetermined position of the expansion unit after the second stage.

9. The computer system according to claim 1, wherein the expansion unit further comprises a power supply and the control section includes a processor and a power supply controller, the processor issues, in response to the detection, a dock power on command to the power supply during the first stage, when the portable computer is powered, and the power supply controller issues the command for docking the portable computer with the expansion unit in response to the dock power on command.

10. The computer system according to claim 9, wherein the controller of the expansion unit enables power supplying for the expansion unit in response to the command for docking the portable computer with the expansion unit when the portable computer is in a power ON state.

11. The computer system according to claim 1, wherein the control section includes a power supply controller, and
the power supply controller issues the command for docking the portable computer to the expansion unit in response to the detection when the portable computer is not powered.

12. The computer system according to claim 2, wherein the portable computer has a lock groove, and the lock mechanism has a lock lever and fixes the portable computer at the predetermined position by engaging the lock lever in the lock groove.

13. The computer system according to claim 1, wherein the controller determines whether or not a password is set in response to detection by the detecting means.

14. The computer system according to claim 13, wherein the expansion unit further comprises a lock mechanism for fixing the portable computer at the predetermined position of the expansion unit, and said lock mechanism fixes the portable computer at the predetermined position when the password is set.

15. The computer system according to claim 1, wherein the expansion unit further comprises a loading mechanism for mating of the first and second pin groups.

16. The computer system of claim 15, wherein the controller controls the loading mechanism of the expansion unit, in response to the command, such that the first pin group is mated with the second pin group.

17. A computer system comprising:
a portable computer having a first electrical pin group; and
an expansion unit removable engageable mechanically and electrically with the portable computer, and having a second electrical pin group, for extending functions of the portable computer,
wherein the expansion unit comprises:
controller for controlling the expansion unit;
a switch for inputting an eject request of the portable computer, and
the portable computer comprises:
control section for, in response to the eject request, performing processing according to an ON state of the portable computer during a first stage, and issuing a command for ejecting the portable computer from the expansion unit to the controller during a second stage.

18. The computer system according to claim 17, wherein the expansion unit further comprises a lock mechanism for fixing the portable computer at the predetermined position of the expansion unit.

19. The computer system according to claim 18, wherein the controller controls the lock mechanism of the expansion unit in response to the command such that fixing of the portable computer is released.

20. The computer system according to claim 17, wherein the expansion unit further comprises a power supply, and wherein the control section includes a processor and a power supply controller,
the processor, in response to the eject request, performs a configuration set processing and issues a dock power off command to the power supply when the portable computer is powered, and
the power supply controller issues the command in response to the dock power off command.

21. The computer system according to claim 17, wherein the control section includes a power supply controller, and
the power supply controller issues the command in response to the eject request when the portable computer is not powered.

22. The computer system according to claim 17, the control section further for, in response to the eject request, performing processing according to an OFF state of the portable computer during the first stage.

23. The computer system according to claim 17, the controller of the expansion unit disables power supplying for the expansion unit after fixing of the portable computer is released.

24. The computer system according to claim 18, wherein the portable computer has a lock groove, and the lock mechanism of the expansion unit has a lock lever and fixes the portable computer at the predetermined position by engaging the lock lever in the lock groove.

25. The computer system according to claim 24, wherein the lock mechanism of the expansion unit releases fixing of the portable computer by releasing the engaged lock lever from the lock groove, according to controlling by the controller.

26. The computer system according to claim 17, wherein the controller determines whether or not a password is set in response to the eject request and issues a password check request when the password is set,
the control section executes password check processing to request inputting a user password to a user in response to the password check request and output a permission signal when the input password coincides with the set password.

27. The computer system according to claim 26, wherein the expansion unit further comprises a lock mechanism for fixing the portable computer at the predetermined position of the expansion unit.

28. The computer system according to claim 27, wherein the control section controls the lock mechanism of the expansion unit such that fixing of the portable computer is released in response to the permission signal.

29. The computer system according to claim 17, wherein the expansion unit further comprises a loading mechanism for mating of the first and second pin groups.

30. The computer system of claim 29, wherein the controller controls the loading mechanism of the expansion unit, in response to the command, such that the first pin group is mated with the second pin group.

31. The computer system of claim 17, wherein the expansion unit further comprises an option card and the computer system further comprises means for preventing an erroneous operation of the portable computer and destruction of the option card of the expansion unit during said ejecting of the portable computer from the expansion unit during the second stage.

* * * * *